(12) United States Patent
Lin et al.

(10) Patent No.: US 11,350,418 B2
(45) Date of Patent: May 31, 2022

(54) METHOD AND APPARATUS FOR CHANNEL MEASUREMENT AND REPORTING IN CORESET BASIS

(71) Applicant: Samsung Electronics Co., Ltd., Suwon-si (KR)

(72) Inventors: Qiongjie Lin, Mountain View, CA (US); Aris Papasakellariou, Houston, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 16/748,653

(22) Filed: Jan. 21, 2020

(65) Prior Publication Data

US 2020/0245333 A1 Jul. 30, 2020

Related U.S. Application Data

(60) Provisional application No. 62/882,759, filed on Aug. 5, 2019, provisional application No. 62/882,137, filed on (Continued)

(51) Int. Cl.
*H04W 72/04* (2009.01)
*H04L 5/10* (2006.01)
(Continued)

(52) U.S. Cl.
CPC ....... *H04W 72/0493* (2013.01); *H04L 1/0026* (2013.01); *H04L 5/0051* (2013.01); (Continued)

(58) Field of Classification Search
CPC ........... H04W 72/0493; H04W 72/042; H04W 24/10; H04W 72/0426; H04W 72/02; (Continued)

(56) References Cited

U.S. PATENT DOCUMENTS

2018/0331728 A1 11/2018 Tsai
2018/0343653 A1 11/2018 Guo
(Continued)

FOREIGN PATENT DOCUMENTS

CN 109076364 A 12/2018
WO 2018/128376 A1 7/2018
WO 2018190617 A1 10/2018

OTHER PUBLICATIONS

"3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 170 pages.
(Continued)

*Primary Examiner* — Kiet Tang

(57) ABSTRACT

A UE includes a receiver configured to receive a first configuration for a first CORESET, a second configuration for a reception of a first CSI-RS, and the first CSI-RS. The first configuration includes a first TCI state. The TCI state for a CORESET indicates a set of quasi co-location properties for a PDCCH reception in the CORESET. A PDCCH includes a DCI format. The second configuration includes a first set of REs and the first TCI state. The UE also includes a processor operably connected to the receiver. The processor is configured to compute a first CQI value, based on the first CSI-RS, for a first PDCCH reception in the first CORESET and at least one CQI value based on the first CQI value. The UE further includes a transmitter operably connected to the processor, the transmitter configured to transmit a channel that includes the at least one CQI value.

20 Claims, 21 Drawing Sheets

Related U.S. Application Data on Aug. 2, 2019, provisional application No. 62/805,549, filed on Feb. 14, 2019, provisional application No. 62/804,466, filed on Feb. 12, 2019, provisional application No. 62/800,852, filed on Feb. 4, 2019, provisional application No. 62/796,140, filed on Jan. 24, 2019.

(51) Int. Cl.
  *H04L 1/00* (2006.01)
  *H04L 5/00* (2006.01)
  *H04W 24/10* (2009.01)

(52) U.S. Cl.
  CPC .............. *H04L 5/10* (2013.01); *H04W 24/10* (2013.01); *H04W 72/042* (2013.01)

(58) Field of Classification Search
  CPC ....... H04L 5/10; H04L 1/0026; H04L 5/0051; H04L 5/0025; H04L 5/0053; H04L 5/0094; H04L 5/0057
  See application file for complete search history.

(56) References Cited

U.S. PATENT DOCUMENTS

| | | | | |
|---|---|---|---|---|
| 2020/0052861 | A1* | 2/2020 | Li | H04L 5/0057 |
| 2020/0221485 | A1* | 7/2020 | Cirik | H04B 7/0695 |
| 2021/0058906 | A1* | 2/2021 | Seo | H04L 5/0053 |
| 2021/0153205 | A1* | 5/2021 | Takeda | H04W 72/0426 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, 148 pages.
"3rd Generation Partnership Project; Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
"3rd Generation Partnership Project; Technical Specification Group Radio Access Network; NR; Physical channels and modulation (Release 15)", 3GPP TS 38.211 V15.0.0, Dec. 2017, 73 pages.
"3rd Generation Partnership Project; Technical Specification Group Radio Access Network; NR; Multiplexing and channel coding (Release 15)", 3GPP TS 38.212 V15.0.0, Dec. 2017, 82 pages.
"3rd Generation Partnership Project; Technical Specification Group Radio Access Network; NR; Multiplexing and channel coding( Release 15)", 3GPP TS 38.212 V15.5.0, Mar. 2019, 101 pages.
"3rd Generation Partnership Project; Technical Specification Group Radio Access Network; NR; Physical layer procedures for data (Release 15)", 3GPP TS 38.214 V15.5.0, Mar. 2019, 103 pages.
"3rd Generation Partnership Project; Technical Specification Group Radio Access Network; NR; Physical channels and modulation (Release 15)", 3GPP TS 38.211 V15.5.0, Mar. 2019, 96 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Requirements for support of radio resource management, (Release 16)", 3GPP TS 38.133:v16.0.0, Jun. 2019, 999 pages.
"3rd Generation Partnership Project; Technical Specification Group Radio Access Network; NR; Physical layer measurements, (Release 15)", 3GPP TS 38.215 V15.5.0, Jun. 2019, 16 pages.
"5G; NR; Medium Access Control (MAC) protocol specification (3GPP TS 38.321 version 15.5.0 Release 15)", ETSI TS 138 321 V15.5.0, May 2019, 80 pages.
"5G; NR; Radio Resource Control (RRC); Protocol specification (3GPP TS 38.331 version 15.5.1 Release 15)", ETSI TS 138 331 V15.5.1, May 2019, 488 pages.
International Search Report dated May 1, 2020 in connection with International Patent Application No. PCT/KR2020/001213, 3 pages.
Written Opinion of the International Searching Authority dated May 1, 2020 in connection with International Patent Application No. PCT/KR2020/001213, 5 pages.
"3rd Generation Partnership Project; Technical Specification Group Radio Access Network; NR; Physical layer procedures for data (Release 15)", 3GGP TS 38.214 V15.4.0 (Dec. 2018), 102 pages.
Extended European Search Report dated Dec. 23, 2021 regarding Application No. 20744761.6, 14 pages.
NTT Docomo, Inc., "Work plan for Rel-15 NR WI", 3GPP TSG RAN WG1 Meeting #90bis, R1-1718177, Oct. 2017, 174 pages.
Ericsson, "Feature lead summary 2 for beam measurement and reporting", 3GPP TSG-RAN WG1 Meeting #93, R1-1807679, May 2018, 35 pages.

* cited by examiner

METHOD AND APPARATUS FOR CHANNEL MEASUREMENT AND REPORTING IN CORESET BASIS

CROSS-REFERENCE TO RELATED APPLICATIONS AND CLAIM OF PRIORITY

The present application claims priority to U.S. Provisional Patent Application Ser. No. 62/796,140, filed on Jan. 24, 2019, U.S. Provisional Patent Application Ser. No. 62/800,852, filed on Feb. 4, 2019, U.S. Provisional Patent Application Ser. No. 62/804,466, filed on Feb. 12, 2019, U.S. Provisional Patent Application Ser. No. 62/805,549, filed on Feb. 14, 2019, U.S. Provisional Patent Application Ser. No. 62/882,137, filed on Aug. 2, 2019, and U.S. Provisional Patent Application Ser. No. 62/882,759, filed on Aug. 5, 2019. The content of the above-identified patent document is incorporated herein by reference.

TECHNICAL FIELD

The present application relates generally wireless communication systems and, more specifically, to channel measurement and reporting for signaling of control channels in control resource sets (CORESETs).

BACKGROUND

A wireless communication system can provide support for channel state information (CSI) reports from a user equipment (UE) aimed for enabling a serving base station (gNB) to perform link adaptation for receptions of physical downlink shared channels (PDSCHs) by the UE, such as for selecting frequency domain resources for a PDSCH reception by the UE, or for selecting a modulation and coding scheme (MCS), or a number of MIMO layers for associated data information. A UE can be configured multiple control resource sets (CORESETs) for receptions of physical downlink control channels (PDCCHs) wherein a PDCCH provides a downlink control information (DCI) format. A PDCCH reception can experience different channel conditions in different CORESETs. Typically, a target reception reliability, for example as determined by a block error rate (BLER), for a DCI format can be different than for a transport block in a PDSCH. Also, an encoding scheme for a DCI format, such as polar encoding, can be different than an encoding scheme for a transport block, such as LDPC encoding. Further, a bandwidth for a PDCCH reception can be different than a bandwidth that a UE provides a CSI report for a PDSCH reception. Therefore, in general, it may not be possible for a gNB to use a CSI report for a PDSCH reception by a UE to perform link adaptation for a PDCCH reception by the UE.

PDCCH monitoring is one of the main factors for UE power consumption. Typically, a UE monitors PDCCH (PDCCH reception and DCI format demodulation and decoding) without the UE detecting any DCI format. Therefore, grant-free PUSCH transmission, for example when a UE has predominantly uplink traffic, can provide UE power savings as PDCCH monitoring by the UE can be infrequent, such as for example to obtain system or common control information.

A wireless communication system also provides support for (re)configuration to a UE of discontinuous reception (DRX) parameters from a predefined set of values using higher layer signaling. However, to avoid associated overhead, a network typically does not frequently adapt configured parameters for a UE regardless of a UE power consumption status of a BWP bandwidth and activated number of component carrier/cells.

SUMMARY

The present disclosure relates a pre-5th-Generation (5G) or 5G communication system to be provided for supporting higher data rates Beyond 4th-Generation (4G) communication system such as Long-Term Evolution (LTE).

In one embodiment, a UE is provided. The UE includes a receiver configured to receive a first configuration for a first control resource set (CORESET). The first configuration includes a first transmission configuration indication (TCI) state. The TCI state for a CORESET indicates a set of quasi co-location properties for a physical downlink control channel (PDCCH) reception in the CORESET. A PDCCH includes a downlink control information (DCI) format. The receiver is also configured to receive a second configuration for a reception of a first channel state information reference signal (CSI-RS). The second configuration includes a first set of REs and the first TCI state. The receiver is further configured to receive the first CSI-RS. The UE also includes a processor operably connected to the receiver. The processor is configured to compute a first channel quality indicator (CQI) value, based on the first CSR-RS, for a first PDCCH reception in the first CORESET. The processor is also configured to compute at least one CQI value based on the first CQI value. The UE further includes a transmitter operably connected to the processor, the transmitter configured to transmit a channel that includes the at least one CQI value.

In another embodiment, a base station is provided. The base station includes a transmitter configured to transmit a first configuration for a first control resource set (CORESET). The first configuration includes first transmission configuration indication (TCI) state. A TCI states for a CORESET indicates a set of quasi co-location properties for a physical downlink control channel (PDCCH) transmission in the CORESET. A PDCCH transmission includes a downlink control information (DCI) format. The transmitter is also configured to transmit a second configuration for a transmission of a first channel state information reference signal (CSI-RS). The second configuration includes a first set of REs and the first TCI state. The transmitters if further configured to transmit the first CSI-RS. The base station also includes a receiver configured to receive a channel that includes at least one channel quality indicator (CQI) value associated with the first CSI-RS. The base station further includes a processor operably connected to the transmitter and to the receiver. The processor is configured to determine parameters for a first PDCCH transmission in the first CORESET based on the at least one CQI value.

In another embodiment, a method for providing a channel quality indicator (CQI) value for reception of a physical downlink control channel (PDCCH) in a control resource set (CORESET) is provided. The method includes receiving a first configuration for a first CORESET. The first configuration includes a first transmission configuration indication (TCI) state. A TCI state for a CORESET indicates a set of quasi co-location properties for a PDCCH reception in the CORESET. A PDCCH includes a downlink control information (DCI) format. The method also includes receiving a second configuration for a reception of a first channel state information reference signal (CSI-RS). The second configuration includes a first set of REs, and the first TCI state. The method further includes receiving the first CSI-RS. The method also includes computing a first CQI value, based on the first CSI-RS, for a first PDCCH reception in the first CORESET, and at least one CQI value based on the first CQI value. The method further includes transmitting a channel that includes the at least one CQI value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
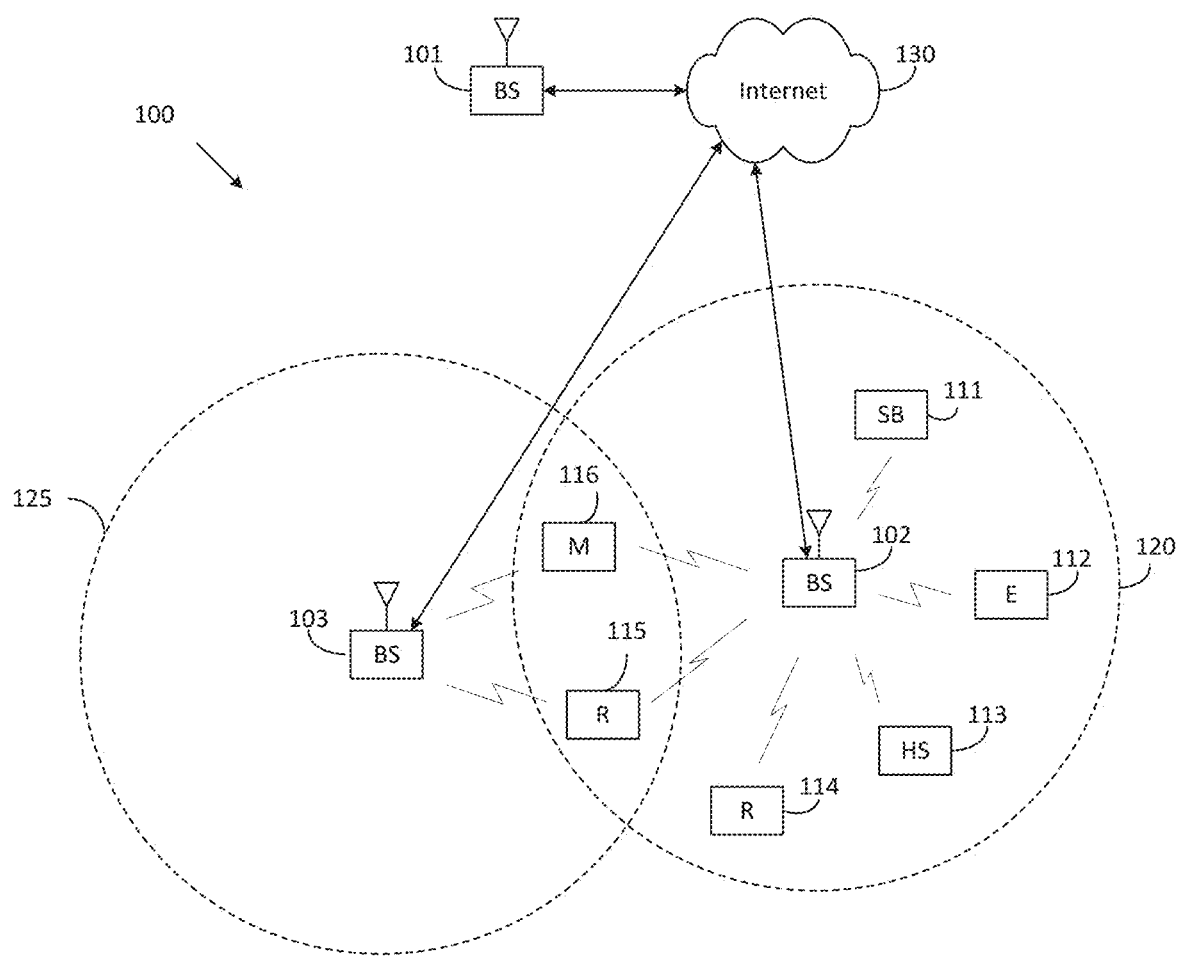
FIG. 1 illustrates an example wireless network according to embodiments of the present disclosure.

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation," hereinafter "REF 1," 3GPP TS 38.212 v15.4.0, "NR; Multiplexing and channel coding," hereinafter "REF 2," 3GPP TS 38.213 v15.4.0, "NR; Physical layer procedures for control," hereinafter "REF 3," 3GPP TS 38.214 v15.4.0, "NR; Physical layer procedures for data," hereinafter "REF 4," 3GPP TS 38.215 v15.4.0, "NR; Physical layer measurements," hereinafter "REF 5," 3GPP TS 38.321 v15.4.0, "NR; Medium Access Control (MAC) protocol specification," hereinafter "REF 6," 3GPP TS 38.331 v15.4.0, "NR; Radio Resource Control (RRC) protocol specification," hereinafter "REF 7," 3GPP TS 38.133: v16.0.0, "NR; Requirements for support of radio resource management," hereinafter "REF 8," 3GPP TS 38.211 v15.5.0, "NR; Physical channels and modulation," hereinafter "REF 9," 3GPP TS 38.212 v15.5.0, "NR; Multiplexing and channel coding," hereinafter "REF 10," 3GPP TS 38.213 v15.5.0, "NR; Physical layer procedures for control," hereinafter "REF 11," 3GPP TS 38.214 v15.5.0, "NR; Physical layer procedures for data," hereinafter "REF 12," 3GPP TS 38.215 v15.5.0, "NR; Physical layer measurements," hereinafter "REF 13," 3GPP TS 38.321 v15.5.0, "NR; Medium Access Control (MAC) protocol specification," hereinafter "REF 14," 3GPP TS 38.331 v15.5.0, "NR; Radio Resource Control (RRC) protocol specification," hereinafter "REF 15."

Embodiments of the present disclosure enable channel measurement and CSI reporting for PDCCH receptions in one or more CORESETs. The disclosure also relates to determining signals that can be used for channel measurements and for determining a CSI report for PDCCH receptions in one or more CORESETs. The disclosure further relates to defining contents of a CSI report for PDCCH receptions in one or more CORESETs. The disclosure additionally relates to providing means for fast adaptation of a CORESET configuration.

Embodiments of the present disclosure enable indication to a UE, through a sequence-based power saving signal, for whether or not the UE needs to receive PDSCH. The disclosure also relates to enabling PDSCH DM-RS based DL control information so that a UE can receive a PDSCH with dynamic resource configuration and transmission scheme without the PDSCH being scheduled by a DCI format in a PDCCH. The disclosure additionally relates to a UE procedure for PDSCH reception without PDCCH monitoring. The disclosure further relates to determination of a maximum number of PDSCH/PUSCH MIMO layers per bandwidth part (BWP) and to BWP switching delay when adaptation of a maximum of MIMO layers is based on BWP switching. This disclosure also relates to the configuration of rank indicator (RI) for CSI report and SRS antenna switching when adaptation of a maximum number of MIMO layers is based on BWP switching. This disclosure additionally relates to enabling a UE to provide to a serving base station assistance information for a maximum number of MIMO layers per BWP when adaptation of the maximum number of MIMO layers is based on BWP switching.

Additionally, embodiments of the present disclosure provide dynamic configuration of connected mode DRX (C-DRX), including inactivity timer, DRX cycle, and ON duration, according to PDCCH decoding outcomes over one or multiple DRX cycle(s). The disclosure also relates to enabling aperiodic CSI-RS transmissions that are triggered by a signal or by control information before a start of a C-DRX ON duration and can be used for one or more of channel tracking, RRM measurements, indication for PDCCH monitoring in one or more next C-DRX ON durations, dynamic C-DRX reconfiguration, and CSI reporting. The disclosure additionally relates to enabling CSI measurement and report associated with C-DRX operation.

Figure 2:
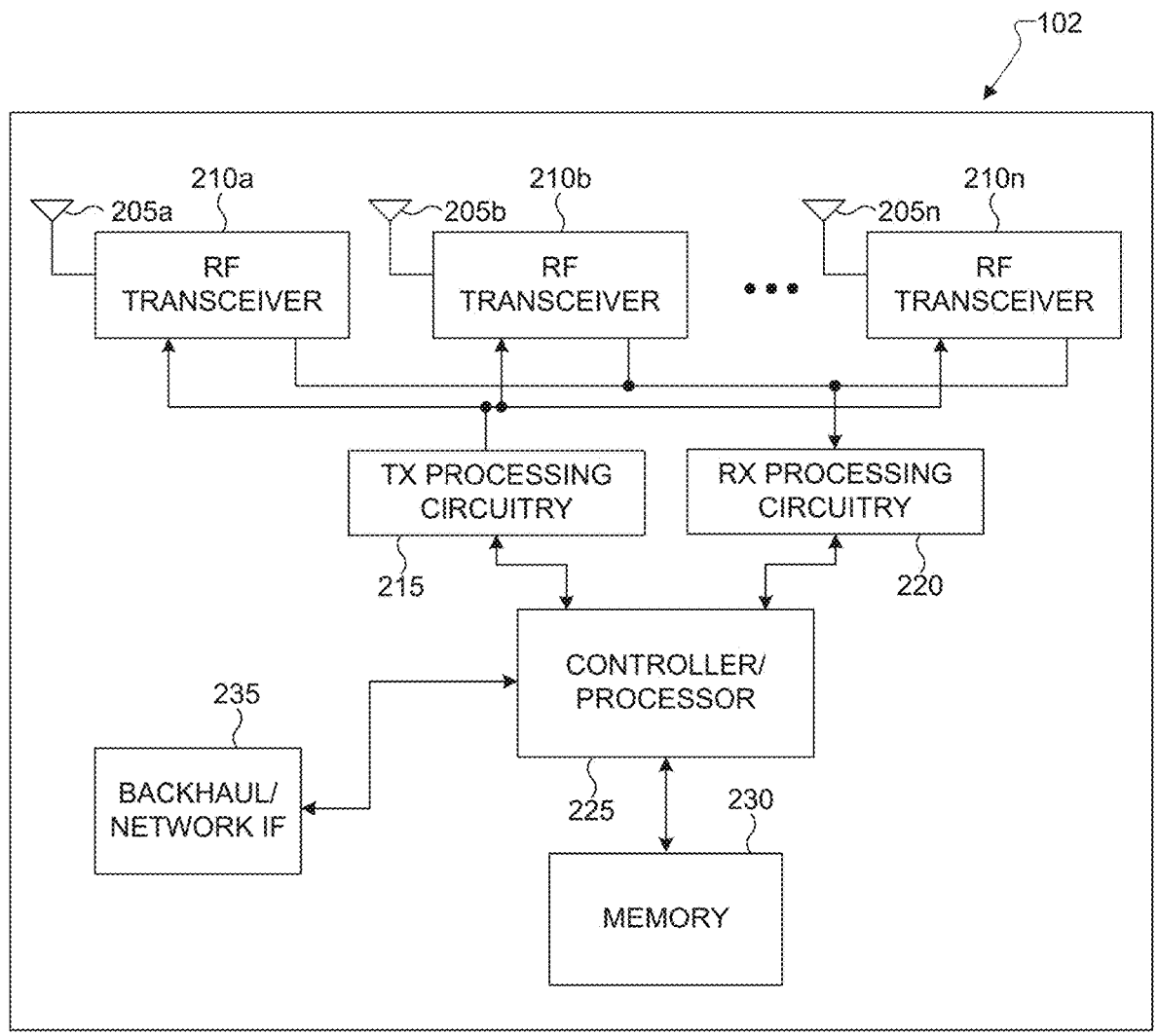
FIG. 2 illustrates an example gNB according to embodiments of the present disclosure.
Figure 3:
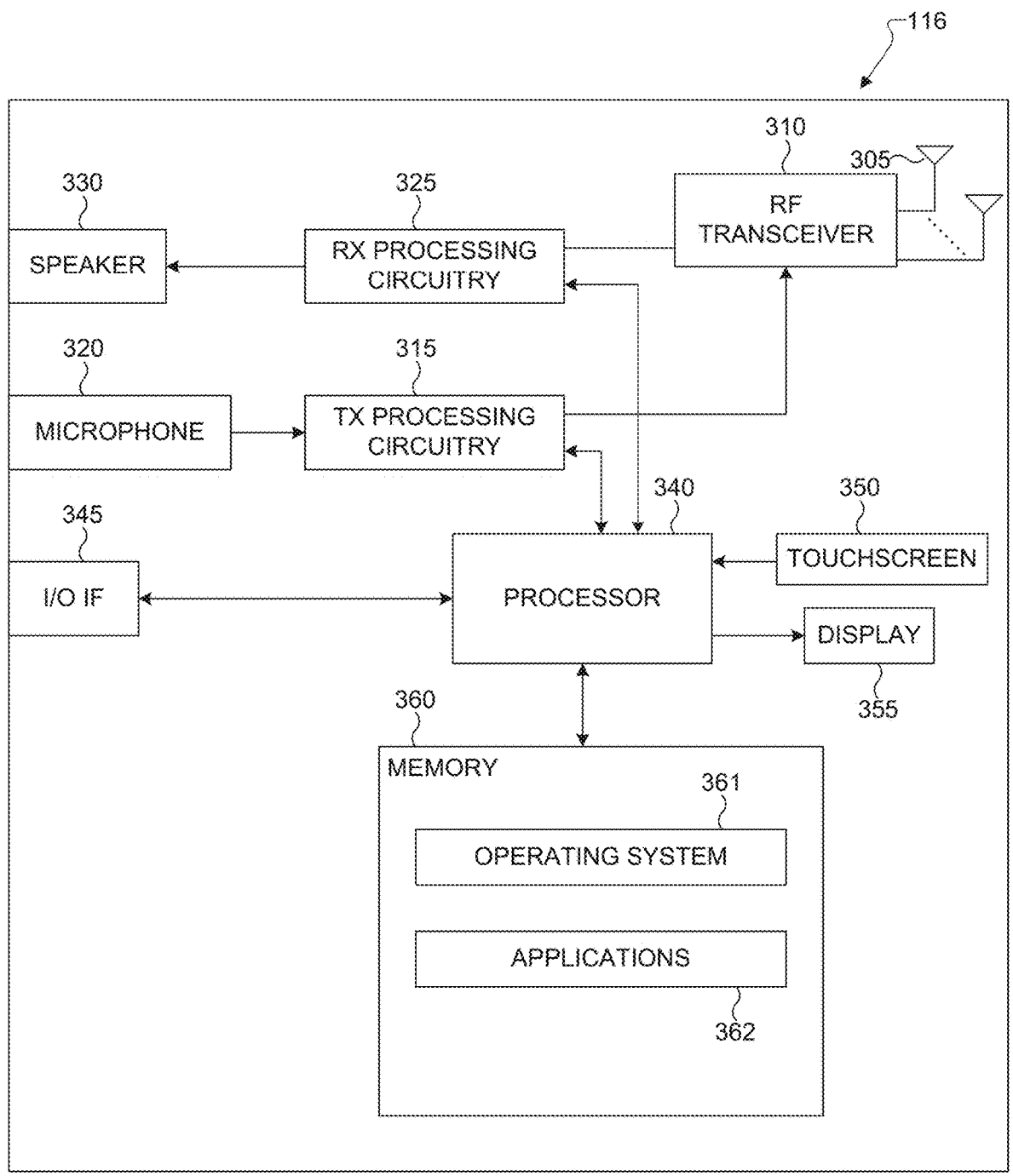
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for reception reliability for data and control information in an advanced wireless communication system. In certain embodiments, and one or more of the gNBs 101-103 includes circuitry, programming, or a combination thereof, for efficient multi-path end-to-end connectivity for cellular mesh network.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB. Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE. Depending on the network type, the term UE can refer to any component such as mobile station, subscriber station, remote terminal, wireless terminal, receive point, or user device. A UE can be a mobile device or a stationary device.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB 102 of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to enabling channel measurement and reporting for signal receptions in control resource sets (CORESETs) by a user equipment (UE) communicating with a base station. to specifying behaviors for a user equipment (UE) communicating with a base station for reception of data channels and to enhance connected mode discontinuous reception (C-DRX) by a user equipment (UE) communicating with a base station.

To meet the increased demand for wireless data services since the deployment of 4G communication systems, efforts have been made to develop an improved 5G or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beam-forming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell can include one or more symbols of a slot that includes a predetermined number of symbols, such as 14 symbols, and has predetermined duration. A bandwidth (BW) unit is referred to as a resource block (RB). One RB includes a number of sub-carriers (SCs) and one SC in one symbol of a slot is referred to as resource element (RE). For example, a slot can have duration of 1 millisecond and an RB can have a bandwidth of 180 kHz when the RB includes 12 SCs with inter-SC spacing of 15 kHz. For example, a slot can have duration of 0.25 milliseconds and an RB can have a bandwidth of 720 kHz when the RB includes 12 SCs with inter-SC spacing of 60 kHz. A slot can include symbols used for DL transmissions or for UL transmissions including symbols being used for DL transmissions or symbols being used for UL transmissions (see also REF 1).

DL signals include data signals conveying information content, control signals conveying DL control information (DCI), and reference signals (RS) that are also known as pilot signals. A gNB 102 transmits data information or DCI through respective physical DL shared channels (PDSCHs) or physical DL control channels (PDCCHs). A gNB 102 transmits one or more of multiple types of RS including channel state information RS (CSI-RS) and demodulation RS (DM-RS)—see also REF 1. A CSI-RS is primarily intended for UEs 116 to perform measurements and provide channel state information (CSI) to a gNB 102. A DM-RS is received only in the BW of a respective PDCCH or PDSCH reception and a UE 116 typically uses the DM-RS to demodulate data or control information.

UL signals also include data signals conveying information content, control signals conveying UL control information (UCI), DM-RS associated with data or UCI demodulation, sounding RS (SRS) enabling a gNB 102 to perform UL channel measurement, and a random access (RA) preamble enabling a UE 116 to perform random access (see also REF 1). A UE 116 transmits data information or UCI through a respective physical UL shared channel (PUSCH) or a physical UL control channel (PUCCH). When a UE 116 simultaneously transmits data information and UCI, the UE 116 can multiplex both in a PUSCH. UCI includes hybrid automatic repeat request acknowledgement (HARQ-ACK) information, indicating correct or incorrect detection of transport blocks (TBs) with data information in a PDSCH, scheduling request (SR) indicating whether a UE has data to transmit in its buffer, and CSI reports enabling a gNB 102 to select appropriate parameters for PDSCH or PDCCH transmissions to a UE 116 (see also REF 4). UL RS includes DM-RS and SRS. DM-RS is transmitted only in a BW of a respective PUSCH or PUCCH transmission. A gNB 102 can use a DM-RS to demodulate information in a respective PUSCH or PUCCH. SRS is transmitted by a UE 116 to provide a gNB 102 with an UL CSI and, for a TDD system, to also DL CSI. Additionally, in order to establish synchronization or an initial RRC connection with a gNB 102, a UE 116 can transmit a physical random-access channel (PRACH, see also REF 3 and REF 5). To reduce control overhead for scheduling receptions or transmission over multiple RBs, an RB group (RBG) can be used as a unit for PDSCH receptions or PUSCH transmissions where an RBG includes a predetermined number of RBs (see also REF 2 and REF 4).

DL transmissions or UL transmissions can be based on an orthogonal frequency division multiplexing (OFDM) waveform including a variant using DFT precoding that is known as DFT-spread-OFDM (see also REF 1).

Figure 4:
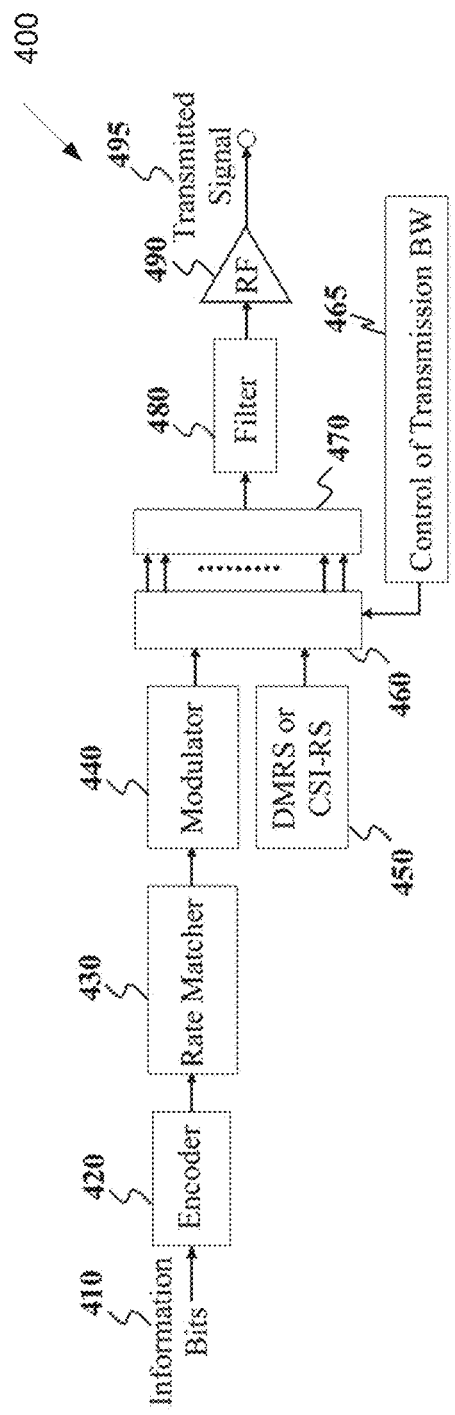
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DM-RS or CSI-RS 450 are mapped to SCs 460 by SC mapping circuit 465, an inverse fast Fourier transform (IFFT) is performed by filter 470, a cyclic prefix (CP) is added by CP insertion circuit 480, and a resulting signal is filtered by filter 490 and transmitted by an radio frequency (RF) circuit 495.

Figure 5:
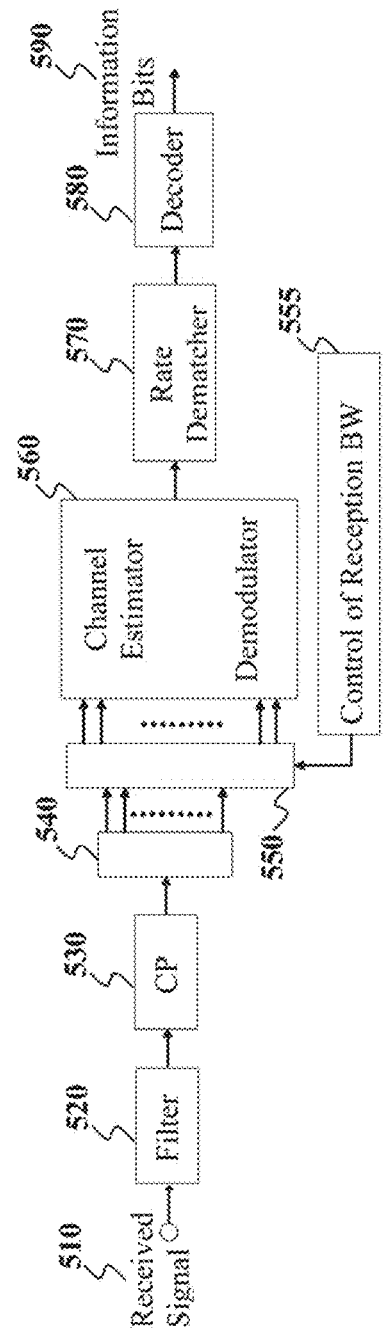
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal circuit removes a CP 530, a filter 540 applies a fast Fourier transform (FFT), SCs de-mapping circuit 550 de-maps SCs selected by BW selector circuit 555, received symbols are demodulated by a channel estimator and a demodulator circuit 560, a rate de-matcher 570 restores a rate matching, and a decoder 580 decodes the resulting bits to provide information bits 590.

A UE 116 typically monitors multiple candidate locations for respective potential PDCCH transmissions to decode multiple candidate DCI formats in a slot. Monitoring a PDCCH candidates means receiving and decoding the PDCCH candidate according to DCI formats the UE 116 is configured to receive. A DCI format includes cyclic redundancy check (CRC) bits in order for the UE 116 to confirm a correct detection of the DCI format. A DCI format type is identified by a radio network temporary identifier (RNTI) that scrambles the CRC bits. For a DCI format scheduling a PDSCH or a PUSCH to a single UE 116, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE 116 prior to a UE 116 establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE 116 through higher-layer signaling such as RRC signaling. A DCI format scheduling PDSCH transmission to a UE 116 is also referred to as DL DCI format or DL assignment while a DCI format scheduling PUSCH transmission from a UE 116 is also referred to as UL DCI format or UL grant.

A PDCCH transmission can be within a set of physical RBs (PRBs). A gNB 102 can configure a UE 116 one or more sets of PRBs, also referred to as control resource sets, for PDCCH receptions. A PDCCH transmission can be in control channel elements (CCEs) that are included in a control resource set. A UE 116 determines CCEs for a PDCCH reception based on a search space such as a UE-specific search space (USS) for PDCCH candidates with DCI format having CRC scrambled by a RNTI, such as a C-RNTI, that is configured to the UE 116 by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE 116 define a PDCCH candidate location. A property of a control resource set is transmission configuration indication (TCI) state that provides quasi co-location information of the DM-RS antenna port for PDCCH reception.

Figure 6:
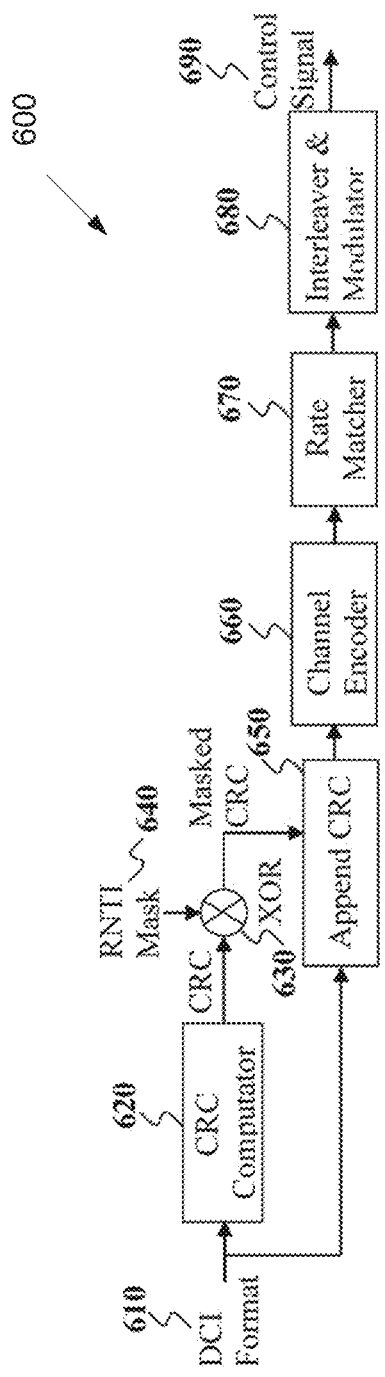
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented by specialized circuitry configured to perform the noted functions or one or more of the components can be implemented by one or more processors executing instructions to perform the noted functions. Other embodiments are used without departing from the scope of the present disclosure.

A gNB 102 separately encodes and transmits each DCI format in a respective PDCCH. A RNTI masks a CRC of the DCI format codeword in order to enable the UE 116 to identify the DCI format. For example, the CRC and the RNTI can include, for example, 16 bits or 24 bits. The CRC of (non-coded) DCI format bits 610 is determined using a CRC computation circuit 620, and the CRC is masked using an exclusive OR (XOR) operation circuit 630 between CRC bits and RNTI bits 640. The XOR operation is defined as XOR (0,0)=0, XOR (0,1)=1, XOR (1,0)=1, XOR (1,1)=0. The masked CRC bits are appended to DCI format information bits using a CRC append circuit 650. An encoder 660 performs channel coding (such as tail-biting convolutional coding or polar coding), followed by rate matching to allocated resources by rate matcher 670. Interleaving and modulation circuits 680 apply interleaving and modulation, such as QPSK, and the output control signal 690 is transmitted.

Figure 7:
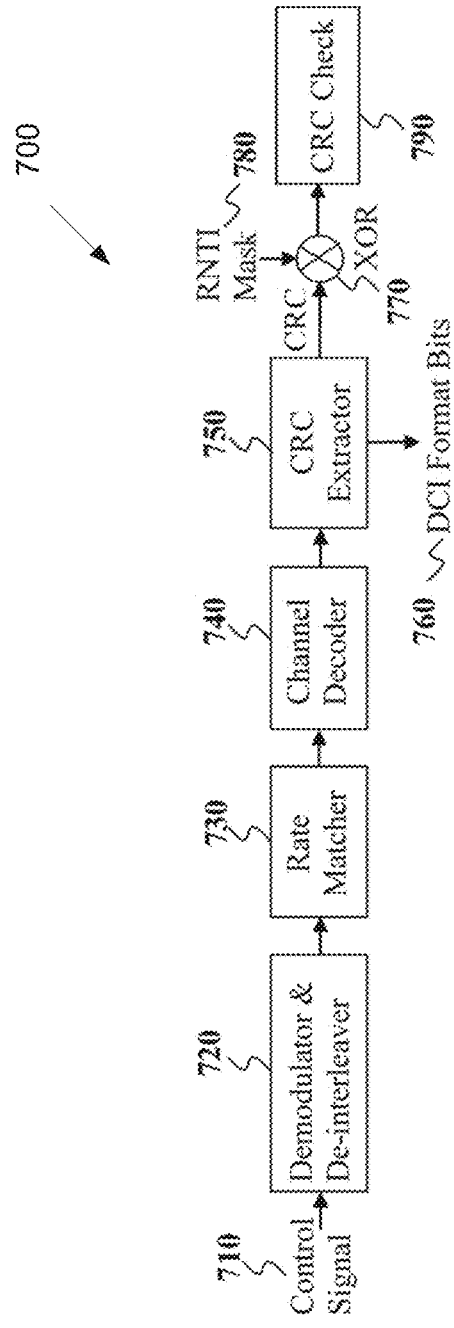
FIG. 7 illustrates an example decoding process for a DCI format for use with a UE according to embodiments of the present disclosure.

FIG. 7 illustrates an example decoding process 700 for a DCI format for use with a UE 116 according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB 102 transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by circuit 790. When the CRC check succeeds (check-sum is zero), the DCI format information bits are considered to be valid. When the CRC check does not succeed, the DCI format information bits are considered to be invalid.

For each DL bandwidth part (BWP) configured to a UE 116 in a serving cell, the UE 116 can be provided by higher layer signaling a number of CORESETs. For each CORE-SET, the UE 116 is provided (see also REF 1, REF2, and REF 3):
    a CORESET index p
    a DM-RS scrambling sequence initialization value
    a precoder granularity for a number of REGs in frequency where the UE 116 can assume use of a same DM-RS precoder
    a number of consecutive symbols
    a set of resource blocks
    CCE-to-REG mapping parameters
    an antenna port quasi co-location, from a set of antenna port quasi co-locations, indicating quasi co-location information of the DM-RS antenna port for PDCCH reception;

an indication for a presence or absence of a transmission configuration indication (TCI) field for DCI format 1_1 transmitted by a PDCCH in CORESET p.

For each DL BWP configured to a UE 116 in a serving cell, the UE 116 is provided by higher layers with a number of search space sets where, for each search space set from the number search space sets, the UE 116 is provided the following (see also REF 3):

a search space set index s an association between the search space set s and a CORESET p a PDCCH monitoring periodicity of $k_s$ slots and a PDCCH monitoring offset of $o_s$ slots a PDCCH monitoring pattern within a slot, indicating first symbol(s) of the control resource set within a slot for PDCCH monitoring a number of PDCCH candidates $M_s^{(L)}$ per CCE aggregation level L an indication that search space set s is either a common search space set or a UE-specific search space set a duration of $T_s<k_s$ slots indicating a number of slots that the search space set s exists.

For a search space set s associated with CORESET p, the CCE indexes for aggregation level L corresponding to PDCCH candidate $m_{s,n}$ of the search space set in slot $n_{s,f}^\mu$ for a serving cell corresponding to carrier indicator field value $n_{CI}$ (also referred to as search space) are given as in Equation 1:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad \text{Equation 1}$$

where for any common search space, $Y_{p,n_{s,f}^\mu}=0$; for a UE-specific search space, $Y_{p,n_{s,f}^\mu}=(A_p \cdot Y_{p,n_{s,f}^\mu-1}) \bmod D$, $Y_{p,-1}=n_{RNTI}\neq 0$, $A_p=39827$ for p mod 3=0, $A_p=39829$ for p mod 3=1, $A_p=39839$ for p mod 3=2, and D=65537; i= 0, ..., L−1; $N_{CCE,p}$ is the number of CCEs, numbered from 0 to $N_{CCE,p}-1$, in CORESET p; $n_{CI}$ is the carrier indicator field value if the UE 116 is configured with a carrier indicator field; otherwise, including for any common search space, $n_{CI}=0$; $m_{s,n_{CI}}=0, \ldots, M_{p,s,n_{CI}}^{(L)}-1$, where $M_{s,n_{CI}}^{(L)}$ is the number of PDCCH candidates the UE 116 is configured to monitor for aggregation level L for a serving cell corresponding to $n_{CI}$ and a search space set s; for any common search space, $M_{s,max}^{(L)}=M_{s,0}^{(L)}$; for a UE-specific search space, $M_{s,max}^{(L)}$ is the maximum of $M_{s,n_{CI}}^{(L)}$ across configured $n_{CI}$ values for a CCE aggregation level L of search space set s in control resource set p; the RNTI value used for $n_{RNTI}$.

A PUCCH can be transmitted according to one from multiple PUCCH formats as described in REF 1 and REF 3. A PUCCH format corresponds to a structure that is designed for a particular UCI payload range as different UCI payloads require different PUCCH transmission structures to improve an associated UCI BLER. A PUCCH transmission is also associated with a TCI state providing a spatial domain filter for a PUCCH transmission as described in REF 3 and REF 4. A PUCCH can convey HARQ-ACK information, SR, or periodic/semi-persistent CSI and their combinations.

A UE 116 can be configured for operation with multiple bandwidth parts (BWP) in a DL system BW (DL BWPs) and in an UL system BW (UL BWP) as described in REF 3. At a given time, only one DL BWP and only one UL BWP are active for the UE 116. Configurations of various parameters, such as search space set configuration for PDCCH reception or PUCCH resources for PUCCH transmission, can be separately provided for each respective BWP. A primary purpose for BWP operation is to enable power savings for the UE 116. When the UE 116 has data to transmit or receive, a large BWP can be used and, for example, search space sets can be more than one and have short monitoring periodicity. When the UE 116 does not have data to transmit or receive, a small BWP can be used and, for example, a single search space set can be configured with longer monitoring periodicity.

As described in REF 4, a UE 116 can be configured by a higher layer parameter CSI-ReportConfig with N>=1 reporting settings, and be configured by higher layer parameter CSI-ResourceConfig with M>=1 resource settings, where the links between reporting settings and resource settings are configured in a CSI measurement setting, for example by a higher layer parameter resourcesForChannelMeasurement.

Each report setting/configuration in CSI-ReportConfig is associated with a single downlink BWP given in associated CSI-ResourceConfig and describes/indicates one or more of the following:

Codebook configuration: CodebookConfig contains configuration parameters for Type-I or Type-II CSI including codebook subset restriction and configurations of group based reporting Time-domain behavior: reportConfigType can be set to 'aperiodic', 'semiPersistentOnPUCCH', 'semiPersistentOnPUSCH', or 'Periodic'.

Frequency granularity for CQI and PMI: reportFreqConfiguration indicates the reporting granularity in the frequency domain including the CSI reporting band and if PMI/CQI reporting is wideband or sub-band.

Measurement restriction configuration: timeRestrictionForChannelMeasurements/timeRestrictionForInterferenceMeasurements indicates time domain restriction for channel/interference measurements.

CSI-related quantities: reportQuantity indicates the CSI-related or L1-RSRP related quantities for a UE 116 to report.

Each resource configuration in CSI-ResourceConfig is located in the DL BWP identified by the higher layer parameter bwp-id and describes/indicates the following:

A list of S>=1 CSI resources sets provided by higher layer parameter csi-RS-ResourceSetList. The list includes references to either or both of NZP CSI-RS resource set(s) and SS/PBCH block set(s) or the list includes references to CSI-IM resource set(s).

Time-domain behavior provided by higher layer parameter resourceType and can be set to 'aperiodic', 'semi-persistent', or 'periodic'. For periodic and semi-persistent CSI resource settings, the number of CSI-RS resource sets configured is limited to S=1.

Similar to CSI-RS reception, CSI reporting can be periodic, semi-persistent, or aperiodic. In case of periodic reporting, a resource configuration also includes information about a periodically available PUCCH resource for a UE 116 to use for CSI reporting. In case of semi-persistent reporting, a UE 116 is configured with periodically occurring reporting instances in the same way as for periodic reporting. However, actual reporting can be activated or deactivated by a MAC CE. Similar to periodic reporting, semi-persistent reporting can be provided by a UE 116 on periodically assigned PUCCH resources. Alternatively, for larger CSI report payloads, semi-persistent reporting can be provided by a UE 116 on a semi-persistently allocated PUSCH. Aperiodic reporting is explicitly triggered by a DCI format. A CSI report request field in a DCI format, such as an UL DCI format, can be used to indicate to a UE 116 a CSI reporting configuration for the UE 116 to provide corresponding CSI report(s) in a PUSCH or a PUCCH. For example, a CSI report request field of 6 bits can indicate and trigger up to 63 different aperiodic CSI reports (with the 64th state indicating no triggering of a A-CSI report).

CSI reports from a UE 116 are currently aimed for enabling a serving gNB to perform link adaptation for PDSCH receptions by a UE 116, such as for selecting frequency domain resources for a PDSCH reception by the UE 116 or for selecting a modulation and coding scheme (MCS) or a number of MIMO layers for associated data information. A UE 116 does not provide a CSI report for a PDCCH reception. For a PDCCH reception in 5G/NR that occurs within a CORESET, a UE 116 can be configured multiple CORESETs for PDCCH receptions, and a PDCCH reception can experience different SINR depending on a corresponding CORESET. Link adaptation for PDCCH receptions can therefore be beneficial particularly considering that, unlike a transport block reception, a DCI format reception cannot benefit from retransmissions in order to suppress the drawbacks of inaccurate link adaptation. Moreover, for services such as ultra-reliable low latency communication (URLLC) services, a DCI format size can be in a same order of magnitude as a transport block size and link adaptation for PDCCH receptions can be as important as link adaptation for PDSCH receptions. Typically, a target BLER for a DCI format reception is different than a target BLER for a transport block reception and it may not be possible for a gNB 102 to use a CSI report for a PDSCH reception to perform link adaptation for a PDCCH reception.

According to embodiments of this disclosure channel measurement and CSI reporting in a CORESET from a UE 116 are enabled. Additionally, contents for a CSI report for a CORESET can be defined. For example, the CSI report can be used by a gNB 102 to select a CCE aggregation level, or a CORESET, or a transmission power for a PDCCH transmission to the UE 116. The CSI report can also be used by the gNB 102 to trigger an adaptation of the CORESET configuration. For example, the adaptation can include any of the CORESET parameters described in REF3 such as a precoder granularity or for a TCI state for the CORESET. The adaptation can also be for one or more search space sets associated with the CORESET such as for a number of PDCCH candidates per CCE AL including a deactivation of the search space set.

According to an embodiment of this disclosure a configuration of DL resources for measuring a channel medium associated with PDCCH reception in respective CORE-SET(s) is considered using a first approach. In the first approach, a CSI-RS as defined in REF 1, can be used for channel measurement in configured CORESET(s). The CSI-RS can be separate from a CSI-RS in resources that do not correspond to configured CORESETs such as a CSI-RS used for channel tracking or a CSI-RS used for determining a CSI report associated with a PDSCH reception. A PDCCH reception can be rate matched around CSI-RS REs. A mapping of CSI-RS REs is such that it avoids REs of DM-RS associated with PDCCH receptions. Enabling separate CSI measurements in resources corresponding to CORESETs and in resources not corresponding to CORE-SETs enables a UE 116 to separately measure respective CSIs. Those CSIs can in general be different as interference in resources corresponding to CORESETs (used for PDCCH receptions) can be different from interference in resources used for PDSCH receptions as the former can be from other PDCCH transmissions while the latter can be primarily from other PDSCH transmissions.

The UE 116 can be provided by higher layer signaling a number of NZP CSI-RS resources(s) for channel measurement and corresponding reporting in configured CORESET p. The UE 116 can assume that a NZP CSI-RS resource c, where $c=0, \ldots, N_p-1$ and $N_p \geq 1$ is a number of NZP CSI-RS resources associated with CORESET p, and a PDCCH DM-RS for a search space set associated with CORESET p are quasi co-located with respect to 'QCL-TypeD' properties, if 'QCL-TypeD' is applicable for the CORESET. The $N_p$ NZP CSI-RS resources can be used to provide a QCL resource defined for an activated TCI state for CORESET p.

The NZP CSI-RS resource c associated with channel measurements in CORESET p can 'aperiodic', 'semiPersistent', or 'periodic' as described in REF 4.

The UE 116 can determine a bandwidth $N\char`^RB\_\{c,p\}$ for NZP CSI-RS resource c associated with channel measurements in CORESET p in a unit of one RB, or in a unit of a RB group (RBG), through one or a combination of the following methods:

- In one example, $N\char`^RB\_\{c, p\}$ is provided to the UE 116 by higher layers.
- In another example, $N\char`^RB\_\{c, p\}=N\char`^RB\_p$, where $N\char`^RB\_p$ is the bandwidth of CORESET p.
- In yet another example, $N\char`^RB\_\{c, p\}=\min(N\char`^RBmax, N\char`^RB\_p)$, where $N\char`^RB\_max$ is the maximum bandwidth of NZP CSI-RS for CORESET channel measurement, such as 24 RBs, and $N\char`^RB\_p$ is the bandwidth of the associated CORESET p.
- In another example, $N\char`^RB\_\{c, p\}$ can be selected from a set of candidate values, denoted as $L\char`^BW\_\{c, p\}=\{vi\}$.
  - In one sub-example, a candidate value v_i can be determined by a number of OFDM symbols $N\char`^OS\_p$ of CORESET p. More specifically, $v\_i=N\char`^CCE\_REG/N\char`^OS\_p*L$ where $N\char`^CCE\_REG$ is a number of REG per CCE, such as $N\char`^CCE\_REG=6$, and L is the CCE aggregation level (AL) such as L=1 or 2 or 4 or 8 or 16.

The UE 116 can determine an initial common resource block (CRB) index of a CSI-RS resource c associated with channel measurement in CORESET p, denoted as $N\char`^initalRB\_\{c, p\}$, through one of the following methods:

- In one example, $N\char`^initalRB\_\{c, p\}$ is provided to the UE 116 by higher layers.
- In another example, $N\char`^initialRB\_\{c, p\}=N\char`^initialRB\_p$, if $N0\char`^InitalRB\_\{c, p\}<N\char`^initialRB\_p$; otherwise, $N\char`^RB\_\{c, p\}>N\char`^initialRB\_p+N\char`^RB\_p-N0\char`^initialRB\_\{c, p\}$. $N0\char`^InitalRB\_\{c, p\}$ is the value configured by higher layers and $N\char`^initialRB\_p$ and $N\char`^RB\_p$ are the initial CRB index and bandwidth of CORESET p.

The UE 116 can determine a configuration for monitoring periodic or semi-persistent NZP CSI-RS resource c in CORESET p by a periodicity $T\_\{c, p\}$ and a monitoring offset $O\_\{c, p\}$ in the unit of one slot through one or a combination of the following methods.

- In one example, $T\_\{c, p\}$ and $O\_\{c, p\}$ are fixed and defined in the specification of the system operation.
- In another example, $T\_\{c, p\}=1$ slot, and $O\_\{c, p\}=0$.
- In another example, $T\_\{c, p\}$ and $O\_\{c, p\}$ are provided to the UE 116 by higher layers, for example as part of the CORESET p configuration or of a NZP CSI-RS configuration for CORESET p.
- In another example, $T\_\{c, p\}$ and $O\_\{c, p\}$ are provided to the UE 116 by higher layer signaling from a serving gNB based on assistance information of preferred values for T_{c, p} and O_{c, p} provided from the UE 116 to the gNB 102.

In yet another example, fixed/default values of T_{c, p} and O_{c, p} are used if they are not provided by higher layers.

In yet another example, T_{c, p} is determined by a periodicity of search space set associated with the CORESET p.

In one sub-example, T_{c, p}=max(T_{s}), where T_{s} is the monitoring periodicity of a search space set s associated with CORESET p.

In another sub-example, T_{c, p}=αT_{s}, where T_{s} is the monitoring periodicity of a search space set s associated with CORESET p and a is a scaling factor with a value that can be predetermined, such as 1, or be provided to the UE 116 by higher layers. For example, the search space set s configuration can include the ID of NZP CSI-RS resource c.

In yet another example, O_{c, p} is determined by an offset of search space set s associated with the CORESET p.

In one sub-example, O_{c, p}=O_{s}, where O_{s} is the slot-level monitoring offset of a search space set s associated with CORESET p. For example, the search space configuration can include the ID of NZP CSI-RS resource c.

A UE 116 can determine a first OFDM symbol startOS_{c, p} within a monitoring occasion for NZP CSI-RS resource c associated with channel measurements in CORESET p through one or a combination of the following methods.

In one example, startOS_{c, p} can be fixed and defined in the specification of the system operation. For example, startOS_{c, p}=0.

In one example, startOS_{c, p} can be provided by the configuration of a NZP CSI-RS resource c.

In another example, startOS_{c, p} is provided to the UE 116 by higher layers, for example as part of the CORESET p configuration.

In another example, startOS_{c, p} is provided to the UE 116 by higher layer signaling from a serving gNB based on assistance information of a preferred value for startOS_{c, p} provided from the UE 116 to the gNB 102.

In yet another example, startOS_{c, p} is determined relative to a first search space set or a configured search space set s associated with the CORESET p.

Figure 8:
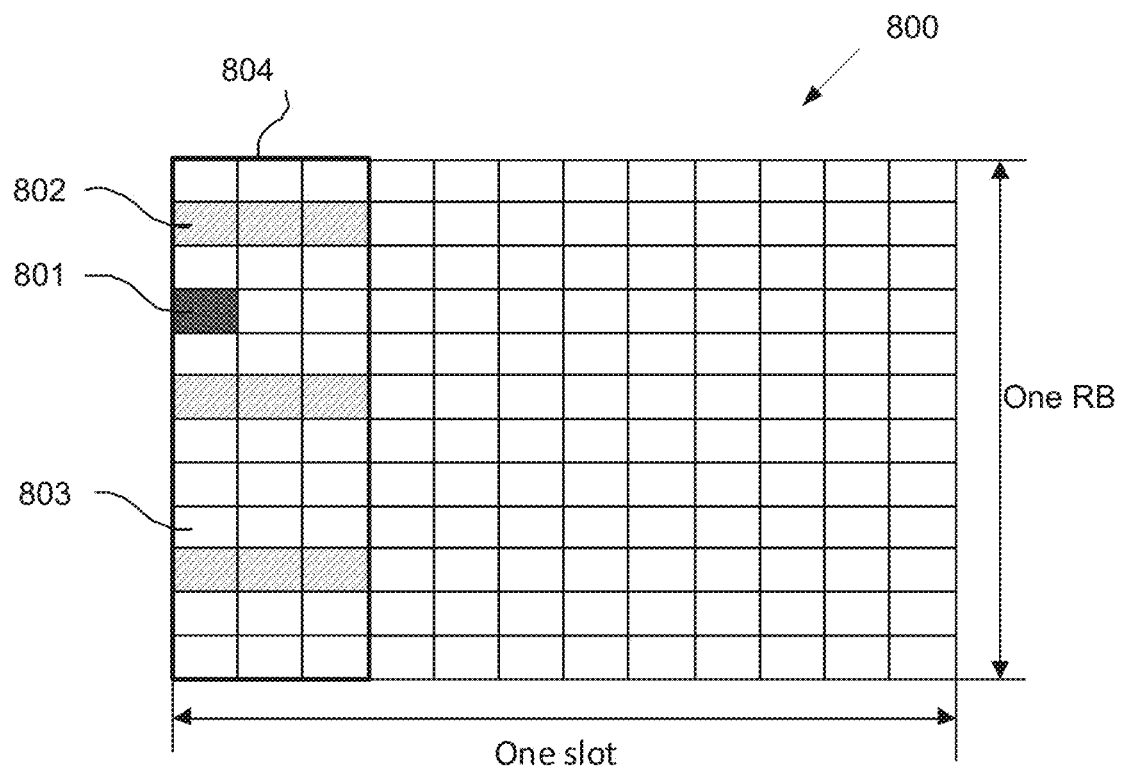
FIG. 8 illustrates a DL signal/channel within an RB/slot that includes a CSI-RS resource within a CORESET according to embodiments of the present disclosure.

In one sub-example, startOS_{c, p}=1stOS_{s}+c0, where 1stOS_{s} is the first OFDM symbol of a search space set s associated with CORESET p, and c0 is either predefined, e.g. c0=0, or provided to the UE 116 by higher layers, for example as part of the search space set configuration that can also include the ID of NZP CSI-RS resource c FIG. 8 illustrates a DL signal/channel within an RB/slot that includes a CSI-RS resource within a CORESET according to embodiments of the present disclosure. An embodiment of the DL signal/channel within an RB/slot 800 shown in FIG. 8 is for illustration only. Other embodiments are used without departing from the scope of the present disclosure.

As illustrated in FIG. 8, using higher layer signaling, a gNB 102 can configure a UE 116 with a single-port CSI-RS that consists of 1 RE per RB within a CORESET 804. PDCCH 803 reception is rate matched such that it avoids REs of PDCCH DM-RS 802 and CSI-RS 801.

According to embodiments, when NZP CSI-RS resource c associated with channel measurements in CORESET p is configured to be received within REs of CORESET p, the NZP CSI-RS can have a precoder granularity over a number of resource element groups (REGs) that is same as or different than a precoder granularity of a PDCCH DM-RS. Higher layers also indicate whether or not a DM-RS precoder granularity is over all RBs of a CORESET (wideband DM-RS). In the former case, the channel measurements can provide a channel quality indicator (CQI). In the latter case, the channel measurements can provide both a CQI and a precoding matrix indicator (PMI).

Figure 9:
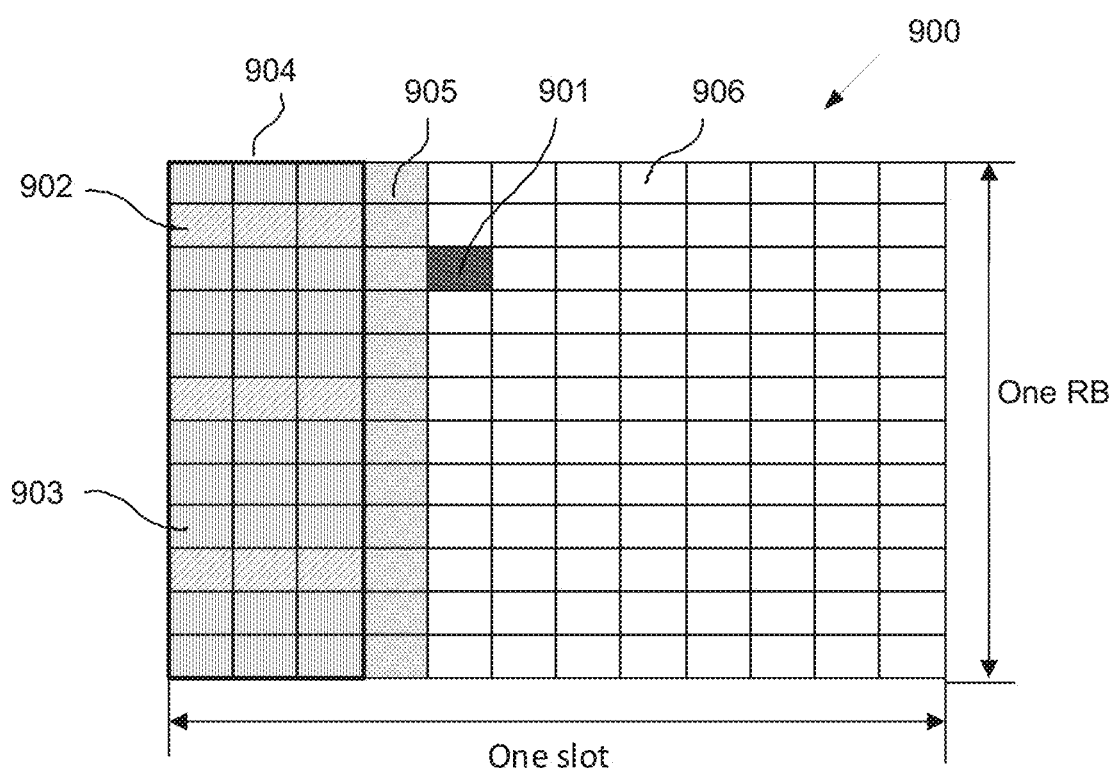
FIG. 9 illustrates a DL signal/channel within an RB/slot that includes a CSI-RS resource in non-CORESET/PDSCH resources according to embodiments of the present disclosure.

FIG. 9 illustrates a DL signal/channel within an RB/slot that includes a CSI-RS resource in non-CORESET/PDSCH resources according to embodiments of the present disclosure. An embodiment of the DL signal/channel within an RB/slot 900 shown in FIG. 9 is for illustration only. Other embodiments are used without departing from the scope of the present disclosure.

As illustrated in FIG. 9, using higher layer signaling, a gNB 102 can configure a UE 116 with a single-port CSI-RS that consists of 1 RE per RB in non-CORESET 904 or PDSCH resources. PDSCH 906 reception is rate matched such that it avoids REs of PDSCH DM-RS 905 and CSI-RS 901.

According to an embodiment of this disclosure a configuration of DL resources for measuring a channel medium associated with PDCCH reception in respective CORESET(s) is considered using a second approach. For example, the PDCCH DM-RS can have a precoder granularity over a number of resource element groups (REGs) that is provided to the UE 116 by higher layers (REG bundle). Alternatively, higher layers can indicate that a DM-RS precoder granularity is over RBs of a CORESET. In the former case, the channel measurements can provide a channel quality indicator (CQI). Channel measurements may also indicate one or more preferred REG groups (REG bundles). In the latter case, the channel measurements can provide both a CQI and a precoding matrix indicator (PMI).

Before the UE 116 performs a channel measurement based on a DM-RS associated with a PDCCH reception, the UE 116 first needs to determine whether or not there is a PDCCH reception. This determination can be based on an energy detection, for example by measuring a received signal in REs corresponding to a DM-RS reception for the candidate PDCCH. Alternatively, the UE 116 can use a DM-RS of a PDCCH reception that the UE 116 can assume in advance to exist at a respective PDCCH monitoring occasion, such as a PDCCH that includes a DCI format 2_0 providing a slot structure or a DCI format 2_2 providing transmission power control (TPC) commands as described in REF 3.

A search space set associated with PDCCH transmissions providing a DCI format 2_0 or a DCI format 2_2 is mapped to a single CORESET. However, the mapping for a search space set can be enhanced to alternate across CORESETs, for example in order for a UE 116 to obtain a CQI estimate or a CQI/PMI estimate using the DM-RS of respective PDCCHs in different CORESETs. Similar, a DM-RS precoder granularity can alternate among CORESETs according to a pattern. For example, for two CORESETs, a first CORESET can be configured a precoder granularity over a number of REGs and a second CORESET can be configured a precoder granularity over RBs of the CORESET. This configuration can apply on slots with even index and can be reversed in slots with odd index. Different CORESETs can also be associated with different TCI states and have different QCL properties for corresponding PDCCH receptions. As a number of CORESETs that can be configured to a UE 116 can be limited, a different TCI state can be associated with a same CORESET at different PDCCH monitoring occasions as determined by a search space set mapped to the CORESET.

Figure 10:
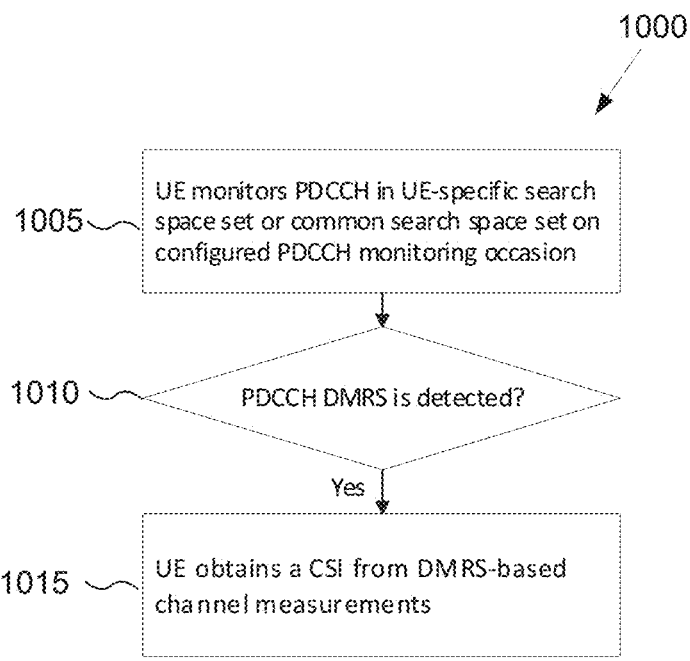
FIG. 10 illustrates a UE procedure for obtaining CSI per CORESET based on PDCCH DM-RS in a UE-specific search space set or common search space set according to embodiments of the present disclosure.

FIG. 10 illustrates a UE procedure 1000 for obtaining CSI per CORESET based on PDCCH DM-RS in a UE-specific search space set or common search space set according to embodiments of the present disclosure. An embodiment of the UE procedure 1000 shown in FIG. 10 is for illustration only. Other embodiments are used without departing from the scope of the present disclosure.

In step 1005, the UE 116 monitors PDCCH in UE-specific search space set or common search space set on configured PDCCH monitoring occasion. In step 1010, the UE 116 determines if PDCCH DM-RS is detected. If PDCCH DM-RS is detected then in step 1015, the UE 116 obtains a CSI from DM-RS-based channel measurements.

Figure 11:
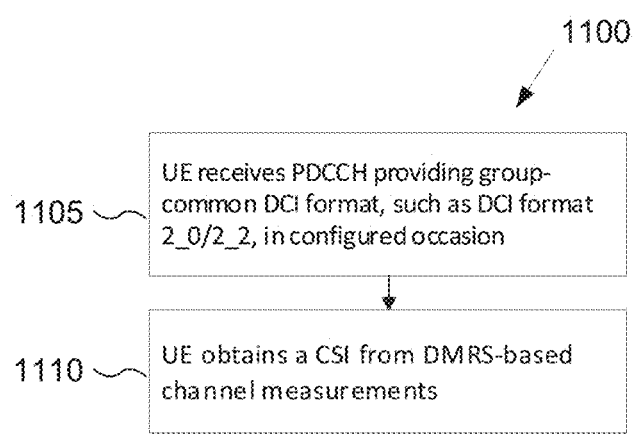
FIG. 11 illustrates a UE procedure for obtaining CSI per CORESET based on a DM-RS in a received PDCCH providing a group-common DCI format according to embodiments of the present disclosure.

FIG. 11 illustrates a UE procedure 1100 for obtaining CSI per CORESET based on a DM-RS in a received PDCCH providing a group-common DCI format according to embodiments of the present disclosure. An embodiment of the UE procedure 1100 shown in FIG. 11 is for illustration only. Other embodiments are used without departing from the scope of the present disclosure.

In step 1105, the UE 116 receives PDCCH providing group-common DCI format, such as DCI format 2_0/2_2, in configured occasion. In step 1110, the UE 116 obtains a CSI from DM-RS-based channel measurements.

In order to avoid a UE having to perform multiple DM-RS measurements at each corresponding PDCCH candidate location and avoid errors associated with potential incorrect determination of a DM-RS detection, it is also possible to restrict use of a DM-RS in a reception of a PDCCH candidate for determining a CSI only to the case that a DCI format is correctly decoded for the PDCCH candidate. Further, in order to avoid having to define how a UE combines a CSI-RS measurement and a DM-RS measurement for determining a CSI report, use of DM-RS can also be restricted only to the case that the UE does not receive a CSI-RS during the PDCCH reception that provides the DM-RS.

According to embodiments of this disclosure a UE measurement quantity associated with channel measurements per CORESET is considered. When the UE 116 uses a CSI-RS or DRMS of one or more PDCCHs for channel measurements in a CORESET, the UE 116 can measure one or more of the following:

In one example, the UE 116 measures a RS received power (RSRP). For example, the RSRP is computed as the linear average over the power contributions of the REs that provide CSI-RS or PDCCH DM-RS.

In another example, the UE 116 measures a RSRQ. For example, the RSRQ is computed as a ratio of N×CSI-RS-RSRP/RSSI or N×DM-RS-RSRP/RSSI, where N is a number of RBs in the RSSI measurement bandwidth. The measurements in the numerator and denominator are over a same set of RBs. Received Signal Strength Indicator (RSSI) comprises the linear average of a total received power observed by the UE 116 in OFDM symbols of a CSI-RS reception or of a PDCCH reception in the CORESET over N RBs.

In yet another example, the UE 116 measures a SINR. For example, for the REs providing a CSI-RS or a PDCCH DM-RS, a SINR is computed as a linear average over the power contribution divided by a linear average of the noise and interference power contribution. The measurement time resource(s) for the SINR are within the OFDM symbols of the CSI-RS reception or of the PDCCH reception (OFDM symbols of the corresponding search space set). For example, the UE 116 can use the SINR measurement to derive a CQI for PDCCH receptions in the CORESET.

According to embodiments of this disclosure a configuration of a measurement report from a UE 116 for a CORESET where the UE 116 monitors PDCCH is considered. The UE 116 can be provided with one or more report configuration(s). For example, a measurement report can be for a CSI. The CSI report can include only a CQI report, for example when the UE 116 provides a separate PMI report for a corresponding BWP for precoding of PDSCH transmissions from a serving gNB; otherwise, the CSI report can include both a CQI report and a PMI report. The UE 116 can determine a CQI value to report based on a SINR measurement. The CQI value for a PDCCH reception in a CORESET of an active BWP can be different than a CQI value for a PDSCH reception in the active BWP as a target BLER for DCI format can be different than a target BLER for a transport block. A first set of CQI values for a PDCCH reception can include a smaller number of CQI values than a second set of CQI values for a PDSCH reception. For example, the first set of CQI values does not include CQI values corresponding to modulation order of 16QAM or 64QAM, while the second set of CQI values includes CQI values corresponding to 16QAM or 64QAM, respectively.

Transmission parameters for the CSI report for a PDCCH reception in a CORESET of a BWP (PDCCH CSI report) can be configured separately from or jointly with transmission parameters for a CSI report for a PDSCH reception in the BWP (PDSCH CSI report).

A reporting type for a PDCCH CSI report can be periodic, semi-persistent, or aperiodic as defined in REF 4. For example, for periodic or semi-persistent CSI reporting and separate configurations of transmission parameters for PDCCH CSI report and PDSCH CSI report, the UE 116 can be provided a first configuration for a PDCCH CSI report transmission in a PUCCH and a second configuration for a PDSCH CSI report transmission in a PUCCH. Priority values for a PDCCH CSI report can be defined similar to the priority values for PDSCH CSI reports as described in REF 4 and, when necessary in case of time overlapping, PDCCH CSI reports or PDSCH CSI reports can be dropped according to respective priorities as described in REF 3.

For example, for an aperiodic CSI (A-CSI) report triggered by an A-CSI request field in a DCI format scheduling a PDSCH reception or a PUSCH transmission or in a UE-group common DCI format used to at least trigger A-CSI reports from one or more UEs, the A-CSI request field value can map to a configuration corresponding to only a PDCCH CSI report, or only a PDSCH CSI report, or both.

Figure 12:
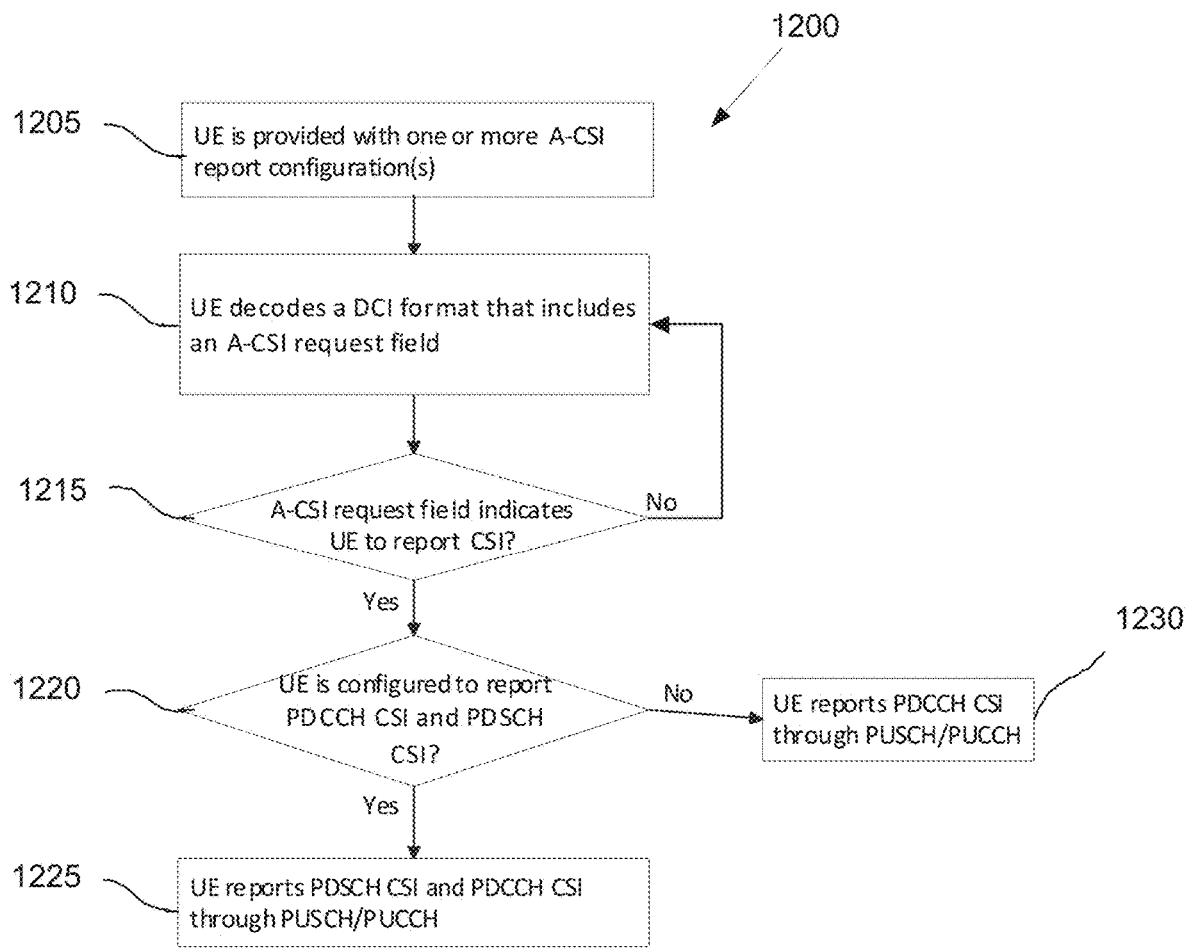
FIG. 12 illustrates a UE procedure for transmission of an aperiodic PDCCH CSI report according to embodiments of the present disclosure.

FIG. 12 illustrates a UE procedure 1200 for transmission of an aperiodic PDCCH CSI report according to embodiments of the present disclosure. An embodiment of the UE procedure 1200 shown in FIG. 12 is for illustration only. Other embodiments are used without departing from the scope of the present disclosure. While the flow chart depicts a series of sequential steps, unless explicitly state, no inference should be drawn from that sequence regarding specific order of performance, performance of steps or portions thereof serially rather than concurrently or in an overlapping manner, or performance of the steps depicted exclusively without the occurrence of intervening of intermediate steps.

In step 1205, a gNB 102 configures the UE 116, using higher layer signaling, one or more A-CSI report configuration(s). Each of the configurations can indicate one or more of the following:

Report quantities: CQI/PMI/RSRP
Respective CORESET p
PDSCH/PDCCH CSI report: 'PDCCH CSI only', 'PDSCH CSI only', 'both PDSCH and PDCCH CSI'
PUCCH transmission resources: associated with time/frequency/code domain resource allocation.

In step 1210, the UE 116 decodes a DCI format scheduling a PDSCH reception or PUSCH transmission or UE-group common DCI that includes an A-CSI request field. The A-CSI request field can be N bits and is able to indicate up to $2^{N-1}$ CSI report configurations. In step 1215, the UE 116 determines whether or not an A-CSI report is triggered. When the A-CSI request field can indicate one or more CSI reports, the UE 116 determines whether or not both PDSCH CSI report and PDCCH CSI report are triggered in step 1220. When both PDSCH CSI report and PDCCH CSI report are triggered, the UE 116 transmits both PDSCH CSI and PDCCH CSI either through a PUSCH, for example if the DCI is an UL DCI format, or a PUCCH in step 1225. When only PDCCH CSI report(s) are triggered, the UE 116 transmits PDCCH CSI report(s) either through a PUSCH or through a PUCCH in step 1230.

A PDCCH CSI report from a UE 116 can include PDCCH CSI reports for respective CORESETs corresponding to search space sets configured to the UE 116 for PDCCH monitoring or can include only a subset of the PDCCH CSI reports. For example, when a UE 116 is configured to monitor PDCCH for search space sets associated with 3 different CORESETs, the UE 116 can provide a CSI report for CORESETs or for the one or two CORESETs that the respective CSI report(s) have the largest CQI values. The number of CSI reports (size of the subset) can be configured to the UE 116 by higher layers. The UE 116 can also include an indication of the CORESETs with the selected CSI reports, for example by using combinatorial indexing.

A PDCCH CSI report from a UE can include CSI measured from more than one CSI-RS resources, for PDCCH reception in a CORESET, p. The CORESET is configured with a set of TCI states, wherein each of the TCI state indicates a set of QCL properties between the CORESET and a CSI-RS resource. When more than one CSI-RS resources are configured for a PDCCH CSI report for a CORESET, the UE can report CSI measured from all the CSI-RS resources or for the one or two CSI-RS resources that the respective CSI have the largest CQI value(s). The number of CSI-RS resources with CSI to report can be either fixed, e.g. 1 or configured to the UE by higher layers. The UE can also include an indication of the CSI-RS resource(s) with the selected CSI, for example by using combinatorial indexing.

UE CSI computation time for a PDCCH CSI report can be defined similar to UE CSI computation time for PDSCH CSI reports as described in REF 4.

According to embodiments this disclosure contents for a PDCCH CSI report are considered. For example, a PDCCH CSI report can include a CQI value. According to embodiments of this disclosure there are several alternatives for the CQI value. In a first alternative, a CQI value is a smallest CCE aggregation level for a PDCCH reception that the UE 116 can detect a DCI format with a target BLER. In one example, the DCI format is predetermined in the system operation or is provided to the UE 116 by higher layers and can be a DCI format that the UE 116 is configured to monitor in an active DL BWP, such as a DCI format 1_1 or a DCI format 0_1 as described in REF2. In another example, the DCI format is a virtual DCI format and a corresponding size (with or without CRC) is predetermined in the system operation or is configured to the UE 116 by higher layers such as for example a DCI format size of 60 bits. In one example, the target BLER is configured to the UE 116 by higher layers. In another example, the target BLER is predetermined in the system operation such as a target BLER of 0.01.

In a second alternative, a CQI value provides an entry to a Table where the entry is mapped to a modulation scheme and a code rate, similar to a CQI value for a PDSCH reception as described in REF 4. As a target BLER for a DCI format can be different than a target BLER for a transport block, a separate Table for PDCCH CSI report CQI values can be provided/defined. The Table can include a subset of the modulation schemes such as only QPSK (then the modulation scheme does not need to be part of the Table) or only QPSK and 16QAM.

In a third alternative, a CQI value in a PDCCH CSI report is provided only for a first CORESET, for example according to the first alternative or the second alternative, and a CQI value for each of the remaining CORESETs can be differential (an offset) to the CQI value of the first CORESET. The first CORESET can be the one with a lowest index in the active DL BWP, or the one with the largest (or smallest, or intermediate) CQI value (then the UE 116 also indicates the CORESET index), or configured to the UE 116 by higher layers.

In a fourth alternative, a CQI value for a CORESET can be a binary indication for whether or not a UE 116 prefers to receive PDCCH in the CORESET. For example, when a UE 116 experiences low SINR in a CORESET, the UE 116 can indicate that the UE 116 prefers to not receive PDCCH in the CORESET. For example, the UE 116 can be configured a SINR threshold and if the SINR in a CORESET is smaller than the SINR threshold, the UE 116 can indicate that the UE 116 does not prefer to receive PDCCH in the CORESET.

A serving gNB can also configure a UE to monitor DCI formats with different target BLERs. For example, a first DCI format can have a target BLER of 0.01 and a second DCI format can have a target BLER of 0.00001. In such case, the gNB can configure the UE to provide a separate CSI report for the first DCI format and for the second DCI format. The CSI report for the second DCI format can include only a CQI report as a PMI report can be common to both the first DCI format and the second DCI format. In a first example, the gNB can also configure the UE, for example using higher layer signaling such as a MAC control element or RRC signaling, a reference BLER for the first CQI report and a reference BLER for the second CQI report. In a second example, a set of MCS tables for CQI reports for PDCCH receptions corresponding to different BLERs can be defined in the specifications of the system operation and the gNB can provide to the UE a first index for a first MCS table for the first CQI report for the first DCI format and a second index for a second MCS table for the second CQI report for the second DCI format. The second CQI report can be an entry to the second MCS table or can be an offset to an entry to the first MCS table that is provided by the first CQI report. For example, an index can be provided as part of a search space set configuration for a corresponding DCI format. For example, an index can be determined by the UE based when a priority indicator field is included in a DCI format configured for the UE. Alternatively, the UE can provide such offset in advance and the UE can then provide only a CQI report for the first DCI format. The offset can be for a target BLER the gNB indicates to the UE.

A CSI report by the UE 116 can include a PMI report for each CORESET or a PMI report can be omitted in case a serving gNB can derive the PMI for CORESETs in an active DL BWP from a PMI report associated with PDSCH transmissions in the active DL BWP or, in case of TDD systems, by a SRS transmission from the UE 116. Similar to a CSI report, a configuration for an SRS transmission from the UE 116 can be in bandwidth that substantially includes a bandwidth of one or more CORESETs associated with search space sets for the UE 116. When the UE 116 is configured to include a PMI report for a CORESET in a CSI report, the PMI report can include a wideband PMI for the CORESET when the precoder granularity configuration for the CORESET includes RBs of the CORESET; otherwise, the PMI report can include a PMI for REG bundles, for REG bundles selected by the UE 116, or for a predetermined/configured set of REG bundles such as for 4 REG bundles that are equally spaced among the REG bundles for the CORESET.

According to embodiments of this disclosure an adaptation on CORESETs that a UE 116 uses to monitor PDCCH through a DCI format is considered. The associated search space sets can be search space sets or only search space sets associated with a UE-specific search space.

For example, a serving gNB can activate/deactivate search space sets, and corresponding CORESETs, where the UE 116 receives PDCCH. In a first approach, a DCI format indicates search space sets for monitoring PDCCH in CORESET p. For example, the indication can be through a search space set indicator bitmap of $N_{SS}$ bits, where $N_{SS}$ is a number of search spaces sets with non-zero PDCCH candidates configured to the UE 116 and a binary value of '1' in the bitmap indicates to the UE 116, for example, to not monitor the associated search space set. In a second approach, in order to reduce a DCI format overhead as a number of search space sets is typically larger than a number of CORESETs for a UE 116, a DCI format indicates CORESETs for monitoring PDCCH. For example, the indication can be through a CORESET indicator bitmap of $N_{CS}$ bits, where $N_{CS}$ is a number of CORESETs, and the indication procedure is similar to that for indication of search space sets according to the first approach.

In another example, a serving gNB can activate/deactivate CCE aggregation levels (enable/disable monitoring of associated PDCCH candidates) by indicating through a DCI format CCE aggregation levels (ALs) that a UE 116 uses to monitor PDCCH. The indication can be by a bitmap where each bit in the bitmap indicates whether or not the UE 116 uses a corresponding subset of CCE ALs to monitor PDCCH. The mapping between each bit in the bitmap and the associated subset of CCE ALs can be provided to the UE 116 by higher layers or have a one-to-one correspondence with CCE ALs according to their ascending or descending order.

In another example, a serving gNB can activate/deactivate monitoring of DCI formats by indicating, through a DCI format, a subset of DCI formats that the UE 116 is configured to monitor in search space sets associated with the CORESET. For example, the DCI format can include a bitmap indicating whether or not a UE 116 can monitor only DCI format 0_0/0_1 in associated UE-specific search spaces sets. The indication can be per size of DCI formats that the UE 116 is configured to monitor for corresponding search space sets mapping to a CORESET. This can allow enabling/disabling multiple search space sets where a UE 116 is configured to monitor PDCCH for DCI formats with same size with a single-bit indication.

The DCI format performing one of the aforementioned examples can be transmitted using a predetermined search space set, for example a search space set with a lowest index or a search space set with a lowest index that is also associated with a CORESET where a DM-RS precoding is over RBs of the CORESET. The fields of a DCI format can also depend on a search space set associated with the DCI format. For example, a field indicating search space sets for a UE 116 to monitor is included in a DCI format associated with a first search space set and is not included in the DCI format associated with a second search space set.

Figure 13:
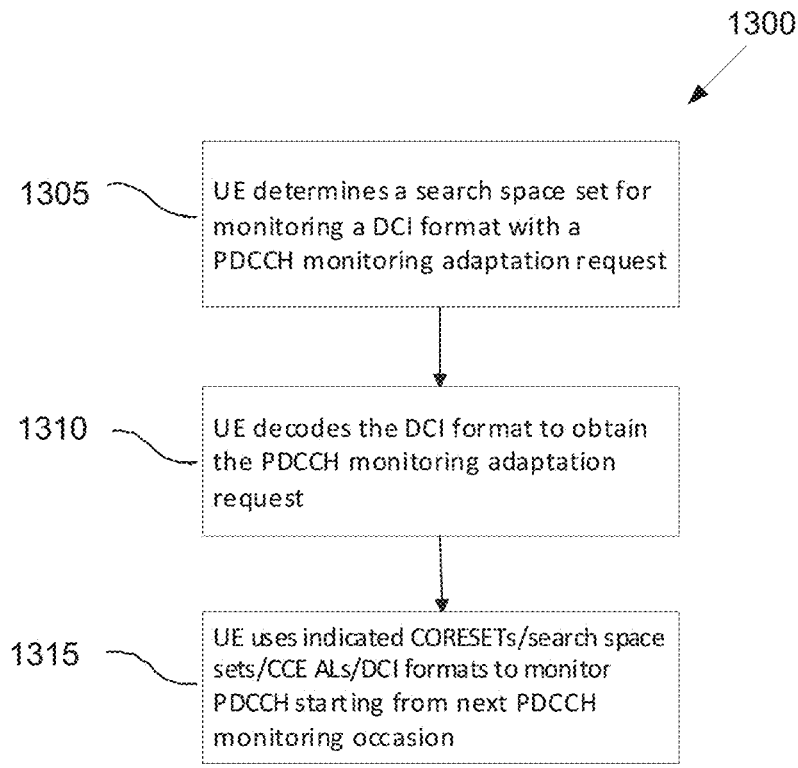
FIG. 13 illustrates a UE procedure for adaptation for PDCCH monitoring adaptation on CORESET p according to embodiments of the present disclosure.

FIG. 13 illustrates a UE procedure 1300 for adaptation for PDCCH monitoring adaptation on CORESET p according to embodiments of the present disclosure. An embodiment of the UE procedure 1300 shown in FIG. 13 is for illustration only. Other embodiments are used without departing from the scope of the present disclosure.

In step 1305, a UE 116 is provided with a predetermined search space set for monitoring a DCI format providing an adaptation request on CORESET p. For example, the search space set index can be the one with the lowest index associated with CORESET p. In step 1310, the UE 116 decodes the DCI format in the predetermined search space set to obtain an adaptation request on selected search space sets/CCE ALs/DCI formats for monitoring PDCCH. In step 1315, the UE 116 uses indicated search space sets/CCE ALs/DCI formats to monitor PDCCH in associated CORESET p starting from a next PDCCH monitoring occasion.

Figure 14:
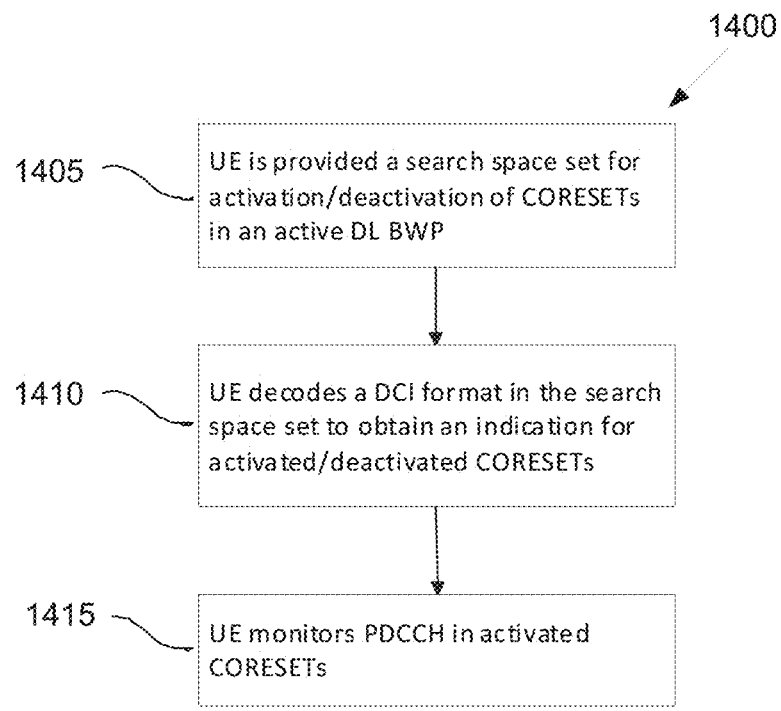
FIG. 14 illustrates a UE procedure for adaptation of PDCCH monitoring on respective CORESETs in an active DL BWP according to embodiments of the present disclosure.

FIG. 14 illustrates a UE procedure 1400 for adaptation of PDCCH monitoring on respective CORESETs in an active DL BWP according to embodiments of the present disclosure. An embodiment of the UE procedure 1400 shown in FIG. 14 is for illustration only. Other embodiments are used without departing from the scope of the present disclosure.

In step 1405, the UE 116 is provided with a predetermined search space set for activation/deactivation of respective CORESETs in associated active DL BWP. For example, the search space set index can be the one with the lowest index associated with a CORESET. In step 1410, the UE 116 decodes a DCI format in the predetermined search space set to obtain an indication for CORESETs to monitor PDCCH in the active DL BW. In step, 1415, the UE 116 uses the indicated CORESETs to monitor PDCCH in the active DL BWP starting, for example, from a next PDCCH monitoring occasion.

According to embodiments of this disclosure behaviors for a user equipment (UE) communicating with a base station for reception of data channels are specified. PDCCH monitoring is the main factor for increased UE power consumption and avoiding use of PDCCH for dynamic PDSCH/PUSCH scheduling, whenever instantaneous link adaptation is not needed, can offer large power saving gains. For example, grant-free transmission for PUSCH is better than grant-based one for reduced UE power consumption. The power saving gain of grant-free PUSCH comes from at least two aspects—no PDCCH monitoring and no PUCCH transmission for SR. Likewise, to reduce UE power consumption, transmissions/receptions (e.g., PDSCH, PUSCH, measurement, reporting, etc.) can be semi-statically configured, when possible, so that the UE 116 does not need to monitor PDCCH.

For example, the UE 116 can be is configured with maximum MIMO layers in BWPs of the serving cell by RRC parameter, i.e. maxMIMO-Layers in PDSCH-Serving-CellConfig or PUSCH-ServingCellConfig. The RX antennas/ports for PDSCH reception or CSI measurement should consider maximum MIMO layer across configured BWPs. In order to save power consumption, the UE 116 can be configured with maximum MIMO layer per BWP and perform dynamic adaptation on maximum MIMO layers based on BWP switching. A gNB 102 can trigger adaptation on maximum MIMO layers according to the reported RI. For example, when the UE reports RI of 2, the UE 116 can be triggered from a BWP with maximum MIMO layers of 8 to a BWP with maximum MIMO layer of 2. The UE 116 can reduce the RX ports/antennas accordingly for power saving benefit.

According to embodiments of this disclosure dynamic PDSCH reception at UE 116 side without blind decoding of PDCCH is supported and adaptation on maximum MIMO layer based on BWP switching is supported.

According to embodiments of this disclosure use of a power saving signal (PoSS) carrying information of 1 bit, denoted as PoSS-PDSCH, for indication of PDSCH transmission(s) to a UE 116 or a group of UEs is considered. Each associated UE 116 is configured by higher layer to monitor the PoSS-PDSCH and is also configured with parameters associated with PoSS reception such as time-frequency resources. A UE 116 can be configured to monitor the PoSS-PDSCH periodically. For example, denoting by I^PDSCH_on the 1 bit of information carried by the PoSS-PDSCH, if I^PDSCH_on=1, the PoSS-PDSCH indicates that there is at least one PDSCH transmission to associated UE(s) 116 within the PoSS-PDSCH monitoring period. If I^PDSCH_on=0, the PoSS-PDSCH indicates that there is no PDSCH transmission to associated UE(s) 116 within the PoSS-PDSCH monitoring period.

For UE power saving purposes, the PoSS-PDSCH can be constructed from a reference sequence with low reception and detection complexity. A serving gNB can transmit the PoSS-PDSCH on-demand, e.g. based on the incoming traffic of associated UE(s) 116.

The UE 116 can determine a configuration for monitoring PoSS-PDSCH by a periodicity of PoSS-PDSCH transmission, denoted as T^PoSS-PDSCH, and a PoSS-PDSCH monitoring offset, denoted as O^PoSS-PDSCH, through one or a combination of the following methods.

In one example, T^PoSS-PDSCH and O^PoSS-PDSCH are fixed and defined in the specification of the system operation. For example, T^PoSS-PDSCH=1 slot, and O^PoSS-PDSCH=0.

In another example, T^PoSS-PDSCH and O^PoSS-PDSCH are provided to the UE 116 through higher layer signaling.

In another example, T^PoSS-PDSCH and O^PoSS-PDSCH are provided to the UE 116 by higher layer signaling from a serving gNB based on assistance information of preferred values for T^PoSS-PDSCH and O^PoSS-PDSCH provided from the UE 116 to the gNB 102.

In yet another example, fixed/default values of T^PoSS-PDSCH and/or O^PoSS-PDSCH are used if they are not provided by higher layers.

In yet another example, O^PoSS-PDSCH, can be determined by the UE ID, denoted as I^UE, such that O^PoSS-PDSCH=mod(I^UE,N1)*k1, where 0<N1<T^PoSS-PDSCH and k1 either predetermined by the system operation or provided to UE 116 by higher layer, e.g. k1=1, N1=2.

The UE 116 can determine a configuration of frequency domain (bandwidth) PoSS-PDSCH resources, denoted as BW^PoSS-PDSCH_RB, in the unit of one RB and a configuration of the PoSS-PDSCH duration, denoted as N^PoSS-PDSCH_OS, in the unit of an OFDM symbol, through one or a combination of the following methods.

In one example, BW^PoSS-PDSCH_RB and N^PoSS-PDSCH_OS are fixed and defined in the specifications of the system operation. For example, BW^PoSS-PD=24 RBs, and N^PoSS-PDSCH_OS=2.

In another example, BW^PoSS-PDSCH_RB and N^PoSS-PDSCH_OS can be provided to the UE 116 through higher layer signaling.

In another example, BW^PoSS-PDSCH_RB and N^PoSS-PDSCH_OS are provided to the UE 116 by higher layer signaling from a serving gNB based on assistance information of preferred values for BW^PoSS-PDSCH_RB and N^PoSS-PDSCH_OS provided from the UE 116 to the gNB 102.

When T^PoSS-PDSCH and O^PoSS-PDSCH are configured in the unit of one slot, the start OFDM symbol of PoSS-PDSCH, denoted as startOS^PoSS-PDSCH, can be configured to UE 116 through one of the following approaches:

In one example, startOS^PoSS-PDSCH is fixed and defined in the specification of the system operation. For example, startOS^PoSS-PDSCH=0.

In another example, startOS^PoSS-PDSCH is provided to the UE 116 through higher layer signaling.

In another example, startOS^PoSS-PDSCH is provided to the UE 116 by higher layer signaling from a serving gNB based on assistance information of preferred values for startOS^PoSS-PDSCH provided from the UE 116 to the gNB 102.

In yet another example, fixed/default values of startOS^PoSS-PDSCH is used if they are not provided by higher layers.

In yet another example, startOS^PoSS-PDSCH can be determined by the UE ID, denoted as I^UE, such that startOS^PoSS-PDSCH=mod(floor(I^UE/N1),N2)*k2, where N2, and k2 are either predetermined by the system operation or provided to UE 116 by higher layer, e.g. N2=2, k2=N^PoSS-PDSCH_OS. N1 is the system parameter associated with O^PoSS-PDSCH configuration if supported, otherwise N2=1.

The UE 116 can determine a configuration of start RB of PoSS-PDSCH relative to the start of associated active BWP, denoted as startRB^PoSS-PDSCH, through one or a combination of the following methods.

In one example, startRB^PoSS-PDSCH is fixed and defined in the specifications of the system operation. For example, startRB^PoSS-PDSCH=0.

In another example, startRB^PoSS-PDSCH can be provided to the UE 116 through higher layer signaling.

In another example, startRB^PoSS-PDSCH is provided to the UE 116 by higher layer signaling from a serving gNB based on assistance information of preferred values for startRB^PoSS-PDSCH provided from the UE 116 to the gNB 102.

In yet another example, startRB^PoSS-PDSCH can be determined by the UE ID, denoted as I^UE, such that startOS^PoSS-PDSCH=mod(floor(I^UE/(N1*N2)), N3)*k3, where N3 and k3 are either predetermined by the system operation or provided to UE 116 by higher layer, e.g. N3=4, k3=BW^PoSS-PDSCH_RB. N1 and N2 are the system parameter associated with O^PoSS-PDSCH and startOS^PoSS-PDSCH configuration if supported, otherwise N1=1, N2=1.

The UE 116 can determine a quasi co-located (QCL) assumption between an antenna port associated with PoSS- PDSCH reception and a De-Modulation Reference Signal (DM-RS) antenna port associated with a SS/PBCH reception, or a DL-RS, such as a CSI-RS, reception or DM-RS antenna port associated with a PDSCH reception, from one or a combination of the following examples Example 1: The UE 116 assumes an antenna port associated with a reception of PoSS-PDSCH to be QCLed with a DM-RS antenna port associated with a PDSCH reception.

Example 2: The UE 116 assumes an antenna port associated with a reception of PoSS-PDSCH to be QCLed with a DM-RS antenna port associated with a SS/PBCH reception, wherein the DM-RS antenna port associated with the DM-RS antenna port for SS/PBCH reception can be further assumed to be QCLed with the DM-RS antenna port associated with a PDSCH reception.

For the UE ID, i.e. I_UE:

In one example, $0 <= I\_UE < 2^{16}$, can be provided to a UE 116 by a serving gNB through higher layer signaling.

In another example, $I\_UE = \mathrm{mod}(C\text{-}RNTI, c)$, where c is a constant, e.g. c=1024.

A sequence constructing PoSS-PDSCH can be generated from a pseudo-random (PN) sequence. For example, the sequence of PoSS-PDSCH can be defined by $r^{PoSS\text{-}PDSCH}(m) = 1/\mathrm{sqrt}(2)(1-2 \cdot c(2m)) + j1/\mathrm{sqrt}(2)(1-2 \cdot c(2m+1))$, $m=0, \ldots, N^{PoSS\text{-}PDSCH}/2-1$, where $N^{PoSS\text{-}PDSCH}$ is the length of PN sequence c(i) per OFDM symbol and c(i) is defined in clause 5.2.1 of REF1. $N^{PoSS\text{-}PDSCH}$ can be derived from the assigned subcarriers of PoSS-PDSCH in frequency domain, such that $N^{PoSS\text{-}PDSCH} = 2 \cdot N\_PoSS\text{-}PDSCH\_RB \cdot N^{RB}\_SCs$, where $N\_PoSS\text{-}PDSCH\_RB$ is the BW of PoSS-PDSCH and $N^{RB}\_SC$ is a number of subcarriers per RB. The PN sequence generator is initialized with c_init. The initial condition can be associated with or determined by the UE ID, i.e. I^UE, for the UE 116 and the timing information, such as the slot index, denoted as $n_{s,f}^\mu$ and OFDM symbol index, denoted as 1. In one example, $$c\_init = \left(c1(14\, n_{s,f}^u + 1 + 1)\left(c2 \cdot \mathrm{floor}\left(I^{\frac{UE}{(N_1 * N_2 * N_3)}}\right) + 1\right) + c3 \cdot \mathrm{floor}\left(I^{\frac{UE}{(N_1 * N_2 * N_3)}}\right) + c4\right) \mathrm{mod}\, 2^{31},$$

where c1, c2, c3, c4 are constants. N1, N2, N3 are system parameters associated with startRB^PoSS-PDSCH, O^PoSS-PDSCH and startOS^PoSS-PDSCH configuration if supported, otherwise, N1=1, N2=1, N3=1, respectively. For example, $c1=2^{17}$, c2=2, c3=2, c4=0.

The PoSS-PDSCH sequence, r^PoSS-PDSCH(m), can be mapped to resource elements (k,l) in sequence, starting with r^PoSS-PDSCH(0) in increasing order of first the index k=0, ..., N_PoSS-PDSCH/2-1, over the assigned subcarriers and then the index, l=0, ..., N^PoSS-PDSCH_OS−1, per every assigned OFDM symbols with index l.

According to embodiments of this disclosure a DM-RS of a PDSCH reception provides DL control information (DCI) for the PDSCH reception is considered. The DCI can include information for the PDSCH resource allocation and/or information for the transport block in the PDSCH such as an MCS index or a HARQ process number. In the following, DCI is denoted as I_DCI and comprises of N_DCI bits. In one approach considered, the N_DCI bits of the DCI are indicated/carried by the DM-RS of PDSCH so that UE 116 can save energy by skipping PDCCH monitoring/decoding.

The sequence generation of PDSCH DM-RS with DCI can be defined by $$r^{DM\text{-}RS\text{-}DCI}(m) = \frac{1}{\sqrt{2}}(1 - 2c(2m)) + j\frac{1}{\sqrt{2}}(1 - 2c(2m+1)),\; m = 0, \ldots, N^{DM\text{-}RS\text{-}DCI/(2-1)}$$

where N^DM-RS-DCI is the length of PN sequence c(i) per OFDM symbol, and c(i) is defined in clause 5.2.1 in REF1. The length of PDSCH DM-RS with DCI, N^DM-RS-DCI, can be derived from the PDSCH BW such that N^DM-RS-DCI=N^PDSCH_RBs*N^RB_SC, wherein N^PDSCH is the PDSCH BW and N^RB_SC is the number of subcarriers per RB.

The PN sequence generator for PDSCH DM-RS with DCI can be initialized with c_init. The initial condition can be associated with or determined by DCI for PDSCH reception, I_DCI, and/or the UE group ID, I^UE_group, and the timing information, such as the slot index, denoted as $n_{s,f}^\mu$, and OFDM symbol index, denoted as 1. The initial condition can be derived according to one of the following.

In one example, c_init=c1(I_DCI+1)(floor(I^UE_group/c3)+1)+c2(I_DCI+1)+mod(I^UE_group, c3), where c1, c2, c3 are constants, e.g. $c1=2^{11}$, $c2=2^6$, c3=4.

In another example, c_init=(c1(14·$n_{s,f}^\mu$+1+1)(c2· I^UE_group+c3·I_DCI+1)+c2· I^UE_group+c3·I_DCI+1) mod $2^{31}$, where c1, c2, c3 are constants, e.g. $c1=2^{17}$, $c2=2^3$, c3=1.

The PoSS-PDSCH sequence defined in previous session can be used as demodulation reference sequence to decode DM-RS based DCI.

The DCI carried in PDSCH DM-RS, I_DCI, can indicate a row index to a predefined DCI table where the DCI table consists of columns selected that include values for one or more of the following fields:

Time domain resource assignment
VRB-to-PRB mapping
Modulation and coding scheme
New data indicator
Redundancy version
HARQ process number
Downlink assignment index
TPC command for PUCCH transmission with HARQ-ACK information
PUCCH resource indicator
PDSCH-to-HARQ-ACK feedback timing indicator
PRB bundling size indicator
Rate matching indicator
ZP CSI-RS Trigger PDSCH reception parameters not included in the predefined table can be provided to the UE 116 through higher layer signaling.

According to embodiments of the present disclosure, a UE procedure for reception of a triggered PDSCH transmission without an associated PDCCH is considered.

Figure 15:
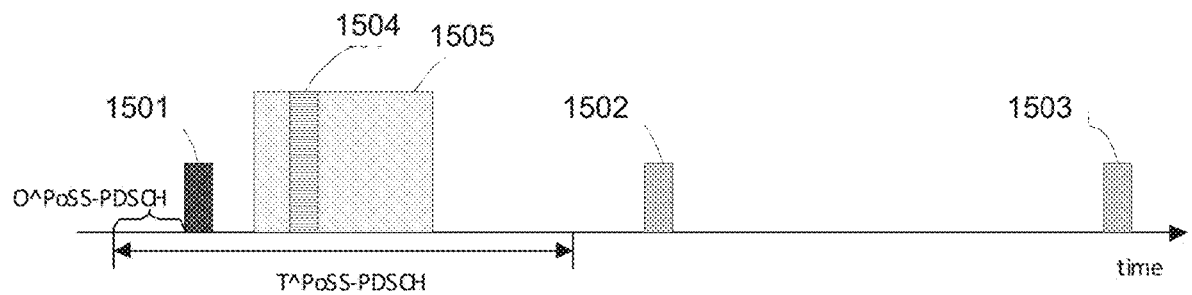
FIG. 15 illustrates the PDSCH reception by a UE according to embodiments of the present disclosure.

FIG. 15 illustrates the PDSCH reception by a UE 116 according to embodiments of the present disclosure. An embodiment of the PDSCH reception shown in FIG. 15 is for illustration only. Other embodiments are used without departing from the scope of the present disclosure.

Referring to FIG. 15 power saving signal monitoring occasions at the UE 1501-1503 are illustrated. A first occasion 1501 indicates a PDSCH reception within the associated monitoring period. Occasions 1502-1503 indicate no PDSCH reception in the associated monitoring periods. The PDSCH DM-RS that can carry a few bits of DCI 1504 occurs in the PDSCH 1505.

Figure 16:
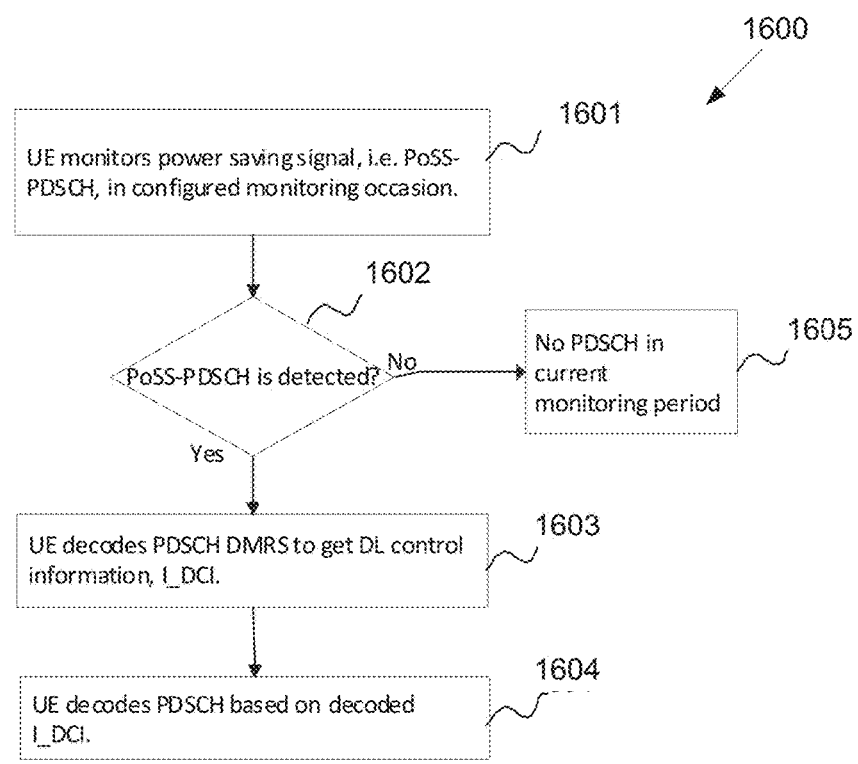
FIG. 16 illustrates an example procedure of PDSCH reception in a power saving signal monitoring period according to embodiments of the present disclosure.

FIG. 16 illustrates an example procedure 1600 for triggered PDSCH reception without PDCCH monitoring/decoding by a UE 116 according to embodiments of the present disclosure. An embodiment of the procedure 1600 shown in FIG. 16 is for illustration only. Other embodiments are used without departing from the scope of the present disclosure.

In step 1601, for each power saving signal monitoring occasion with slot index, x, such that mod(x, $T^{\wedge}PoSS$-PDSCH)=$O^{\wedge}PoSS$-PDSCH, the UE 116 decodes the RS based power saving signal for dynamic indication of PDSCH reception, i.e. PoSS-PDSCH. In step 1602, the UE 116 then determines whether or not the UE 116 detects a PoSS-PDSCH. The PoSS-PDSCH is transmitted by gNB 102 on-demand. In step 1603, if the UE 116 detects a PoSS-PDSCH, the UE 116 decodes the configured PDSCH DM-RS to obtain DCI associated with PDSCH reception, i.e. I_DCI. The detected DM-RS-based PoSS-PDSCH can be used as a reference sequence for channel estimation. In step 1604, the UE 116 decodes PDSCH scheduled by the DCI in I_DCI. In step 1605, when the UE 116 does not detect a PoSS-PDSCH, the UE 116 assumes there is no PDSCH in current PoSS-PDSCH monitoring period, $T^{\wedge}PoSS$-PDSCH.

Although the previous embodiments were described with respect a PDSCH reception by a UE 116, similar principles can apply for a CSI-RS reception by the UE 116 or for a PUSCH transmission or SRS transmission from the UE 116 and corresponding descriptions are omitted for brevity.

According to embodiments of this disclosure UE adaptation on maximum MIMO layers based on BWP switching is considered. The UE 116 can determine the maximum MIMO layers for PDSCH in a DL BWP with index/ID i through any of the following:

In the first approach of determination of maximum MIMO layers for PDSCH in a DL BWP i, the UE 116 can be provided with a maximum MIMO layers for PDSCH associated with the DL BWP i through RRC signaling, denoted as $N^{\wedge}maxLayersDL\_i$. When the UE 116 is also provided with maximum MIMO layer to be used for PDSCH in BWPs of the serving cell by RRC parameter, i.e. maxMIMO-Layers in PDSCH-ServingCellConfig. The UE 116 assumes $N^{\wedge}maxLayersDL\_i$ overwrites maxMIMO-Layers for the DL BWP i;

In the second approach of determination of maximum MIMO layers for PDSCH in a DL BWP i, if the UE 116 is provided with maximum MIMO layer to be used for PDSCH in BWPs of the serving cell by RRC parameter, i.e. maxMIMO-Layers in PDSCH-ServingCellConfig in REF 6, the network sets maximum MIMO layers for any DL BWP with ID i of the serving cell, denoted as $N^{\wedge}maxLayersDL\_i$, to the same value as maxMIMO-Layers. In the other word, if the RRC parameter of maximum MIMO layers to be used for PDSCH in BWPs of the serving cell, i.e. maxMIMO-Layers, is present, the UE 116 assumes the maximum MIMO layer for PDSCH in any configured DL BWP has the same value as maxMIMO-Layers.

A UE 116 can determine the maximum MIMO layers for PUSCH in a UL BWP with index/ID i through any of the following:

In the first approach of determination of maximum MIMO layers for PUSCH in a UL BWP i, when the UE 116 is provided with maximum rank through RRC signaling, i.e. maxRank in PUSCH-Config in REF 6, the UE 116 assumes the maximum MIMO layer for PUSCH in the UL BWP i is same as maxRank;

In the second approach of determination of maximum MIMO layers for PUSCH in a UL BWP i, the UE 116 can be provided with a maximum MIMO layers for PUSCH in the UL BWP, denoted as $N^{\wedge}maxLayersUL\_i$. When the UE 116 is also provided with maximum MIMO layer to be used for PUSCH in BWPs of the serving cell by RRC parameter, i.e. maxMIMO-Layers in PUSCH-ServingCellConfig in REF 6. The UE 116 assumes $N^{\wedge}maxLayersUL\_i$ overwrites maxMIMO-Layers for the UL BWP i;

In the third approach of determination of maximum MIMO layers for PUSCH in a UL BWP i, if the UE 116 is provided with maximum MIMO layer to be used for PUSCH in BWPs of the serving cell by RRC parameter, i.e. maxMIMO-Layers in PUSCH-ServingCellConfig in REF 6, the network sets maximum MIMO layers for any UL BWP with ID i of the serving cell, denoted as $N^{\wedge}maxLayersUL\_i$, to the same value as maxMIMO-Layers. In the other word, if the RRC parameter of maximum MIMO layers to be used for PUSCH in BWPs of the serving cell, i.e. maxMIMO-Layers, is present, the UE 116 assumes the maximum MIMO layer for any configured UL BWP has the same value as maxMIMO-Layers.

When a UE 116 is configured with a maximum MIMO layers for PDSCH in a DL BWP with index/ID i, denoted as $N^{\wedge}maxLayersDL\_i$, the UE 116 can determine the rank indicator (RI) for a channel state information (CSI) report in DL BWP i according to one of the following:

In one example, the UE 116 assumes the RI for any CSI report associated with DL BWP i is no larger than $N^{\wedge}maxLayersDL\_i$;

In another example, the UE 116 assumes the RI for any CSI report associated with DL BWP i is no larger than $N^{\wedge}maxLayersDL$, where $N^{\wedge}maxLayersDL$ is the maximum value among configured DL BWPs, such that $N^{\wedge}maxLayersDL=\max\{N^{\wedge}maxLayersDL\_i\}$;

In yet another example, the UE 116 assumes the RI for any CSI report associated with DL BWP i can be any value within a range regardless of the configuration of $N^{\wedge}maxLayersDL\_i$, for example, RI can be any value out from $\{1, 2, 3, 4, 5, 6, 7, 8\}$, for another example, RI can be any positive integer value no larger than maximum RI or MIMO layer for PDSCH determined by UE capability.

When a UE 116 is configured with a maximum rank or maximum MIMO layers for PUSCH a UL BWP with index/ID i, denoted as $N^{\wedge}maxUL\_i$, the UE 116 can determine the way to perform antenna switching for SRS transmission through any of the following:

In one example, the UE 116 doesn't expect to perform antenna switching with number of UE antennas ports larger than $N^{\wedge}maxUL\_i$ in the associated UL BWP.

In one sub-example, the UE 116 can be provided with configuration for indicating how to perform antenna switching, i.e. supportedSRS-TxPortSwitch for/per the UL BWP i, where the corresponding UE antenna ports, i.e. R, is no larger than maximum MIMO layer or maximum rank for PUSCH of the UL BWP i, such that $R<=N^{\wedge}maxUL\_i$.

In another sub-example, the UE 116 doesn't expect to be configured with SRS resources set with usage for antenna switching when the maximum MIMO layer or maximum rank for PUSCH in the associated BWP i is smaller than UE antennas ports required by UE capacity, i.e. supportedSRS-TxPortSwitch in REF 6.

For a configured DL BWP, a UE 116 can be provided with a maximum MIMO layers for PDSCH in the DL BWP, denoted as N^maxLayersDL_i, where i is the index or ID of the DL BWP. For a configured UL BWP, a UE 116 can be provided with a maximum MIMO layers or maximum rank for PUSCH in the UL BWP, denoted as N^maxLayersUL_i, where i is the index or ID of the UL BWP. When the UE 116 switches from a BWP with ID i to a BWP with ID j, the UE 116 finishes BWP switching within the time duration T_BS. The BWP switching delay T_BS is associated with the change of maximum MIMO layers between BWP i and BWP j. The UE 116 can determine the switching delay T_BS through one of the following approaches:

- In one approach for determination of T_BS, the UE 116 assumes T_BS=TBWPswitchDelay+floor(abs(N^maxLayersDL_i−N^maxLayersDL_j)*T0), where TBWPswitchDelay is the corresponding BWP switching delay determined based on specifications in REF 8, and T0 is a predefined positive constant. For example, T0=1 slot, or T0=0.5slot.
- In another approach for determination of T_BS, the UE 116 assumes T_BS=TBWPswitchDelay+ceil(abs(N^maxLayersDL_i−N^maxLayersDLj)*T0), where TBWPswitchDelay is the corresponding BWP switching delay determined based on specifications in REF 8, and T0 is a predefined positive constant. For example, T0=1 slot, or T0=0.5slot.
- In yet another approach for determination of T_BS, the UE 116 assumes T_BS=TBWPswitchDelay+floor(abs(N^maxLayersDL_i−N^maxLayersUL_j)*T0), where TBWPswitchDelay is the corresponding BWP switching delay determined based on specifications in REF 8, and T0 is a predefined positive constant. For example, T0=1 slot, or T0=0.5slot.
- In yet another approach for determination of T_BS, the UE 116 assumes T_BS=TBWPswitchDelay+ceil(abs(N^maxLayersDL_i−N^maxLayersUL_j)*T0), where TBWPswitchDelay is the corresponding BWP switching delay determined based on specifications in REF 8, and T0 is a predefined positive constant. For example, T0=1 slot, or T0=0.5slot.

The UE 116 does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than T_BS for an active DL BWP change or UL BWP change.

When adaptation on maximum MIMO layers based on BWP switching is supported, the UE 116 can transmit assistance information on preferred maximum MIMO layer for PDSCH or PUSCH associated with a DL or UL BWP i, respectively. The assistance information can be transmitted via MAC CE through a PUSCH.

- In one example for report assistance information of maximum MIMO layer for PDSCH or PUSCH per BWP, the UE 116 reports preferred maximum MIMO layer for a default DL or UL BWP.
- In another example for report assistance information of maximum MIMO layer for PDSCH or PUSCH per BWP, the UE 116 reports a preferred maximum MIMO layer for PDSCH or PUSCH in the active DL or UL BWP, respectively.
- In yet another example for report assistance information of maximum MIMO layer for PDSCH or PUSCH per BWP, the UE 116 requests a preferred maximum MIMO layer for PDSCH or PUSCH for a DL BWP i or a UL BWP j, respectively. In this case, UE 116 reports both the preferred value of maximum MIMO layer and the associated index of BWP.

According to embodiments of this disclosure mechanisms and associated signaling support for dynamic configuration of C-DRX parameters for adapting to the real-time traffic while considering a tradeoff between potential UE power saving gains and a scheduling latency are developed. Embodiments of this disclosure also design an additional reference sequence, having transmission occasions aligned with a C-DRX period for a UE 116, that can be used by the UE 116 for channel tracking, RRM measurement, wake-up indication, and adaptation request on C-DRX configuration. Embodiments of this disclosure enhance the CSI measurement or report associated with C-DRX operation. Embodiments of this disclosure also enhance the beam management associated with C-DRX operation.

Figure 17:
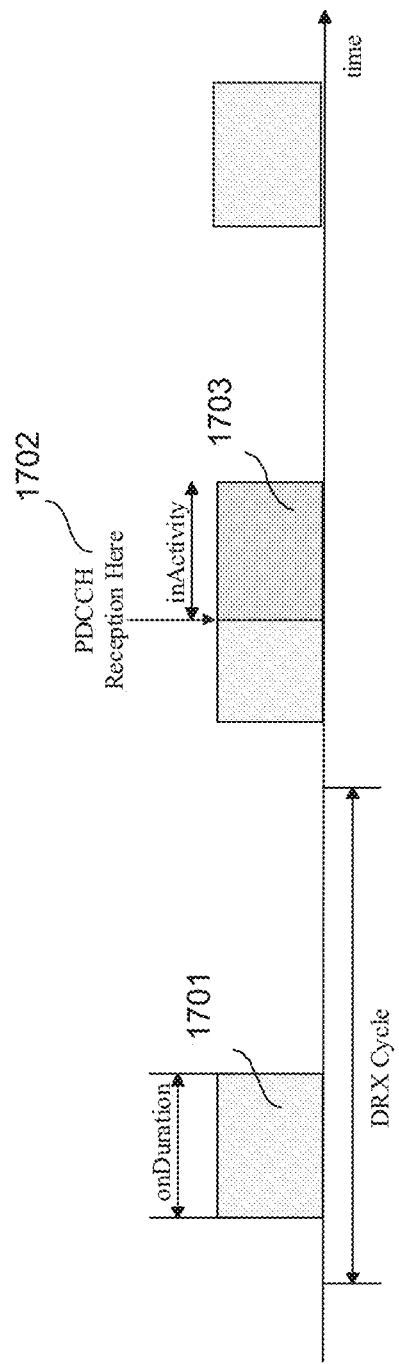
FIG. 17 illustrates a configuration of a C-DRX and an associated UE processing according to embodiments of the present disclosure.

FIG. 17 illustrates a configuration of a C-DRX and an associated UE 116 processing according to embodiments of the present disclosure. An embodiment of the configuration of thr C-DRX and the associated UE 116 processing shown in FIG. 17 is for illustration only. Other embodiments are used without departing from the scope of the present disclosure.

Referring to FIG. 17 C-DRX operation is a mechanism for UE power savings in NR inherited from LTE. During the "On Duration" period 1701, the UE 116 monitors PDCCH (attempts to detect DCI formats) in configured search space sets. If the UE 116 detects a DCI format scheduling a PDSCH reception or a PUSCH transmission during the "On Duration" period 1702, the UE 116 starts the "Inactivity Timer" 1703 and continues to monitor PDCCH until the "Inactivity Timer" expires and the UE 116 goes into sleep mode.

The UE-specific configuration tends to be unchanged over long time periods regardless of a UE power consumption status or a BWP bandwidth and activated number of component carriers (CCs)/cells. The associated configuration parameters as defined in REF 6 are as follows:

- drx-onDurationTimer: the duration at the beginning of a DRX cycle;
- drx-SlotOffset: the delay in slots before starting the drx-onDurationTimer;
- drx-InactivityTimer: the duration after the PDCCH occasion in which a PDCCH indicates an initial UL or DL user data transmission for the medium access control (MAC) entity;
- drx-RetransmissionTimerDL (per DL hybrid automatic repeat request (HARQ) process): the maximum duration until a DL retransmission is received;
- drx-RetransmissionTimerUL (per UL HARQ process): the maximum duration until a grant for UL retransmission is received;
- drx-LongCycle: the long DRX cycle;
- drx-ShortCycle (optional): the short DRX cycle;
- drx-ShortCycleTimer (optional): the duration the UE follows the short DRX cycle;
- drx-HARQ-RTT-TimerDL (per DL HARQ process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.

To successfully wake up after a period of sleep duration, a UE 116 has to perform loop convergence, such as automatic gain control (AGC), time tracking loop (TTL), frequency tracking loop (FTL), based on some cell-specific DL reference sequence. Unlike LTE, there is not always on cell-specific signal (CRS) in NR. Alternatively, a UE 116 can use a SS/PBCH block burst set for loop convergence. However, transmission of a SS/PBCH block burst set is configured per cell. For a particular UE 116, a closest SS/PBCH block monitoring occasion relative to a start time of On Duration can be separated by tens of milliseconds. In such cases, a UE 116 needs to keep wake-up/micro-sleep and maintain the time-frequency tracking after monitoring the closest SS/PBCH block burst set before the next On duration.

For UE operation in DRX mode in RRC_CONNECTED state, the beam-management or any of the related features, such as L1-RSRP measurement, beam reporting, beam indication can be enhanced further with respect to C-DRX operation. This can help the UE 116 to avoid beam failure or speed up beam failure recovery after waking up from long DRX OFF period. In addition, enhancement on beam-management related functionalities outside DRX Active Time also improves the detection performance of PDCCH based power saving signal/channel transmitted before DRX ON duration.

According to an embodiment of this disclosure a dynamic adaptation of Inactivity Timer (drs-Inactivity Timer) as defined in REF 14 is considered using a first approach. In the first approach, a drx-InactivityTimer can start or be reset implicitly according to adaptation criteria associated with real-time results for detections of DCI formats scheduling PDSCH receptions to or PUSCH transmissions from a UE 116. For example, if the UE 116 detects a DCI format scheduling a PDSCH reception to or a PUSCH transmission from a UE 116 in at least X1>1 consecutive PDCCH monitoring periods, drx-InactivityTimer can start or be reset. X1 can be determined by the UE 116 through one of the following:

In one example, X1 is fixed and defined in the specification of the system operation, e.g. X1=2.
In another example, X1 is provided to the UE 116 through higher layer signaling.
In another example, the UE 116 can be provided a set of candidate values of X1 by higher layer signaling, and gNB 102 configure X1 value to the UE 116 by physical layer signaling to indicate the selected X1 value from the set of candidate X1 values.
In yet another example, X1 is reported by the UE 116 to a serving gNB and gNB 102 can in response configure a X1 value to the UE 116 by physical layer signaling or by higher layer signaling.

Figure 18A:
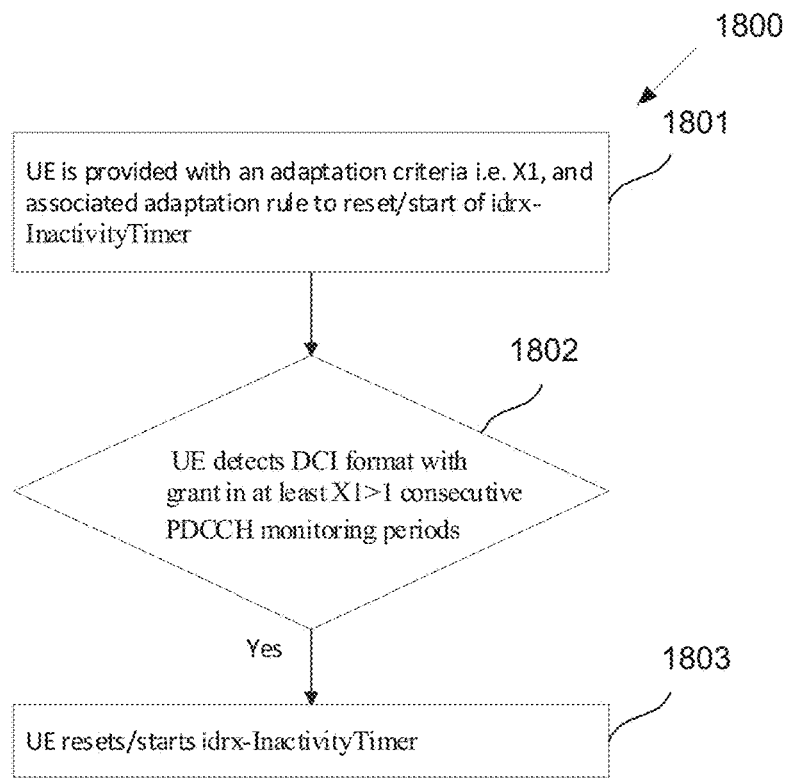
FIG. 18A illustrates a UE procedure for resetting or starting drx-InactivityTimer implicitly according to real-time results for detections of DCI formats scheduling PDSCH receptions to or PUSCH transmissions from a UE according to embodiments of the present disclosure.

FIG. 18A illustrates a UE procedure 1800 for resetting or starting drx-InactivityTimer implicitly according to real-time results for detections of DCI formats scheduling PDSCH receptions to or PUSCH transmissions from a UE 116 according to embodiments of the present disclosure. An embodiment of the procedure 1800 shown in FIG. 18A is for illustration only. Other embodiments are used without departing from the scope of the present disclosure.

In step 1801, the UE 116 is provided with adaptation criteria, i.e. X1, and associated adaptation rules for resetting/ starting an idrx-InactivityTimer. In step 1802, the UE 116 determines whether or not the UE detected DCI formats scheduling PDSCH receptions to or PUSCH transmissions from the UE 116 in at least X1>1 consecutive PDCCH monitoring periods. When the UE 116 detects such DCI formats in at least X1>1 consecutive PDCCH monitoring periods, the UE 116 resets/starts the drx-InactivityTimer in step 1803.

According to an embodiment of this disclosure a dynamic adaptation of Inactivity Timer (drs-Inactivity Timer) as defined in REF 14 is considered using a second approach. In the second approach, a drx-InactivityTimer can be set to zero implicitly to enable UE power savings according to adaptation criteria associated with real-time results for detections of DCI formats scheduling PDSCH receptions to or PUSCH transmissions from a UE 116. If a UE 116 does not detect any DCI format scheduling a PDSCH reception to or PUSCH transmission from the UE 116 in at least X2>=1 consecutive PDCCH monitoring periods, the drx-InactivityTimer can be set to zero. X2 can be determined by the UE 116 through one of the following:

In one example, X2 is fixed and defined in the specification of the system operation, e.g. X2=2.
In another example, X2 is provided to the UE 116 by higher layer signaling.
In another example, the UE 116 can be provided a set of candidate X2 values by higher layer signaling and the gNB 102 can indicate a X2 value, from the set of candidate X2 values, to the UE 116 by physical layer signaling.
In yet another example, a X2 value is reported by the UE 116 to a serving gNB and the gNB 102 can in response configure a X2 value to the UE 116 by physical layer signaling or by higher layer signaling.

Figure 18B:
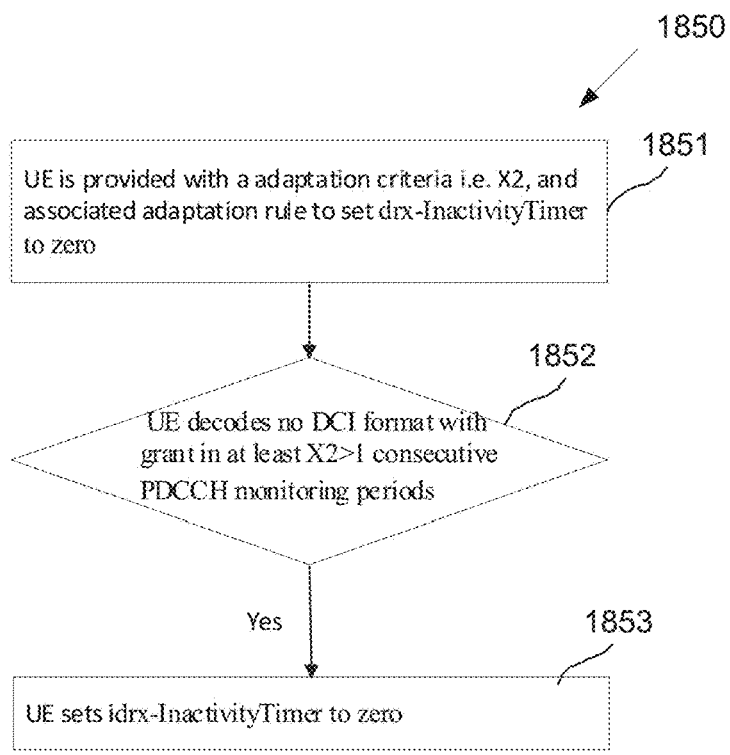
FIG. 18B illustrates a UE procedure to set a drx-InactivityTimer to zero implicitly according to real-time results for detections of DCI formats scheduling PDSCH receptions to or PUSCH transmissions from the UE according to embodiments of the present disclosure.

FIG. 18B illustrates a UE procedure 1850 to set a drx-InactivityTimer to zero implicitly according to real-time results for detections of DCI formats scheduling PDSCH receptions to or PUSCH transmissions from the UE 116 according to embodiments of the present disclosure. An embodiment of the procedure 1850 shown in FIG. 18B is for illustration only. Other embodiments are used without departing from the scope of the present disclosure.

In step 1851, the UE 116 is provided with adaptation criteria, such as an X2 value, and an associated adaptation rule to terminate an idrx-InactivityTimer. In step 1852, the UE 116 determines whether or not the UE detected a DCI format scheduling a PDSCH reception to or PUSCH transmission from the UE 116 in at least X2>1 consecutive PDCCH monitoring periods. When the UE 116 does not detect such a DCI format in at least X2>1 consecutive PDCCH monitoring periods, the UE 116 terminates (sets to zero) the drx-InactivityTimer in step 1853.

According to embodiments of this disclosure an adaptation of C-DRX cycle for a UE 116 that operates in connected mode DRX (C-DRX) is considered. The C-DRX cycle can be denoted as T_CDRX and is in the unit of one slot or one millisecond. T_CDRX can be the long DRX or short DRX as defined in REF 14. T_CDRX can be increased/decreased implicitly according to the real-time results for detections of DCI formats scheduling PDSCH receptions to or PUSCH transmissions from a UE 116. To avoid a misunderstanding of T_CDRX between gNB 102 and UE 116 due to a UE 116 failing to detect a DCI format, T_CDRX can also be reset. For example, T_CDRX can be reset to default value, T0_CDRX, every Z1 ms. More specifically, T_CDRX=T0_CDRX, when SFN mod Z1=o1, where Z1 and o1 are either predetermined in the system operation or configured to the UE 116 by higher layers, e.g. o1=0, Z1=10, or 20.

According to embodiments of this disclosure that consider an adaptation of C-DRX cycle for a UE 116 that operates in connected mode DRX (C-DRX) a first approach is used. In the first approach, T_CDRX can be increased implicitly to enable UE power savings according to adaptation criteria associated with real-time results for detections of DCI formats scheduling PDSCH receptions to or PUSCH transmissions from the UE 116. For example, if the UE 116 does not detect any DCI format scheduling a PDSCH reception or a PUSCH transmission in at least X3>=1 consecutive DRX cycle(s), the UE 116 can increase T_CDRX. X3 is a positive integer such as X3=2.

The UE 116 can determine a T_CDRX increment through one of the following adaptation rules:
- In one example, T_CDRX=min(c1*T_CDRX, T^max_CDRX), where c1 is a positive integer, such as c1=2, and T^max_CDRX is the maximum duration of the C-DRX cycle.
- In another example, T_CDRX=min(T_CDRX+T^delta_CDRX, T^max_CDRX) where T^delta_CDRX>0 is a positive constant, such as T^delta_CDRX=10 ms, and T^max_CDRX is the maximum duration of the C-DRX cycle.
- In yet another example, T_CDRX=T^max_CDRX where T^max_CDRX is the maximum duration of the C-DRX cycle.

The UE 116 can determine parameters to use for determining an increment of a DRX cycle, such as X3/c1/T^max_CDRX/T^delta_CDRX, through one of the following:
- In one example, any of X3/c1/T^max_CDRX/T^delta_CDRX is fixed and defined in the specification of the system operation.
- In another example, any of X3/c1/T^max_CDRX/T^delta_CDRX is provided to the UE 116 through higher layer signaling.
- In another example, the UE 116 is provided a set of candidate values for any of X3/c1/T^max_CDRX/T^delta_CDRX by higher layer signaling and the gNB 102 indicates to the UE 116 a respective value of X3/c1/T^max_CDRX/T^delta_CDRX from the set of candidate values by physical layer signaling.
- In yet another example, the UE 116 reports to a serving gNB any of X3/c1/T^max_CDRX/T^delta_CDRX and the gNB 102 indicates a respective value to the UE 116 by physical layer signaling or by higher layer signaling.

Figure 19:
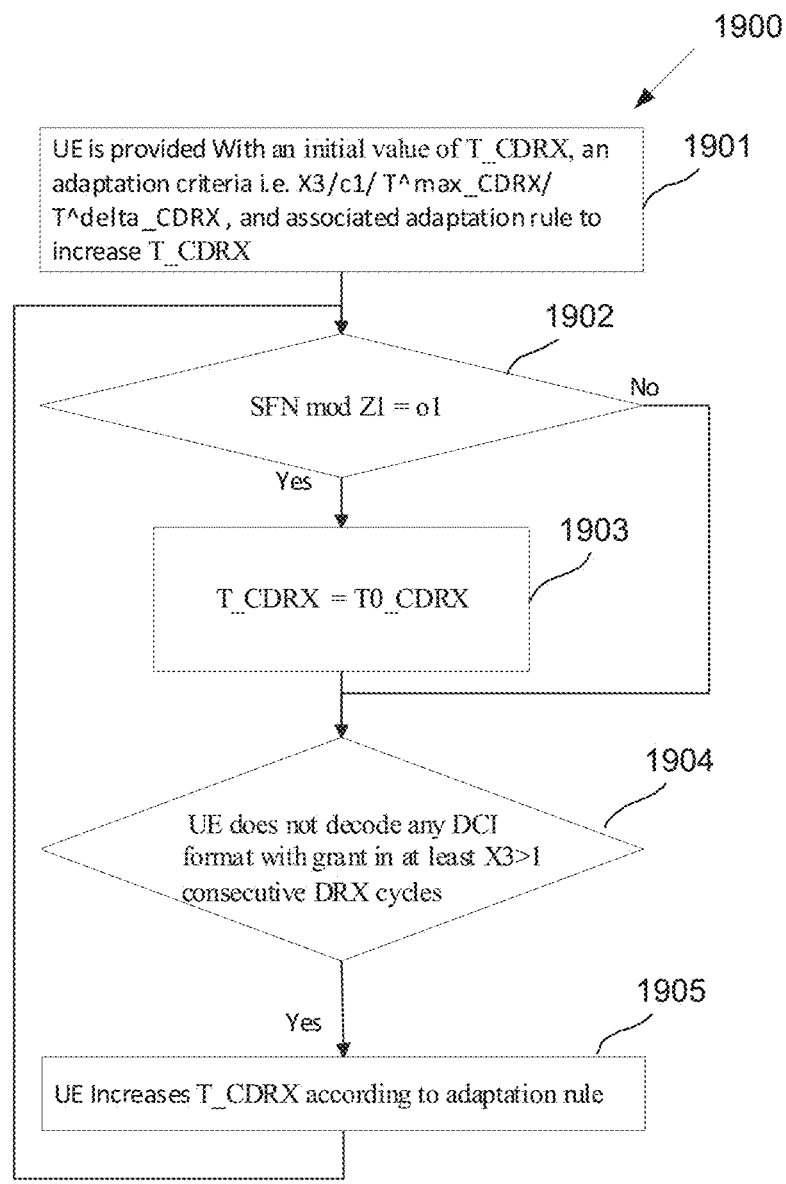
FIG. 19 illustrates a UE procedure to increase T_CDRX implicitly according to real-time results for detections of DCI formats scheduling PDSCH receptions to or PUSCH transmissions from the UE according to embodiments of the present disclosure.

FIG. 19 illustrates a UE procedure 1900 to increase T_CDRX implicitly according to real-time results for detections of DCI formats scheduling PDSCH receptions to or PUSCH transmissions from the UE 116 according to embodiments of the present disclosure. An embodiment of the procedure 1900 shown in FIG. 19 is for illustration only. Other embodiments are used without departing from the scope of the present disclosure.

In step 1901, the UE 116 is provided an initial value of T_CDRX, an adaptation criterion such as X3/c1/T^max_CDRX/T^delta_CDRX, and an associated adaptation rule to increase T_CDRX. In step 1902, the UE 116 determines whether or not the T_CDRX is to be reset to a default value. In step 1903, when SFN mod Z1=o1, the UE 116 resets the T_CDRX to a default value T0_CDRX. The UE 116 determines whether or not the UE 116 does not detect any DCI format scheduling a PDSCH reception or PUSCH transmission in at least X3>1 consecutive C-DRX cycles in step 1904. When the UE 116 does not detect any such DCI format in at least X3>1 consecutive C-DRX cycles, the UE 116 increases T_CDRX according to configured adaptation rule in step 1905.

According to embodiments of this disclosure that consider an adaptation of C-DRX cycle for a UE 116 that operates in connected mode DRX (C-DRX) a second approach is used. In the second approach, the UE 116 can decrease a T_CDRX value to reduce latency according to adaptation criteria associated with real-time results for detections of DCI formats scheduling PDSCH receptions to or PUSCH transmissions from the UE 116. For example, if the UE 116 detects a DCI format scheduling a PDSCH reception or PUSCH transmission in at least X4*100% of PDCCH monitoring occasion(s) over at least X5>=1 consecutive C-DRX cycles, the UE 116 decreases T_CDRX. X4 is a fractional number, such as X4=0.75, and X5 is a positive integer, such as X5=2.

The UE 116 can determine a T_CDRX decrement through one of the following adaptation rules:
- In one example, T_CDRX=max(c2*T_CDRX, T^min_CDRX) where c2 is a fractional number, such as c2=0.5, and T^min_CDRX is the minimum value of the C-DRX cycle.
- In another example, T_CDRX=max(T_CDRX−T^delta_CDRX, T^min_CDRX) where T^delta_CDRX>0 is a positive constant, such as T^delta_CDRX=10 ms, and T^min_CDRX is the minimum value of C-DRX cycle.
- In yet another example, T_CDRX=T^min_CDRX where T^min_CDRX is the minimum value of the C-DRX cycle.

The UE 116 can determine parameters to use for decreasing a C-DRX cycle, such as X4/X5/c2/T^min_CDRX/T^delta_CDRX, through one of the following:
- In one example, any of X4/X5/c2/T^min_CDRX/T^delta_CDRX is fixed and defined in the specification of the system operation.
- In another example, any of X4/X5/c2/T^min_CDRX/T^delta_CDRX is provided to the UE 116 through higher layer signaling.
- In another example, the UE 116 is provided a set of candidate values of X4/c2/T^min_CDRX/T^delta_CDRX by higher layer signaling and the gNB 102 indicates a X4/c2/T^min_CDRX/T^delta_CDRX value from the set of candidate values to the UE 116 by physical layer signaling.
- In yet another example, X4/X5/c2/T^min_CDRX/T^delta_CDRX is reported by the UE 116 to a serving gNB and the gNB 102 indicates a respective value to the UE 116 by physical layer signaling or by higher layer signaling.

Figure 20:
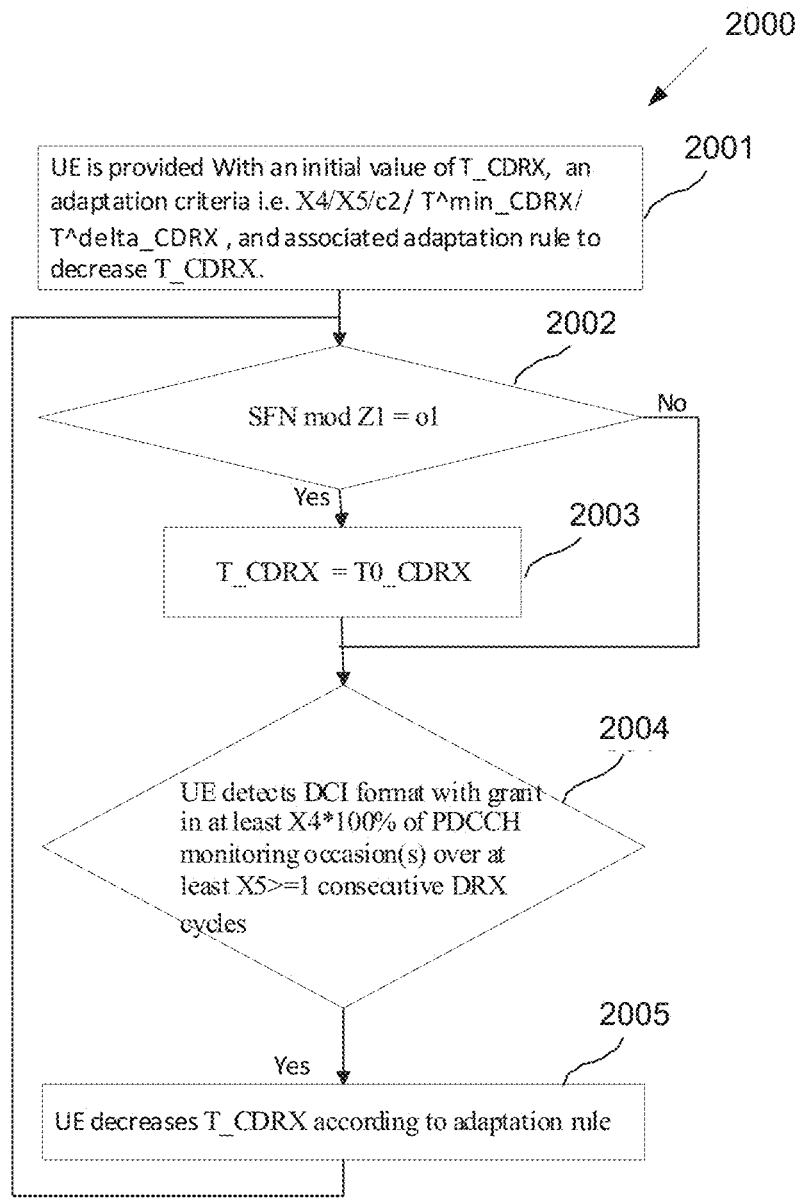
FIG. 20 illustrates a UE procedure 2000 to decrease a T_CDRX implicitly according to real-time results for detections of DCI formats scheduling PDSCH receptions to or PUSCH transmissions from the UE according to embodiments of the present disclosure.

FIG. 20 illustrates a UE procedure 2000 to decrease a T_CDRX implicitly according to real-time results for detections of DCI formats scheduling PDSCH receptions to or PUSCH transmissions from the UE 116 according to embodiments of the present disclosure. An embodiment of the procedure 2000 shown in FIG. 20 is for illustration only. Other embodiments are used without departing from the scope of the present disclosure.

In step 2001 the UE 116 is provided an initial value of T_CDRX, an adaptation criterion such as X4/X5/c2/T^min_CDRX/T^delta_CDRX, and an associated adaptation rule to decrease T_CDRX. In step 2002, the UE 116 determines whether or not T_CDRX is to be reset to a default value. When SFN mod Z1=o1, the UE 116 resets T_CDRX to a default value T0_CDRX in step 2003. The UE 116 determines whether or not the UE 116 detected a DCI format scheduling a PDSCH reception or PUSCH transmission in at least X4*100% of PDCCH monitoring occasions over at least X5>=1 consecutive C-DRX cycles in step 2004. When the UE 116 detects such DCI format in at least X4*100% of PDCCH monitoring occasions over at least X5>=1 consecutive DRX cycles, the UE 116 decreases T_CDRX according to the configured adaptation rule in step 2005.

According to embodiments of this disclosure that consider a dynamic adaptation of the on duration, denoted as D_onDuration, at the beginning of a C-DRX cycle is considered. D_onDuration can be increased/decreased implicitly according to real-time results for detections of DCI formats scheduling PDSCH receptions to or PUSCH transmissions from a UE 116. To avoid a misunderstanding for a value of D_onDuration between a gNB 102 and the UE 116 due to possible misdetections of DCI formats by the UE 116, the D_onDuration can be reset to a default value at predetermined time instances. For example, the D_onDuration can be reset to a default value, D0_onDuration, every Z 1 ms. More specifically, D_onDuration=D0_onDuration when SFN mod Z1=o1 where Z1 and o1 are either predetermined in the system operation or are provided to the UE 116 by higher layers, such as o1=0, Z1=10, or 20.

According to embodiments of this disclosure that consider a dynamic adaptation of the on duration, denoted as D_onDuration, at the beginning of a C-DRX cycle a first approach is used. In the first approach, the UE 116 can implicitly decrease D_onDuration to at least increase UE 116 power savings according to adaptation criteria associated with real-time results for detections of DCI formats scheduling PDSCH receptions to or PUSCH transmissions from the UE 116. For example, if the UE 116 detects such a DCI format in at most X6*100% of PDCCH monitoring occasion(s) within one C-DRX cycle, the UE 116 can decrease D_onDuration. X6 is a fractional number, such as X6=0.2.

The UE 116 can determine a D_onDuration decrement through one of the following options:

In one example, D_onDuration=max(c3*D_onDuration, D^min_onDuration) where c3 is a fractional number, such as c3=0.5, and D^min_onDuration is the minimum value of D_onDuration.

In another example, D_onDuration=max(D_onDuration−D^delta_onDuration, D^min_onDuration) where D^delta_onDuration >0 is a positive constant, such as D^delta_onDuration=10 ms, and D^min_onDuration is the minimum value of D_onDuration, such as D_onDuration=2 ms.

In yet another example, D_onDuration=D^min_onDuration where D^min_onDuration is the minimum value of D_onDuration, such as D_onDuration=2 ms.

The UE 116 can determine parameters for decreasing D_onDuration, such as X6/c3/D^delta_onDuration/D^min_onDuration, through one of the following adaptation rules:

In one example, any of X6/c3/D^delta_onDuration/D^min_onDuration is fixed and defined in the specification of the system operation.

In another example, any of X6/c3/D^delta_onDuration/D^min_onDuration is provided to the UE 116 through higher layer signaling.

In another example, the UE 116 is provided a set of candidate values of X6/c3/D^delta_onDuration/D^min_onDuration by higher layer signaling and the gNB 102 indicates a X6/c3/D^delta_onDuration/D^min_onDuration value, from the set of candidate values, to the UE 116 by physical layer signaling.

In yet another example, X6/c3/D^delta_onDuration/D^min_onDuration is reported by the UE 116 to a serving gNB and gNB 102 indicates a respective value to the UE 116 by physical layer signaling or by higher layer signaling.

Figure 21:
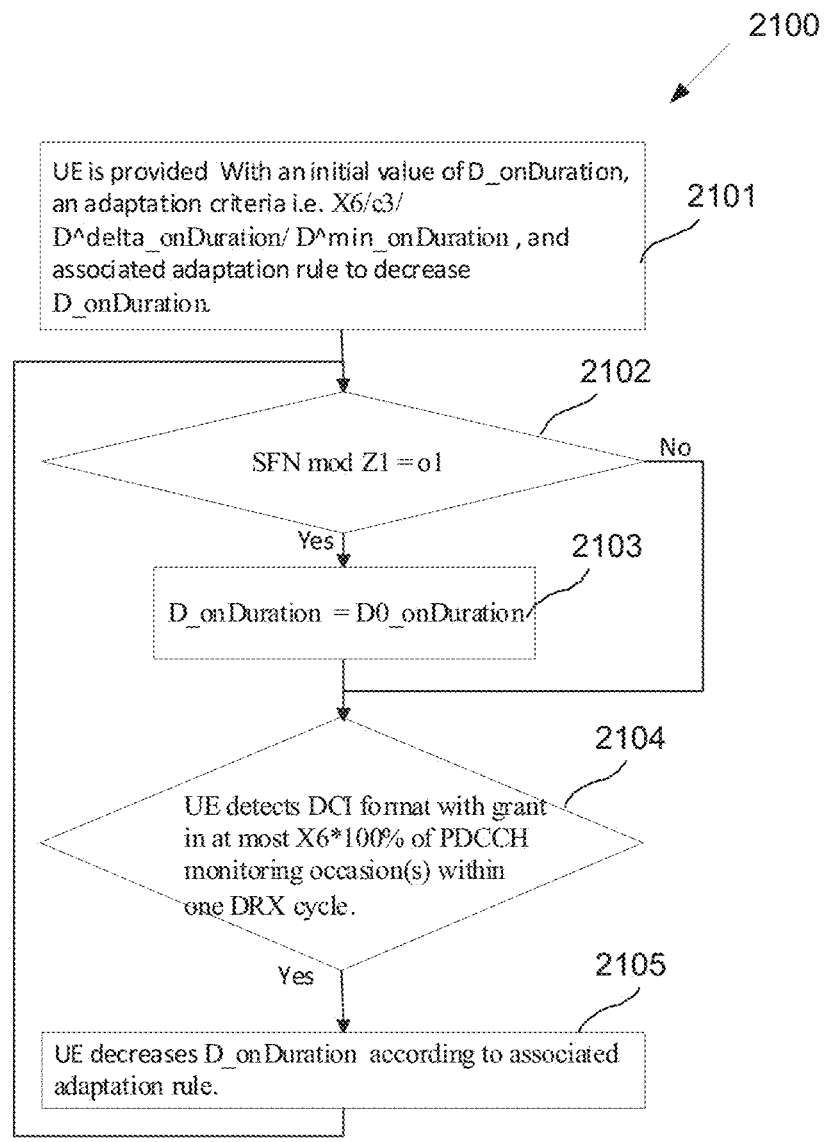
FIG. 21 illustrates a UE procedure 2100 for decreasing D_onDuration implicitly according to real-time results for detections of DCI formats scheduling PDSCH receptions to or PUSCH transmissions from the UE according to embodiments of the present disclosure.

FIG. 21 illustrates a UE 116 procedure 2100 for decreasing D_onDuration implicitly according to real-time results for detections of DCI formats scheduling PDSCH receptions to or PUSCH transmissions from the UE 116 according to embodiments of the present disclosure. An embodiment of the procedure 2100 shown in FIG. 21 is for illustration only. Other embodiments are used without departing from the scope of the present disclosure.

In step 2101 the UE 116 is provided an initial value of D_onDuration, an adaptation criterion such as X6/c3/D^delta_onDuration/D^min_onDuration, and associated adaptation rule to decrease D_onDuration. In step 2102 the UE 116 determines whether or not D_onDuration is to be reset to a default value. When SFN mod Z=o1, the UE 116 resets D_onDuration to default value D0_onDuration in step 2103. In step 2104 the UE 116 determines whether or not the UE 116 detects a DCI format scheduling a PDSCH reception to or PUSCH transmission from the UE 116 in at most X6*100% of PDCCH monitoring occasions within one C-DRX cycle. When the UE 116 detects such a DCI format in at most X6*100% of PDCCH monitoring occasions within one C-DRX cycle, the UE 116 decreases D_onDuration according to the configured adaptation rule in step 2105.

According to embodiments of this disclosure that consider a dynamic adaptation of the on duration, denoted as D_onDuration, at the beginning of a C-DRX cycle a second approach is used. In the second approach, the UE 116 can implicitly increase D_onDuration to at least reduce latency according to adaptation criteria associated with real-time results for detections of DCI formats scheduling PDSCH receptions to or PUSCH transmissions from the UE 116. For example, if the UE 116 detects such a DCI format in at least X7*100% of PDCCH monitoring occasion(s) within one C-DRX cycle, the UE 116 can increase D_onDuration. X7 is a fractional number, such as X7=0.75

The UE 116 can determine a D_onDuration increment through one of the following options:

In one example, D_onDuration=min(c4*D_onDuration, D^max_onDuration) where c4 is a positive integer, such as c4=2, and D^max_onDuration is the maximum value of D_onDuration, such as D^max_onDuration=100 ms.

In another example, D_onDuration=min(D_onDuration−D^delta_onDuration, D^max_onDuration) where D^delta_onDuration >0 is a positive constant, such as D^delta_onDuration=10 ms, and D^max_onDuration is the maximum value of D_onDuration, such as D^max_onDuration=100 ms.

In yet another example, D_onDuration=D^max_onDuration where D^max_onDuration is the maximum value of D_onDuration, such as D^max_onDuration=100 ms.

The UE 116 can determine parameters for increasing D_onDuration, such as X7/c4/D^delta_onDuration/D^max_onDuration, through one of the following:

In one example, any of X7/c4/D^delta_onDuration/D^max_onDuration is fixed and defined in the specification of the system operation.

In another example, any of X7/c4/D^delta_onDuration/D^max_onDuration is provided to the UE 116 through higher layer signaling.

In another example, the UE 116 is provided a set of candidate values of X7/c4/D^delta_onDuration/D^max_onDuration by higher layer signaling, and the gNB 102 indicates a X7/c4/D^delta_onDuration/D^max_onDuration value, from the set of candidate values, to the UE 116 by physical layer signaling.

In yet another example, the UE 116 reports a X7/c4/D^delta_onDuration/D^max_onDuration value to a serving gNB and the gNB 102 indicates a respective value to the UE 116 by physical layer signaling or by higher layer signaling.

Figure 22:
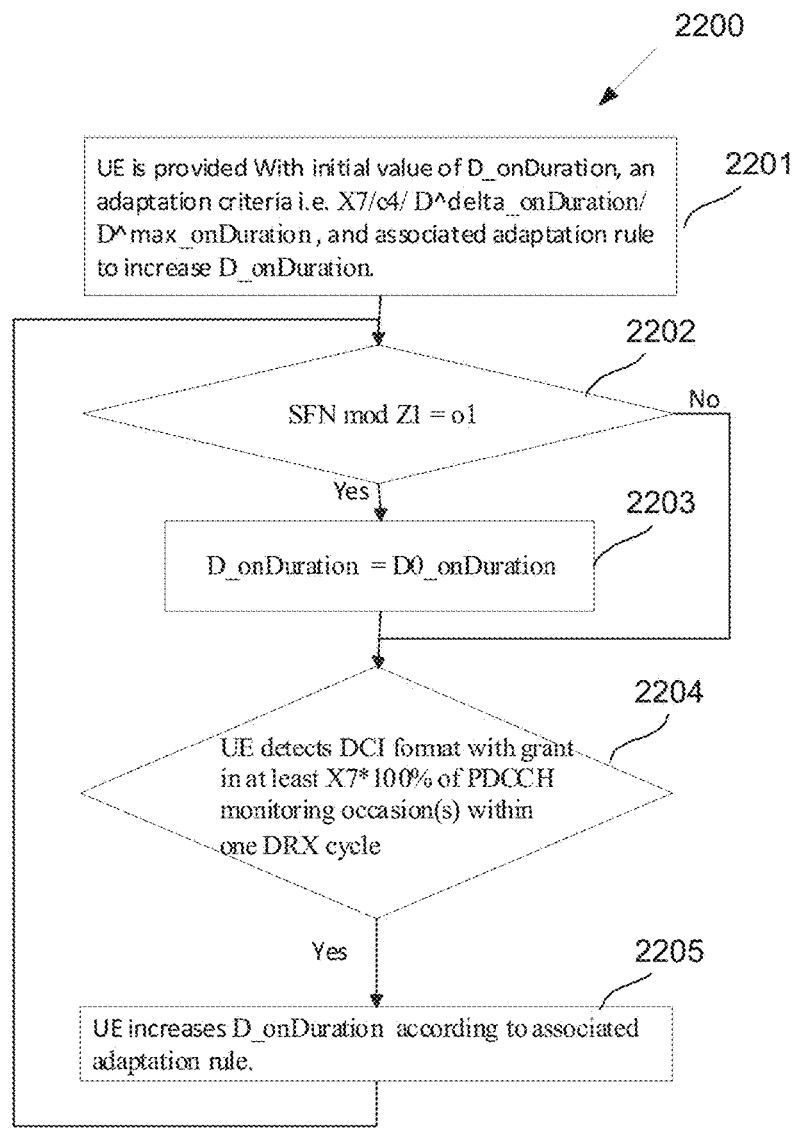
FIG. 22 illustrates a UE procedure 2200 to increase D_onDuration implicitly according to real-time results for detections of DCI formats scheduling PDSCH receptions to or PUSCH transmissions from the UE according to embodiments of the present disclosure.

FIG. 22 illustrates a UE procedure 2200 to increase D_onDuration implicitly according to real-time results for detections of DCI formats scheduling PDSCH receptions to or PUSCH transmissions from the UE 116 according to embodiments of the present disclosure. An embodiment of the procedure 2200 shown in FIG. 22 is for illustration only. Other embodiments are used without departing from the scope of the present disclosure.

In step 2201 the UE 116 is provided an initial value of D_onDuration, an adaptation criterion such as X7/c4/D^delta_onDuration/D^max_onDuration, and an associated adaptation rule to increase D_onDuration. In step 2202 the UE 116 determines whether or not the D_onDuration needs to be reset to a default value. When SFN mod Z1=o1, the UE 116 resets D_onDuration to default value D0_onDuration in step 2203. In step 2204 the UE 116 determines whether or not the UE 116 detects a DCI format scheduling a PDSCH reception or PUSCH transmission in at least X7*100% of PDCCH monitoring occasions within one C-DRX cycle. When the UE 116 detects such DCI format in at least X7*100% of PDCCH monitoring occasions within one C-DRX cycle, the UE 116 increases D_onDuration according to the configured adaptation rule in step 2205.

According to embodiments of this disclosure an additional reference signal (RS) reception prior to the C-DRX on duration is considered. UE 116 can use the RS for AGC setting/channel tracking/RRM measurement and be ready for PDCCH/PDSCH processing at the next C-DRX ON duration. The additional RS can be transmitted by gNB 102 to a single UE or a group of UEs or all UEs in a serving cell. The additional RS can carry at least the associated UE ID or UE group ID or cell ID, denoted as I^ID in this disclosure. 0<=I^ID<2^N_bits−1, where N_bits is a positive integer such as N_bits=16 for a single UE or N_bits=3 for a UE group or 0<=I^ID<1007 for cell ID. A UE 116 can determine I^ID through one of the following In one example, the UE 116 can determine I^ID by decoding the associated RRC parameter in a PDSCH scheduled by a DCI format with CRC scrambled by C-RNTI.

In another example, the UE 116 can determine I^ID by decoding the associated RRC parameter in SIB.

In yet another example, the UE 116 can determine I^ID by UE ID, such that I^ID=mod(floor(I^UE/c1), c3)*c3, where I^UE is UE ID, for example, I^UE is C-RNTI, where c1, c2, c3 are either predetermined in the system operation, such as c1=1, c2=4, c3=1, or provided to the UE 116 by higher layers.

A DL reception with REs in the same RB as the additional RS can be rate matched around the additional RS REs. A mapping of additional REs is such that it avoids REs of DM-RS associated with other DL reception, such as PDCCH, PDSCH.

According to embodiments of this disclosure that consider an additional reference signal (RS) reception prior to the C-DRX on duration a first approach is used. In the first approach, the UE 116 can be configured with a CSI-RS prior to the C-DRX ON duration by higher layers. The CSI-RS can be used to trigger the UE 116 to wake up from a sleep state. This type of CSI-RS is referred to as primary CSI-RS (P-CSI-RS) in this disclosure. The sequence of P-CSI-RS can be defined by:

$$r^{S-CSI-RS}(m) = \frac{1}{\sqrt{2}}(1-2c(2m)) + j\frac{1}{\sqrt{2}}(1-2c(2m+1)), m = 0, \ldots, N^{P-CSI-RS/(2-1)},$$

where $N^{P-CSI-RS}$ is the length of PN sequence c(i) per OFDM symbol and c(i) is defined in clause 5.2.1 of REF 9. The PN sequence generator is initialized with $c^{P\_init}$. The initial condition can be associated with or determined by timing information, such as the slot index $n_{s,f}^{u}$ and the OFDM symbol index 1. For example, the UE 116 can determine a configuration of $c^{P\_init}$ as $$c^{P\_init}=(c1(14n_{s,f}^{u}+1+1)(c2*floor(I^{ID}/c5)+1)+c3*floor(I^{ID}/5)+c4) \bmod 231,$$

where c1, c2, c3, c4, c5 are fixed and predefined in the specification of system operation. For example, c1=217, c2=2, c3=2, c4=0, c5=8.

Figure 23:
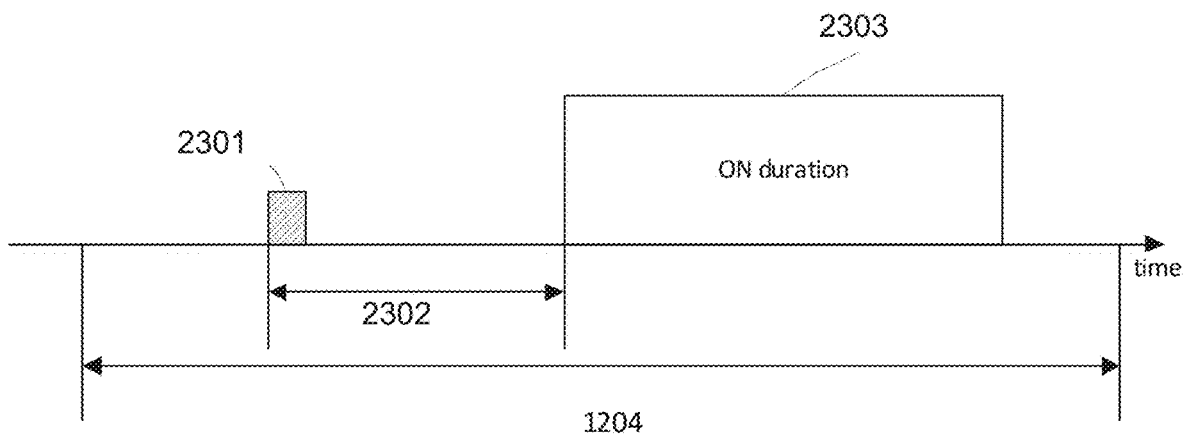
FIG. 23 illustrates a time domain configuration of P-CSI-RS aligned with a C-DRX ON duration for a UE according to embodiments of the present disclosure.

FIG. 23 illustrates a time domain configuration of P-CSI-RS aligned with a C-DRX ON duration for a UE 116 according to embodiments of the present disclosure. An embodiment of the time domain configuration shown in FIG. 23 is for illustration only. Other embodiments are used without departing from the scope of the present disclosure.

The UE 116 receives a P-CSI-RS with a periodicity T^P-CSI-RS the UE 116 is provided by higher layers such that T^P-CSI-RS=k1*T_CDRX where T_CDRX is equal to the C-DRX cycle 2304, k1 is a positive integer, such as k1=1, and is either predetermined in system operation or provided to the UE 116 by higher layers.

The UE 116 can be configured with P-CSI-RS monitoring offset denoted as O^P-CSI-RS. O^P-CSI-RS can be defined as a time offset prior to the start of a next C-DRX ON duration 2402 in the unit of one slot. A UE 116 can determine a configuration of O^P-CSI-RS through one of the following:

In one example, O^P-CSI-RS is provided to the UE 116 through higher layer signaling.

In another example, O^P-CSI-RS, can be determined by $I^{ID}$. For example, $$O^{\wedge}P-CSI-RS = \mod\left(\left\lfloor \frac{I^{ID}}{c1} \right\rfloor, c2\right)*c3$$

where 0<c2<T^P-CSI-RS c1, c2, c3 are either predetermined in the system operation, such as c1=1, c2=4, c3=1, or are provided to UE 116 by higher layers.

According to embodiments of this disclosure that consider an additional reference signal (RS) reception prior to the C-DRX on duration a second approach is used. The UE 116 can be configured with to receive a CSI-RS prior to a C-DRX ON duration and the CSI-RS can be used to indicate a dynamic configuration in a next C-DRX cycle. This type of CSI-RS is referred as secondary CSI-RS (S-CSI-RS) in this disclosure. The sequence of S-CSI-RS can be defined by $$r^{S-CSI-RS}(m) = \frac{1}{\sqrt{2}}(1-2c(2m)) + j\frac{1}{\sqrt{2}}(1-2c(2m+1)), m=0, \ldots, \frac{N^{S-CSI-RS}}{2}-1,$$

where N^S-CSI-RS is the length of PN sequence c(i) per OFDM symbol and c(i) is defined in clause 5.2.1 of REF 9.

The PN sequence generator is initialized with c^S_init. The initial condition of can be associated with or determined by timing information, such as a slot index $n_{s,f}^{\mu}$ and an OFDM symbol index 1. A dynamic configuration of CDRX, I_drx-Config can be a row index to a predefined adaptation profile associated with C-DRX configuration parameters. For example, the UE 116 can determine a configuration of c^S_init as $$c\char`\^ S\_init=(c1(14n_{s,f}^{\mu}+1+1)(c2 \cdot I\_drx\text{-Config}+1)+ c3 \cdot I\_drx\text{-Config}+c4) \bmod 2^{31},$$

where c1, c2, c3, c4 are fixed and predefined in the specification of system operation such as c1=$2^{17}$, c2=2, c3=2, c4=0.

An adaptation profile associated with CDRX configuration can be a predefined table where each column is associated with one CDRX configuration parameter such as DRX cycle T, On duration D, and inactivity timer I. Each row indicates an adaptation for associated CDRX configuration parameter(s). Table 1 provides an example of a C-DRX adaptation profile where 3 bits of I_drx-Config can indicate a row index and associated adaptation on C-DRX configuration parameters.

TABLE 1

| Adaptation index | DRX cycle, T | On duration, D | Inactivity timer, I |
|---|---|---|---|
| 0 | T = default value, e.g. 160 ms | D = Default value, e.g 8 ms | I = default value, e.g. 100 ms |
| 1 | — | — | — |
| 2 | T = min (2T, T_max), T_max, is the maximum value of T | — | — |
| 3 | T = max (T/2, T_min), T_min is the minimum value of T | — | — |
| 4 | — | D = min(2D, T) | — |
| 5 | — | D = max(D/2, D_min), D_min is minimum value of D | — |
| 6 | — | — | I = min (2I, I_max), I_max is maximum value of I |
| 7 | — | — | I = max (I/2,I_min), I_min is minimum value of I |

Figure 24:
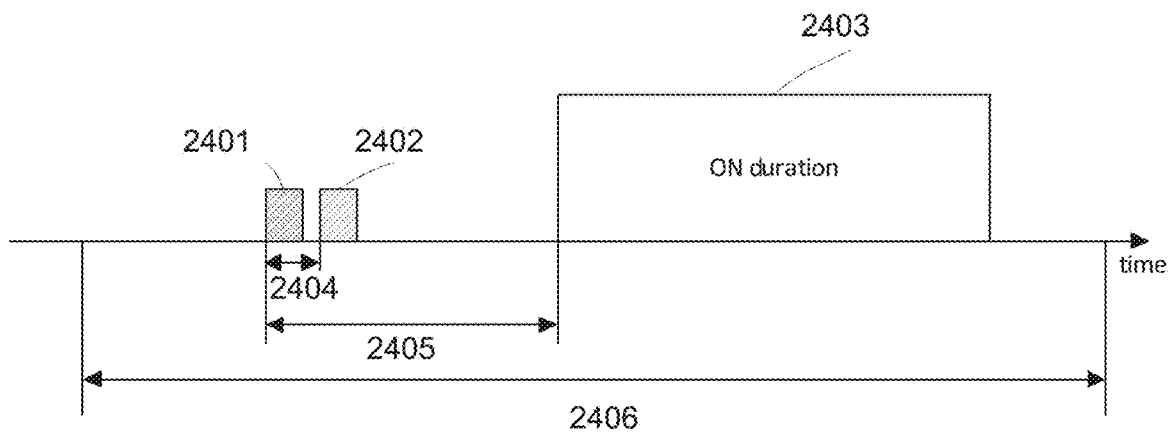
FIG. 24 illustrates a time domain configuration of S-CSI-RS aligned with a P-CSI-RS and a C-DRX configuration according to embodiments of the present disclosure.

FIG. 24 illustrates a time domain configuration of S-CSI-RS aligned with a P-CSI-RS and a C-DRX configuration according to embodiments of the present disclosure. An embodiment of the time domain configuration shown in FIG. 24 is for illustration only. Other embodiments are used without departing from the scope of the present disclosure.

A UE 116 can be configured with a S-CSI-RS monitoring offset O^S-CSI-RS 2404. O^S-CSI-RS 2404 can be defined as a time offset relative to the start of P-CSI-RS 2401 in the unit of one slot. A UE 116 can determine a configuration of O^S-CSI-RS 2404 through one of the following In one example, O^S-CSI-RS 2404 is provided to the UE 116 through higher layer signaling.

In another example, the UE 116 can determine O^S-CSI-RS 2404 by the I^ID as $$O\char`\^ S - CSI - RS = \bmod(I^{ID}, N2) * k2, \bmod\left(\left[\frac{I^{ID}}{c1}\right], c2\right) * c3,$$

where 0<=O^S-CSI-RS<T^P-CSI-RS, c1, c2, c3 are either predetermined in the system operation, such as c1=1, c2=2, c3=1, or provided to UE 116 by higher layers.

The UE 116 can be configured a set of start OFDM symbols of P-CSI-RS/S-CSI-RS to monitor in each monitoring occasion, n_slot, determined by a monitoring periodicity and an offset. The set of start OFDM symbols can be denoted as L_startOS={1_0, 1_1, . . . , 1_{N-1}} where N is the number of start OFDM symbols of P-CSI-RS/S-CSI-RS. The UE 116 can determine a configuration of L_startOS through one of the following In one example, L_startOS is fixed and defined in the specification of the system operation such as L_startOS=[0, 1].

In another example, L_startOS is provided to the UE 116 through higher layer signaling.

In yet another example, L_startOS is provided to the UE 116 by higher layer signaling from a serving gNB in response to a value for L_startOS provided/requested from the UE 116 to the gNB 102.

In yet another example, fixed/default values of L_startOS are used if L_startOS values are not provided by higher layers.

Figure 25:
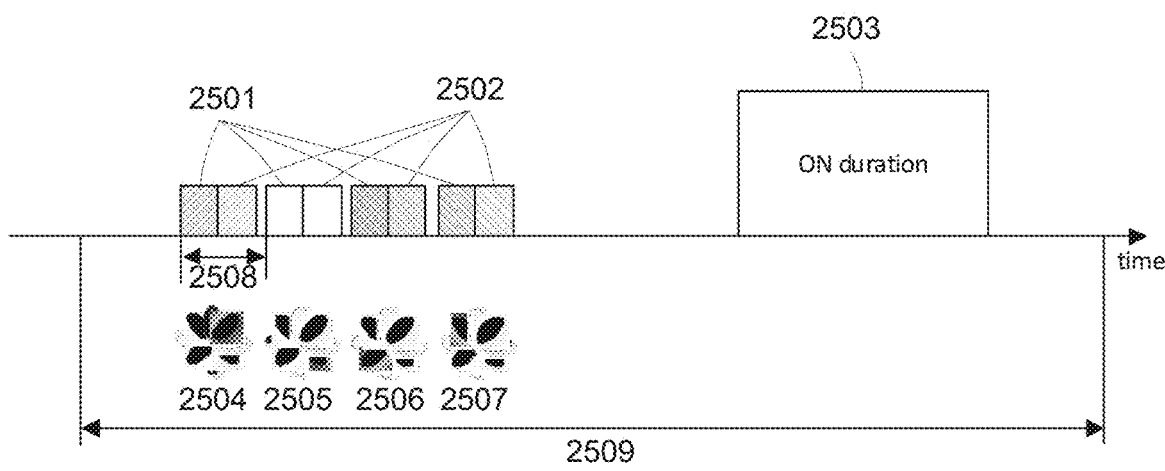
FIG. 25 illustrates a time domain configuration of a P-CSI-RS/S-CSI-RS resource set that is aligned with a C-DRX ON duration according to embodiments of the present disclosure.

FIG. 25 illustrates a time domain configuration of a P-CSI-RS/S-CSI-RS resource set that is aligned with a C-DRX ON duration according to embodiments of the present disclosure. An embodiment of the time domain configuration shown in FIG. 25 is for illustration only. Other embodiments are used without departing from the scope of the present disclosure.

The UE 116 can be configured with a set of P-CSI-RS resources 2501, that consists of K>=1 P-CSI-RS resources, where the multiple CSI-RS resources can be received with different quasi-collocation (QCL) properties 2504-2507. Similarly, the UE 116 can also be configured with a set of S-CSI-RS resources 2502, that consists of K>=1 S-CSI-RS resources, where the multiple S-CSI-RS resource can be received with different QCL properties 2504-2507 and can provide a same value of I-drx-config. A gap 2508 between two consecutive P-CSI-RS resources 2501 can be either predetermined in the system operation or provided to the UE 116 by higher layers. The UE 116 can assume the ith S-CSI-RS is QCLed with the ith P-CSI-RS and also has same QCL properties with a SS/PBCH block, where i= 0, . . . , K−1. The UE 116 can determine a configuration of K through one of the following:

In one example, K is provided to the UE 116 through higher layer signaling.

In another example, K is determined by the sleep duration within a CDRX cycle. For example, when sleep duration is T_sleep >=T0, K equals the size of SS/PBCH block burst broadcasted in MIB of serving cell otherwise, K=1. T0 is a threshold such as T0=6 ms.

In yet another example, K is provided to the UE 116 by higher layer signaling from a serving gNB in response to a K value provided from the UE 116 to the gNB 102.

The UE 116 can determine a configuration for a frequency domain (bandwidth) P-CSI-RS/S-CSI-RS resources, denoted as BW^P-CSI-RS_RB/BW^S-CSI-RS_RB, in the unit of one RB through one or a combination of the following:
- In one example, BW^P-CSI-RS_RB/BW^S-CSI-RS_RB is fixed and defined in the specification of the system operation. For example, BW^P-CSI-RS_RB/BW^S-CSI-RS_RB=24.
- In another example, BW^P-CSI-RS_RB/BW^S-CSI-RS_RB can be provided to the UE 116 through higher layer signaling.
- In another example, BW^P-CSI-RS_RB/BW^S-CSI-RS_RB is provided to the UE 116 by higher layer signaling from a serving gNB in response to a values for BW^P-CSI-RS_RB/BW^S-CSI-RS_RB provided from the UE 116 to the gNB 102.

The UE 116 can determine a configuration of start RB startRB^CSI-RS for a P-CSI-RS/S-CSI-RS resource set relative to the start of an associated active DL BWP through one or a combination of the following methods.
- In one example, startRB^CSI-RS is fixed and defined in the specification of the system operation. For example, startRB^CSI-RS=0.
- In another example, startRB^CSI-RS can be provided to the UE 116 through higher layer signaling.
- In another example, startRB^CSI-RS can be determined by I^ID, for example as $$startRB^\wedge CSI - RS = \text{mod}\left(\left[\frac{I^{ID}}{c1}\right], c2\right) * c3,$$

where c1, c2, c3 are either predetermined in the system operation, such as c1=4, c2=6, c3=2, or provided to UE 116 by higher layers.

Figure 26:
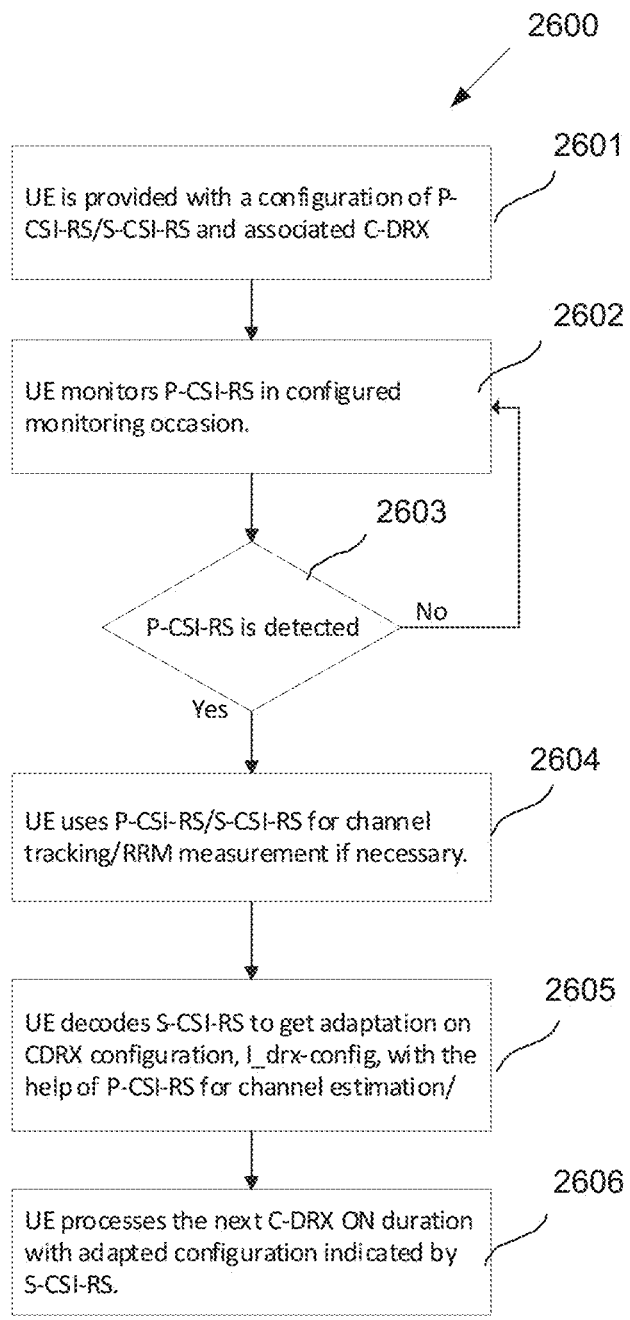
FIG. 26 illustrates a UE procedure 2600 in C-DRX mode when configured with a P-CSI-RS/S-CSI-RS resource set according to embodiments of the present disclosure.

FIG. 26 illustrates a UE procedure 2600 in C-DRX mode when configured with a P-CSI-RS/S-CSI-RS resource set according to embodiments of the present disclosure. An embodiment of the procedure 2600 shown in FIG. 26 is for illustration only. Other embodiments are used without departing from the scope of the present disclosure.

In step 2601, the UE 116 is provided by higher layers a configuration P-CSI-RS/S-CSI-RS resource set. In step 2602, the UE 116 monitors P-CSI-RS resource in configured monitoring occasions according to a monitoring periodicity and an offset. In step 2603, the UE 116 determines whether or not the UE 116 detects a P-CSI-RS. When the UE 116 detects P-CSI-RS, the UE 116 can use the P-CSI-RS/S-CSI-RS for channel tracking/RRM measurement in step 2604. In step 2605, the UE 116 detects S-CSI-RS to obtain an adaptation request for a next C-DRX configuration. The S-CSI-RS detection can be coherent using the P-CSI-RS to provide a channel estimate. In step 2606, the UE 116 then operates in the next C-DRX ON duration according to an adaption of the C-DRX configuration indicated by the S-CSI-RS.

According to embodiments of this disclosure that consider an additional reference signal (RS) reception prior to the C-DRX on duration a third approach is used. In the third approach, a UE 116 uses the available CSI-RS resources configured for mobility outside C-DRX active time as reference signal for beam measurement or L1-RSRP report. The available CSI-RS resources for mobility can be the configured by RRC parameter, i.e. CSI-RS-Resource-Mobility in REF 15. A UE 116 can determine the QCL assumption for the CSI-RS resource through any of the following:
- In one example, the CSI-RS resource is QuasiColocated (QCLed) with an SSB with respect to QCL-TypeD;
- In another example, the UE 116 is provided with a TCI-State for the CSI-RS resource indicating QCL source RS(s) with 'QCL-TypeD' association.

According to embodiments of this disclosure that consider an additional reference signal (RS) reception prior to the C-DRX on duration a fourth approach is used. In the fourth approach, the UE 116 can be configured with one or more NZP CSI-RS resource set configuration(s) by higher layer for CSI measurement outside DRX Active Time. The configurations can be delivered to UE 116 either through dedicated RRC parameter or SI that is common to UEs within a serving cell. For each periodic NZP CSI-RS resource set, the UE 116 can be provided with any of the configuration parameters of NZP-CSI-RS-ResourceSet in REF 15.

Figure 27:
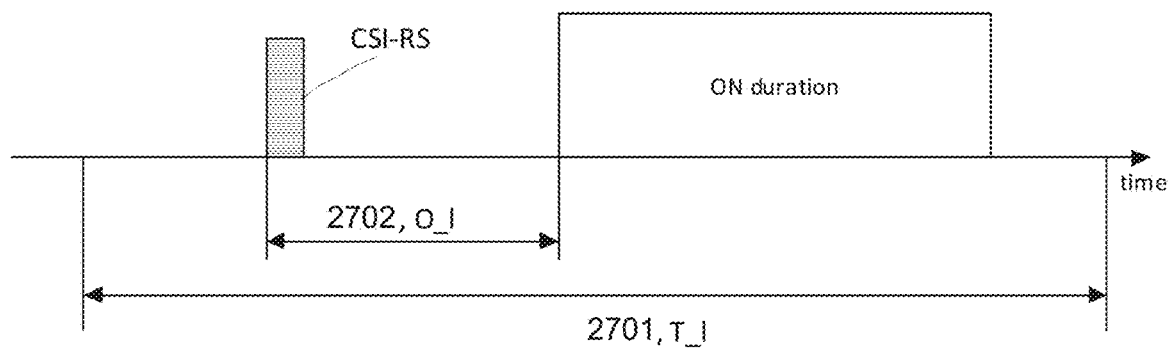
FIG. 27 illustrates an example of NZP CSI-RS resource associated with DRX operation according to embodiments of the present disclosure.

FIG. 27 illustrates an example of NZP CSI-RS resource associated with DRX operation according to embodiments of the present disclosure. An embodiment of the NZP CSI-RS resource shown in FIG. 27 is for illustration only. Other embodiments are used without departing from the scope of the present disclosure.

When NZP CSI-RS resource with index/Id, 1, is periodic' or 'semi-peristent', the UE 116 can be provided with any of the following:
- A periodicity T_1 2701 in the unit of slot. The periodicity T_1 2701 can be associated with C-DRX cycle used by the UE 116, T_DRX, for example, T_1=c*T_DRX, where c is a positive integer, e.g. c=1.
- An offset O_1 2702 in the unit of slot. In one example, the start of NZP CSI-RS is configured to be before the start of next DRX ON duration in associated C-DRX cycle determined by T_1 2701. In this case, the O_1 2702, is the offset between the start of the NZP CSI-RS and the start of next DRX ON duration in the associated C-DRX cycle.

Each NZP CSI-RS resource set, l, consists of one or more periodic CSI-RS resource(s) with periodicity and offset to be T_1 2701, and O_1 2702, respectively. For each periodic CSI-RS resource, the UE 116 can be provided with any of the following in the configuration:
- A CSI-RS resource ID, k;
- Scrambling ID for generating the CSI-RS sequence. In one example, the scrambling ID is the cell ID;
- TCI state. In one example, the TCI state indicate both QCL source RS(s) and corresponding QCL type; in another example, the TCI state indicate QCL source RS with fixed 'QCL-TypeD' association.

The NZP CSI-RS resource set associated with C-DRX can be activated or deactivated by a MAC CE. When the UE 116 receives a MAC CE to indicate activation of an NZP CSI-RS resources set i, the UE 116 assume the CSI-RS resources associated with NZP CSI-RS resource set I are available. When the UE 116 receives a MAC CE to indicate deactivation of an NZP CSI-RS resources set i, the UE 116 assume the CSI-RS resources associated with NZP CSI-RS resource set i are not available.

According to embodiments of this disclosure that consider an additional reference signal (RS) reception prior to the C-DRX on duration a fifth approach is used. In the fifth approach, the CSI-RS resources configured by higher layer, i.e. NZP-CSI-RS-ResourceSet, in REF 15, can be available outside of DRX Active Time.

According to embodiments of this disclosure, a channel state information (CSI) report associated with C-DRX operation is considered. The UE 116 can be provided with one or more CSI report configurations associated C-DRX operation. For each CSI report configuration, the UE 116 can be provided with any of the configuration parameters of CSI-ResourceConfig in REF 15. The configuration can be provided to the UE 116 either through dedicated RRC signaling, for example together with the configuration of C-DRX or SI scheduled by a DCI with CRC scrambled by SI-RNTI.

For the time domain behavior of CSI report associated with C-DRX, a UE 116 can be configured to any of the following:

In one example, the CSI report associated with C-DRX is semi-persistent and transmitted through a PUCCH;

In another example, the CSI report associated with C-DRX is semi-persistent and transmitted through a PUSCH;

In yet another example, the CSI report associated with C-DRX is periodic and transmitted through a PUCCH.

Figure 28:
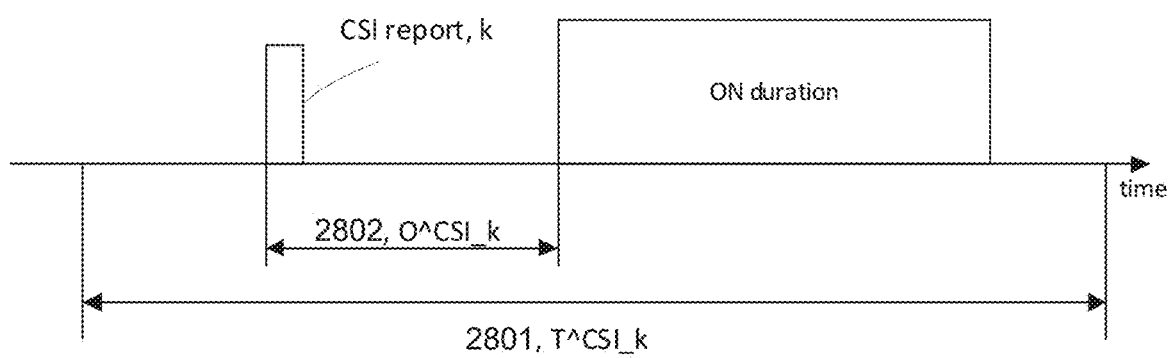
FIG. 28 illustrates an example of CSI report associated with DRX operation according to embodiments of this disclosure according to embodiments of the present disclosure.

FIG. 28 illustrates an example of a CSI report associated with DRX operation according to embodiments of this disclosure according to embodiments of the present disclosure. An embodiment of the CSI report shown in FIG. 28 is for illustration only. Other embodiments are used without departing from the scope of the present disclosure.

When the CSI report is configured to be 'periodic' or 'semi-persistent'. For each associated CSI report with index/ID k, the UE 116 is provided with a periodicity, $T\hat{\ }CSI\_k$ 2801, in the unit of slot. The periodicity $T\hat{\ }CSI\_k$ 2801 can be associated with C-DRX cycle used by the UE 116, $T\_DRX$, for example, $T\hat{\ }CSI\_k=c*T\_DRX$, where c is a positive integer, e.g. c=1. The UE 116 is also provided with an offset $O\hat{\ }CSI\_k$ 2802, in the unit of slot. $O\hat{\ }SRS\_k$ is configured relative to the start of next DRX ON duration in associated C-DRX cycle determined by $T\hat{\ }CSI\_k$ 2801. In this case, the $O\hat{\ }CSI\_k$ 2802, is the offset between the start of the CSI report occasion and the start of next DRX ON duration in the associated C-DRX cycle. When $O\hat{\ }CSI\_k$ 2802 is positive integer, it indicates the start of CSI report is before the start of next DRX ON duration, while when $O\hat{\ }CSI\_k$ 2802 is negative integer, it indicates the start of CSI report is after the start of next DRX ON duration.

The UE 116 can determine the report quantity of CSI report associated with C-DRX operation through any of the following:

In one example, the UE 116 is configured with report quantity for beam management, and the report quantity to 'cri-RSRP', or 'ssb-Index-RSRP';

In another example, the UE 116 is configured with report quantity to be 'cri-RI-CQI';

In yet another example, the UE 116 is configured with report quantity to be 'cri-RI-PMI-CQI', 'cri-RI-i1', 'cri-RI-i1-CQI', 'cri-RI-LI-PMI-CQI';

According to embodiments of this disclosure, a Sounding Reference Signal (SRS) transmission associated with C-DRX operation is considered. The UE 116 can be configured with one or more Sounding Reference Signal (SRS) resource configuration(s) for SRS transmission associated with C-DRX operation. For each SRS resource configuration, the UE 116 can be provided with any of configuration parameters of SRS-Config in REF 15 either through dedicated RRC signaling or SI scheduled by a DCI with CRC scrambled by SI-RNTI.

Figure 29:
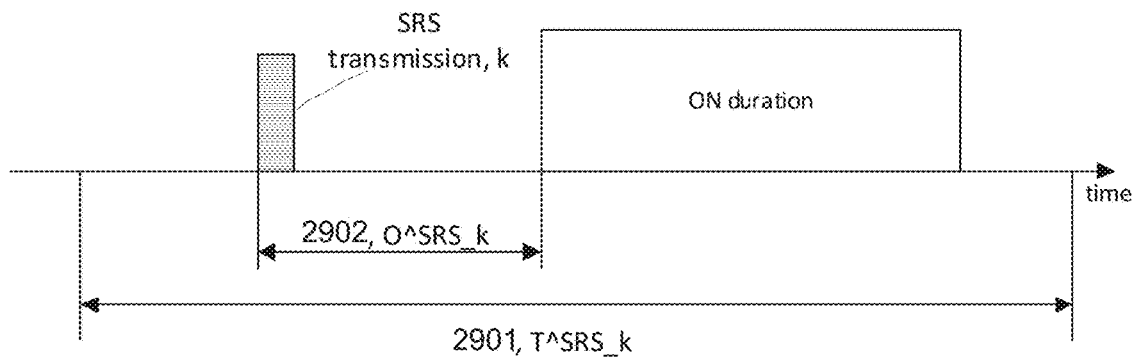
FIG. 29 illustrates an example of SRS transmission associated with DRX operation according to embodiments of this disclosure according to embodiments of the present disclosure.

FIG. 29 illustrates an example of SRS transmission associated with DRX operation according to embodiments of this disclosure according to embodiments of the present disclosure. An embodiment of the SRS transmission shown in FIG. 29 is for illustration only. Other embodiments are used without departing from the scope of the present disclosure.

When the SRS transmission is configured to be 'periodic' or 'semi-persistent'. For each associated SRS resource with index/ID k, the UE 116 is provided with a periodicity, $T\hat{\ }SRS\_k$ 2901, in the unit of slot. The periodicity $T\hat{\ }SRS\_k$ 2901 can be associated with C-DRX cycle used by the UE 116, $T\_DRX$, for example, $T\hat{\ }SRS\_k=c*T\_DRX$, where c is a positive integer, e.g. c=1. The UE 116 is also provided with an offset $O\hat{\ }SRS\_k$ 2902, in the unit of slot. $O\hat{\ }SRS\_k$ 2902 is configured relative to the start of next DRX ON duration in associated C-DRX cycle determined by $T\hat{\ }SRS\_k$ 2901. In this case, the $O\hat{\ }SRS\_k$ 2902, is the offset between the start of the SRS resource and the start of next DRX ON duration in the associated C-DRX cycle. When $O\hat{\ }SRS\_k$ 2902 is positive integer, it indicates the start of SRS resource k is before the start of next DRX ON duration, while when $O\hat{\ }SRS\_k$ 2902 is negative integer, it indicates the start of SRS resource k is after the start of next DRX ON duration.

The UE 116 can determine the spatial relation information of the SRS resource associated with C-DRX, through any of the following:

In one example, the UE 116 is configured with a spatialRelationInfo containing the ID of a reference 'ssb-Index', the UE 116 can transmit the target SRS resource with the same spatial domain transmission filter used for the reception of the reference SS/PBCH block.

In another example, the UE 116 is configured with the higher layer parameter spatialRelationInfo contains the ID of a reference 'csi-RS-Index', the UE 116 can transmit the target SRS resource with the same spatial domain transmission filter used for the reception of the reference periodic CSI-RS or of the reference semi-persistent CSI-RS. In one sub-example, the CSI-RS can be associated with C-DRX operation.

For SRS associated with C-DRX, a UE 116 can be triggered to transmit SRS resources through any of the following:

In one example, the SRS transmission is enabled by a configuration of DRX, e.g. DRX-Config in REF 15. The associated SRS resource can be provided together with the configuration of DRX, and the UE 116 transmits SRS when the configuration of SRS is present or semi-persistent SRS transmission is activated by MAC CE.

In another example, when a UE 116 is configured to monitor a physical layer signal/channel to indicate whether or not the UE 116 need to wake up for the processing of next DRX ON duration, the UE 116 transmits the SRS associated with C-DRX only when the UE 116 is triggered to wake up for the next DRX ON duration.

For the usage of SRS resource associated with C-DRX:

In one example, the SRS resources can be used for beam-management.

In another example, the SRS resources can be used for antenna switching. In this case, the UE 116 can be configured with a higher parameter, i.e. supportedSRS-TxPortSwitch, for the SRS resource associated with C-DRX. supportedSRS-TxPortSwitch can be 1T2R or 1T4R or 2T4R or T=R.

According to embodiments of this disclosure beam failure recovery associated with C-DRX operation is considered.

Figure 30:
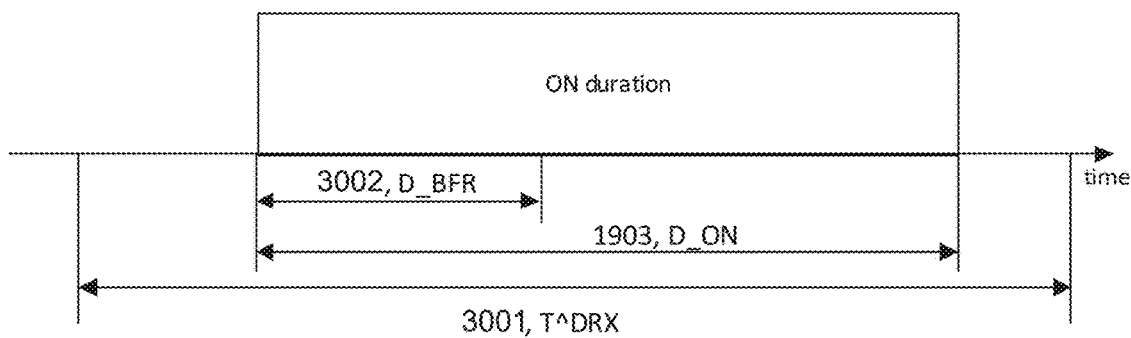
FIG. 30 illustrates an example of beam failure recovery associated with DRX operation according to embodiments of the present disclosure.

FIG. 30 illustrates an example of beam failure recovery associated with DRX operation according to embodiments of the present disclosure. An embodiment of the beam failure recovery shown in FIG. 30 is for illustration only. Other embodiments are used without departing from the scope of the present disclosure.

The UE 116 can perform automatic beam failure recovery after a period of DRX OFF duration, wherein the TCI of CORESET is likely to be outdated. The UE 116 monitors CORESE-BFR for beam indication or switching from gNB 102 within a duration of at the begging of DRX ON duration, i.e. D_BFR 3002, such that D_BFR<=D_ON, where D_ON 3003 is the configured DRX ON duration. The automatic beam failure recovery can be triggered directly when the DRX operation is enabled or for certain DRX configurations, for example, when DRX cycle is larger than predetermined threshold, e.g. T0_DRX=1024 ms. During the time period of D_BFR 3002, a UE 116 can determine PDCCH monitoring behavior through any of the following:

In one example, the UE 116 only monitors CORESE-BFR during the time period of D_BFR;

In another example, the UE 116 monitors configured CORESETs and search space sets during the time period of D_BFR.

Figure 31:
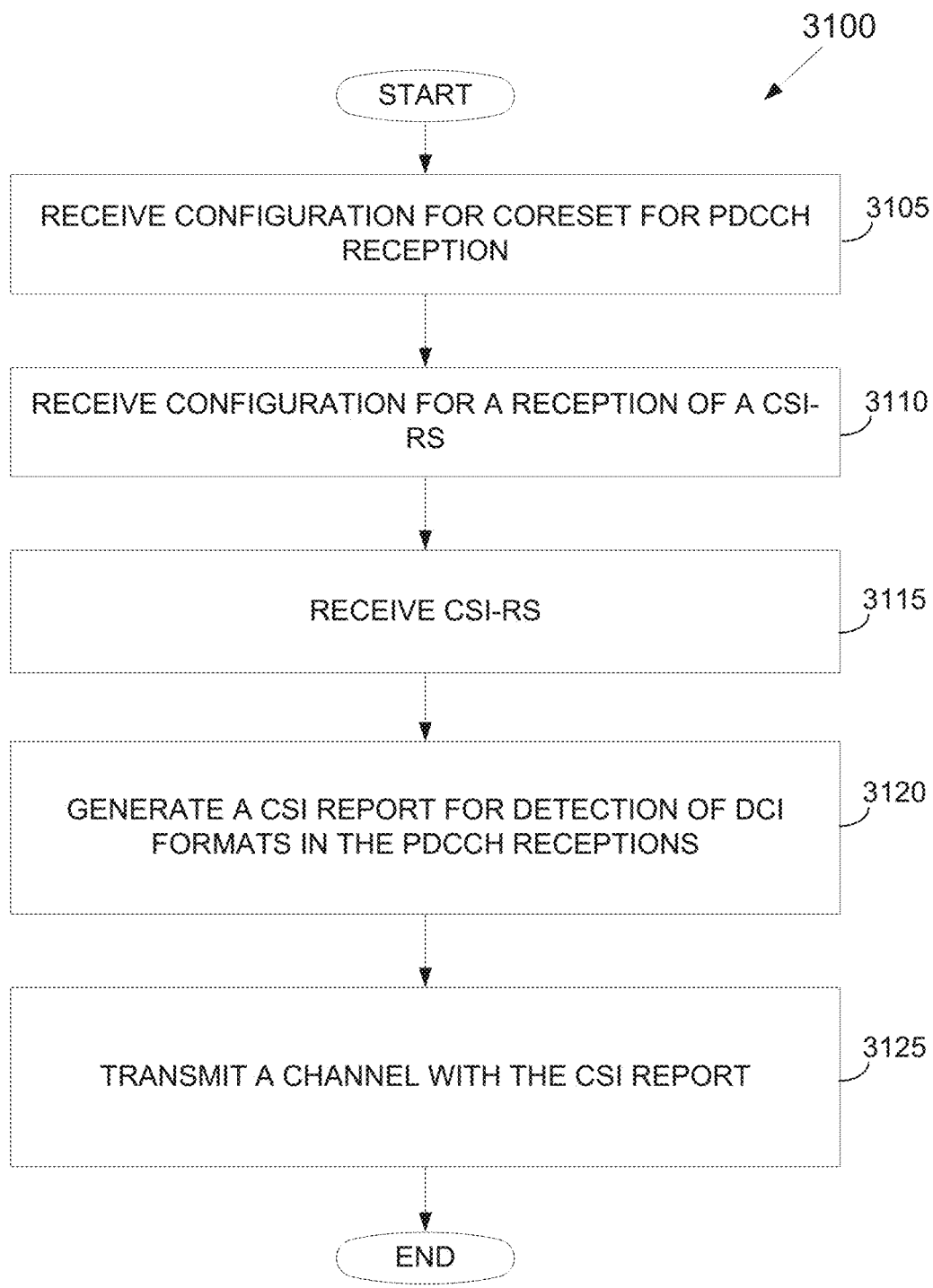
FIG. 31 illustrates a method for generating a CSI report for DCI formats in PDCCH receptions in a CORESET according to embodiments of the present disclosure.

FIG. 31 illustrates a block diagram of an example method 3100 for generating a CSI report for DCI formats in PDCCH receptions in a CORESET according to embodiments of the present disclosure. An embodiment of the method shown in FIG. 31 is for illustration only. Other embodiments are used without departing from the scope of the present disclosure.

In step 3105, the UE 116 receives a first configuration for a first CORESET for PDCCH reception. The first configuration includes a first TCI state indicating a set of quasi co-location properties for one or more PDCCH receptions in the first CORESET. According to embodiments of this disclosure the UE can receive multiple configurations for multiple CORESETs for multiple PDCCH receptions. For example, a third configuration for a second CORESET for a second PDCCH reception can be received by the UE 116. A comparison of a first CQI value for the first PDCCH reception in the first CORESET and a second CQI value for the second PDCCH reception in the second CORESET can be made for use in generation of the CSI report described in relation to step 3120.

In step 3110, the UE 116 receives a second configuration for a reception of a first CSI-RS. The second configuration includes a first set of REs for the reception of the first CSI-RS by the UE. According to embodiments of this disclosure, multiple configurations for reception of multiple CSI-RSs can be received by the UE 116. For example, the UE 116 can receive a fourth configuration for reception of a second CSI-RS. The UE 116 can determine the second CQI value based on the reception of the second CSI-RS.

In step 3115, the UE 116 receives at least one CSI-RS. According to embodiments, the UE can receive multiple CSI-RSs according the multiple configurations received in step 3110, including the second CSI-RS.

In step 3120, a CSI report is generated for detection of DCI formats in the PDCCH receptions in the CORESET based on the CSI-RS. According to embodiments of this disclosure the a DCI format in a PDCCH reception is detected and a DM-RS in the PDCCH reception is used to generate the CSI report based on identifying the DCI format being detected in a PDCCH reception occasion and identifying that the first CSI-RS reception is not during the PDCCH reception occasion. According to embodiments of this disclosure the CSI report is generated by generating the CSI report for the first PDCCH receptions in the first CORESET based on a determination that the first CQI value is larger than the second CQI value and the CSI report includes a CORESET index for the first CORESET in the CSI report. According to embodiments of this disclosure the CSI report is generated by including a CSI report for the first PDCCH receptions in the first CORESET and a differential CQI value, relative to a CQI value of the CSI report for the first CORESET, for the second PDCCH receptions in the second CORESET.

According the embodiments of this disclosure multiple CSI reports can be generated. For example, the UE 116 can detect a DCI format in a PDCCH reception. According to embodiments, the DCI format includes a field with a value indicating transmission of the CSI report. The DCI format can also include a field with a value indication transmission of a second CSI report for detection of a transport block in a PDSCH.

In step 3125, the first CSI report is transmitted to the gNB 102. According to embodiments of this disclosure the CSI report includes a CQI value from a first set of CQI values defined for detection of a DCI format with a first BLER and the first set of CQI values includes a smaller number of values than a second set of CQI values defined for detection of a transport block with a second BLER. According to embodiments of this procedure multiple CSI reports are transmitted to a gNB 102, including but not limited to the second CSI report.

The method shown in FIG. 31 could be implemented in any suitable manner. For instance, the UE 116 can include an RF transceiver 310 to receive the configurations and to transmit a channel with the CSI report to the gNB 102 and a processor 340 to generate the CSI report(s). Although FIG. 31 illustrates one example of a method 3100 for generating a CSI report by a UE 116 for transmission to a gNB 102, various changes can be made to FIG. 31. For example, various steps in FIG. 31 could overlap, occur in parallel, occur serially, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
   a transceiver configured to receive:
      a first configuration for a first control resource set (CORESET), wherein:
         the first configuration includes a first transmission configuration indication (TCI) state,
         a TCI state for a CORESET indicates a set of quasi co-location properties for a physical downlink control channel (PDCCH) reception in the CORESET, and
         a PDCCH includes a downlink control information (DCI) format;
      a second configuration for a reception of a first channel state information reference signal (CSI-RS), wherein the second configuration includes:
         a first set of resource elements (REs), and
         the first TCI state; and
      the first CSI-RS; and
   a processor operably coupled to the transceiver, the processor configured to compute:
      a first channel quality indicator (CQI) value, based on the first CSI-RS, for a first PDCCH reception in the first CORESET, and
      at least one CQI value based on the first CQI value, wherein the transceiver is further configured to transmit a report that includes the at least one CQI value for the first PDCCH reception in the first CORESET.

2. The UE of claim 1, wherein:
the transceiver is further configured to decode a DCI format in the first PDCCH reception that includes a demodulation reference signal (DM-RS); and
the processor is further configured to compute the at least one CQI value based on the DM-RS when:
 the DCI format is correctly decoded, and
 the first CSI-RS reception is not during the first PDCCH reception.

3. The UE of claim 1, wherein:
the transceiver is further configured to receive a third configuration for a second CORESET, wherein the third configuration includes the first TCI state; and
the processor is further configured to compute a second CQI value, based on the first CSI-RS, for a second PDCCH reception in the second CORESET, wherein the at least one CQI value includes the first CQI value and the second CQI value.

4. The UE of claim 1, wherein:
the transceiver is further configured to receive a third configuration for a second CORESET, wherein the third configuration includes the first TCI state; and
the processor is further configured to compute an offset, based on the first CSI-RS, relative to the first CQI value for a second PDCCH reception in the second CORESET, wherein the at least one CQI value includes the first CQI value and the offset.

5. The UE of claim 1, wherein:
the transceiver is further configured to receive:
 a third configuration for a second CORESET, wherein the third configuration includes a second TCI state,
 a fourth configuration for a reception of a second CSI-RS, wherein the fourth configuration includes:
  a second set of REs, and
  the second TCI state, and
 the second CSI-RS; and
the processor is further configured to compute a second CQI value, based on the second CSI-RS, for a second PDCCH reception in the second CORESET, wherein the at least one CQI value includes the first CQI value and the second CQI value.

6. The UE of claim 1, wherein:
the transceiver is further configured to receive:
 a third configuration for a second CORESET, wherein the third configuration includes a second TCI state,
 a fourth configuration for a reception of a second CSI-RS, wherein the fourth configuration includes:
  a second set of REs, and
  the second TCI state, and
 the second CSI-RS; and
the processor is further configured to compute a second CQI value, based on the second CSI-RS, for a second PDCCH reception in the second CORESET, wherein the at least one CQI value includes:
 an index indicating the first CORESET and the first CQI value, when the first CQI value is larger than or equal to the second CQI value, and
 an index indicating the second CORESET and the second CQI value, when the first CQI value is smaller than the second CQI value.

7. The UE of claim 1, wherein:
the processor is further configured to compute a second CQI value for a reception of a physical downlink shared channel (PDSCH) based on the reception of the first CSI-RS, wherein:
 the first CQI value is from a first set of CQI values,
 the second CQI value is from a second set of CQI values, and
 the first set of CQI values includes a smaller number of values than a second set of CQI values.

8. A base station comprising:
a transceiver configured to transmit:
 a first configuration for a first control resource set (CORESET), wherein:
  the first configuration includes a first transmission configuration indication (TCI) state,
  a TCI state for a CORESET indicates a set of quasi co-location properties for a physical downlink control channel (PDCCH) transmission in the CORESET, and
  a PDCCH transmission includes a downlink control information (DCI) format;
 a second configuration for a transmission of a first channel state information reference signal (CSI-RS), wherein the second configuration includes a first set of resource elements (REs) and the first TCI state; and
 the first CSI-RS,
wherein the transceiver is further configured to receive a report that includes at least one channel quality indicator (CQI) value for a first PDCCH transmission in the first CORESET, the CQI value associated with the first CSI-RS; and
a processor operably coupled to the transceiver, the processor configured to determine parameters for the first PDCCH transmission in the first CORESET based on the at least one CQI value.

9. The base station of claim 8, wherein the transceiver is further configured to transmit a third configuration for a second CORESET, wherein:
the third configuration includes the first TCI state, and
the at least one CQI value includes:
 a first CQI value, associated with the first CSI-RS, for determining parameters for the first PDCCH transmission in the first CORESET, and
 a second CQI value, associated with the first CSI-RS, for determining parameters for a second PDCCH transmission in the second CORESET.

10. The base station of claim 8, wherein:
the transceiver is further configured to transmit a third configuration for a second CORESET, wherein:
the third configuration includes the first TCI state, and
the at least one CQI value includes:
 a first CQI value, associated with the first CSI-RS, for determining parameters for the first PDCCH transmission in the first CORESET, and
 an offset, associated with the first CSI-RS, of the first CQI value for determining parameters for a second PDCCH transmission in the second CORESET.

11. The base station of claim 8, wherein:
the transceiver is further configured to transmit:
 a third configuration for a second CORESET that includes a second TCI state,
 a fourth configuration for a transmission of a second CSI-RS that includes a second set of REs and the second TCI state, and the second CSI-RS, wherein the at least one CQI value includes:
a first CQI value, associated with the first CSI-RS, for determining parameters for the first PDCCH transmission in the first CORESET, and
a second CQI value, associated with the second CSI-RS, for determining parameters for a second PDCCH transmission in the second CORESET.

12. The base station of claim 8, wherein:
the transceiver is further configured to transmit:
a third configuration for a second CORESET that includes a second TCI state,
a fourth configuration for a transmission of a second CSI-RS that includes a second set of REs and the second TCI state, and
the second CSI-RS, wherein the at least one CQI value includes one of:
an index indicating the first CORESET and a first CQI value associated with the first CSI-RS for determining parameters for the first PDCCH transmission in the first CORESET, and
an index indicating the second CORESET and a second CQI value associated with the second CSI-RS for determining parameters for a second PDCCH transmission in the second CORESET.

13. The base station of claim 8, wherein:
the at least one CQI value includes:
a first CQI value, associated with the first CSI-RS, for determining parameters for the first PDCCH transmission in the first CORESET, and
a second CQI value, associated with the first CSI-RS, for determining parameters for a physical downlink shared channel (PDSCH) transmission,
the first CQI value is from a first set of CQI values,
the second CQI value is from a second set of CQI values, and
the first set of CQI values includes a smaller number of values than the second set of CQI values.

14. A method for providing a channel quality indicator (CQI) value for reception of a physical downlink control channel (PDCCH) in a control resource set (CORESET), the method comprising:
receiving:
a first configuration for a first CORESET, wherein:
the first configuration includes a first transmission configuration indication (TCI) state,
a TCI state for a CORESET indicates a set of quasi co-location properties for a PDCCH reception in the CORESET, and
a PDCCH includes a downlink control information (DCI) format;
a second configuration for a reception of a first channel state information reference signal (CSI-RS), wherein the second configuration includes:
a first set of resource elements (REs), and
the first TCI state; and
the first CSI-RS;
computing:
a first CQI value, based on the first CSI-RS, for a first PDCCH reception in the first CORESET, and
at least one CQI value based on the first CQI value; and
transmitting a report that includes the at least one CQI value for the first PDCCH reception in the first CORESET.

15. The method of claim 14, further comprising:
decoding a DCI format in the first PDCCH reception that includes a demodulation reference signal (DM-RS); and
computing the at least one CQI value based on the DM-RS when:
the DCI format is correctly decoded, and
the first CSI-RS reception is not during the first PDCCH reception.

16. The method of claim 14, further comprising:
receiving a third configuration for a second CORESET, wherein the third configuration includes the first TCI state; and
computing a second CQI value, based on the first CSI-RS, for a second PDCCH reception in the second CORESET, wherein the at least one CQI value includes the first CQI value and the second CQI value.

17. The method of claim 14, further comprising:
receiving a third configuration for a second CORESET, wherein the third configuration includes the first TCI state; and
computing an offset, based on the first CSI-RS, relative to the first CQI value for a second PDCCH reception in the second CORESET, wherein the at least one CQI value includes the first CQI value and the offset.

18. The method of claim 14, further comprising:
receiving:
a third configuration for a second CORESET, wherein the third configuration includes a second TCI state,
a fourth configuration for a reception of a second CSI-RS, wherein the fourth configuration includes:
a second set of REs, and
the second TCI state, and
the second CSI-RS; and
computing a second CQI value, based on the second CSI-RS, for a second PDCCH reception in the second CORESET, wherein the at least one CQI value includes the first CQI value and the second CQI value.

19. The method of claim 14, further comprising:
receiving:
a third configuration for a second CORESET, wherein the third configuration includes a second TCI state,
a fourth configuration for a reception of a second CSI-RS, wherein the fourth configuration includes:
a second set of REs, and
the second TCI state, and
the second CSI-RS; and
computing a second CQI value, based on the second CSI-RS, for a second PDCCH reception in the second CORESET, wherein the at least one CQI value includes:
an index indicating the first CORESET and the first CQI value, when the first CQI value is larger than or equal to the second CQI value, and
an index indicating the second CORESET and the second CQI value, when the first CQI value is smaller than the second CQI value.

20. The method of claim 14, further comprising:
computing a second CQI value for a reception of a physical downlink shared channel (PDSCH) based on the reception of the first CSI-RS, wherein:
the first CQI value is from a first set of CQI values,
the second CQI value is from a second set of CQI values, and
the first set of CQI values includes a smaller number of values than a second set of CQI values.

* * * * *